(12) United States Patent
Ritchie et al.

(10) Patent No.: US 10,354,419 B2
(45) Date of Patent: Jul. 16, 2019

(54) METHODS AND SYSTEMS FOR DYNAMIC GRAPH GENERATING

(71) Applicants: Colin Frederick Ritchie, Ringwood North (AU); Cameron Ritchie, Ringwood North (AU)

(72) Inventors: Colin Frederick Ritchie, Ringwood North (AU); Cameron Ritchie, Ringwood North (AU)

(*) Notice: Subject to any disclaimer, the term of this patent is extended or adjusted under 35 U.S.C. 154(b) by 137 days.

(21) Appl. No.: 14/720,952

(22) Filed: May 25, 2015

(65) Prior Publication Data
US 2016/0350950 A1 Dec. 1, 2016

(51) Int. Cl.
*G06F 17/24* (2006.01)
*G06T 11/20* (2006.01)
*G06K 9/18* (2006.01)

(52) U.S. Cl.
CPC .......... *G06T 11/206* (2013.01); *G06F 17/245* (2013.01); *G06F 17/246* (2013.01)

(58) Field of Classification Search
CPC ....... G11B 27/06; G06F 3/048; G06F 3/0486; G06F 17/246; G06F 17/212
See application file for complete search history.

(56) References Cited

U.S. PATENT DOCUMENTS

| | | | | |
|---|---|---|---|---|
| 5,461,708 A | * | 10/1995 | Kahn | G06F 17/246 |
| | | | | 345/440 |
| 5,842,180 A | * | 11/1998 | Khanna | G06Q 40/12 |
| | | | | 705/30 |
| 8,812,947 B1 | * | 8/2014 | Maoz | G06F 17/246 |
| | | | | 715/212 |
| 2009/0044121 A1 | * | 2/2009 | Berger | G06F 3/0486 |
| | | | | 715/724 |
| 2010/0257438 A1 | * | 10/2010 | Becerra, Sr. | G06F 3/0485 |
| | | | | 715/204 |
| 2011/0302194 A1 | * | 12/2011 | Gonzalez | G06F 17/30241 |
| | | | | 707/769 |
| 2013/0086459 A1 | * | 4/2013 | Folting | G06F 17/246 |
| | | | | 715/212 |
| 2014/0253556 A1 | * | 9/2014 | Riche | G06T 11/206 |
| | | | | 345/440 |
| 2014/0324461 A1 | * | 10/2014 | Carlsgaard | G06F 19/3487 |
| | | | | 705/3 |

(Continued)

*Primary Examiner* — Wilson W Tsui
*Assistant Examiner* — Ahamed I Nazar
(74) *Attorney, Agent, or Firm* — Antonio Papageorgiou; Meister Seelig & Fein LLP

(57) ABSTRACT

A computer system and method for interrogating and analyzing data. The system may recognize the software application containing data and will search for visible and hidden data including Headers and Labels; and may further interrogate and analyze visible data. The system will preferably create graphical representations based on the analyzed data instantaneously. The graphical representation is configured to be generated dynamically as the selection of data changes; hence it will eliminate the need of selecting data and changing graph types while moving from one data set to other data sets. The data set may be a single point data, a block of data, a highlighted area, a screen grab, tabular, graphical, or textual formatted data. The system and method may analyze the data from various formats and applications such as spreadsheet, PDF file, remote data sources and web based databases etc.

22 Claims, 48 Drawing Sheets

(56) References Cited

U.S. PATENT DOCUMENTS

| | | | |
|---|---|---|---|
| 2014/0379666 A1* | 12/2014 | Byron | G06F 17/30371 |
| | | | 707/687 |
| 2015/0356068 A1* | 12/2015 | Hill | G06F 17/245 |
| | | | 715/227 |
| 2016/0026858 A1* | 1/2016 | Vogel | G06F 16/51 |
| | | | 382/203 |
| 2016/0078002 A1* | 3/2016 | Hailpern | G06F 17/246 |
| | | | 715/209 |
| 2016/0275065 A1* | 9/2016 | Vigesaa | G06F 17/246 |
| 2016/0322021 A1* | 11/2016 | Duncker | G06F 17/30 |
| 2016/0323249 A1* | 11/2016 | Duncker | H04L 63/102 |

* cited by examiner

William Playfair's trade-balance time-series chart, published in his Commercial and Political Atlas, 1786.

MATLAB® Error bars

Figure 16: Plot of distance versus stretch for the elastic band data, with fitted least squares line R least squares line

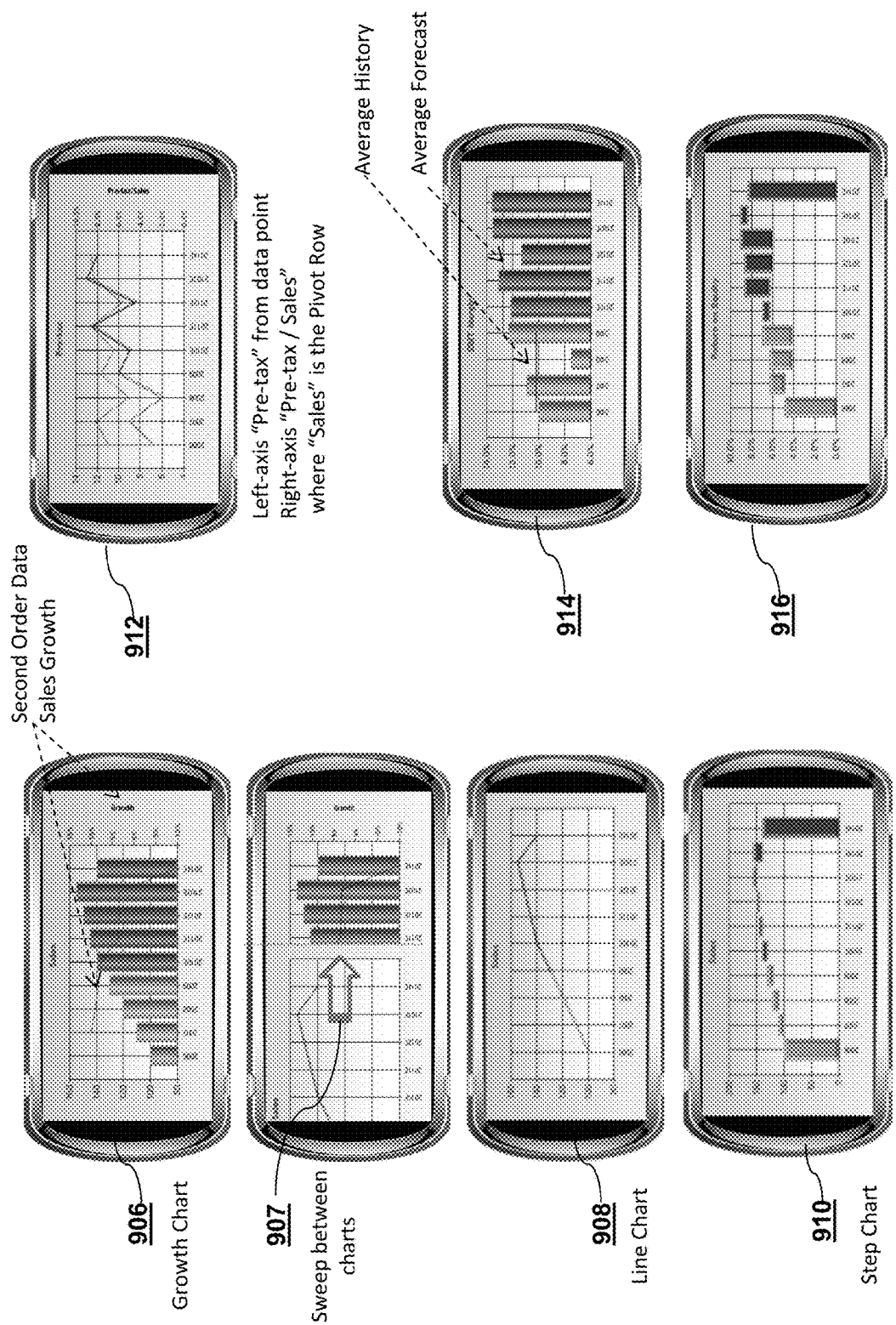

Compare previous versions of a document to current version

METHODS AND SYSTEMS FOR DYNAMIC GRAPH GENERATING

FIELD OF INVENTION

The present invention relates to a method for interrogating and analyzing one or more sets of data. More specifically, the present invention is related to the method implementable on a computer system to analyze the data and to create instantaneous graphical objects.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

Decision making and forecasting in the present world depend enormously on large volumes of data. There are multiple approaches to analyze large or small amounts of data in which the graphical approach of inspecting data is the most popular one. Charts and maps are the graphical depiction of data, in which the data is represented by symbols, bars in a bar chart, lines in a line chart and slices in a pie chart. In general, a chart is a representation of the rules associated with the data and its corresponding numerical values.

In order to visualize large or small amounts of data various efforts have been made in the past. Many data analyzing tools and web based platforms are available, such as Microsoft Office-Excel®, Apple iWork® suite, Google Analytics, SAS Analytics, SAP Analytics, Adobe Analytics, IBM Analytics etc. Many of the tools are expensive, require highly trained people in the tool and are time consuming. Many others require the data to be structured in the same way as a database table in fixed rows and columns. Products like Microsoft Excel® analyze fixed data formats, primarily in tabular format. Some of the tools need to import the data from a source (e.g. Excel®) into their product before it can be worked upon.

There are also tools such as Google Docs Sheets® that require a selection of cells with data to be included in the chart or alternatively, selection of a range or multiple ranges of data from within the chart editor. In order to do so one has to click "Select Range" and enter one or more ranges by clicking "Add Another Range". Further, one has to select the "Chart" icon in the menu bar and then the chart editor box appears.

Similarly, in Apple iWorks® to draw a chart, first one has to select the table cells for reference, and then has to hold down the Option key by clicking Charts in the toolbar. Further, one has to choose a chart type. When the pointer changes into a crosshair, one has to drag the crosshair across the canvas to create a chart of the required size. Further to limit the chart's proportions, dragging is needed while holding down the shift key.

Thus, most of the available tools are complicated for a layman and generally require highly trained people to perform the process and even to choose appropriate graph types and ranges.

Further, U.S. Pat. No. 8,423,567 entitled "dynamic query data visualizer" discusses a method that classifies query as numerical, date, or text according to their field type, executes and displays results in a first and a second dimension of the interface depending on the selections made by the user. Also, the U.S. Pat. No. 6,057,837 entitled "On-screen identification and manipulation of sources that an object depends upon" depicts a method for identification and manipulation of a range of spreadsheet cells that are referred to by spreadsheet cell formulas or define graphs. However none of above mentioned systems or processes provides the method for the interaction of cells of two or more worksheets to follow formulas and rules.

Also, none of the above mentioned systems or processes disclose any system and/or method for dynamic generation of graph for plurality of data sets. In presently available tools, it is required to repeat the whole process for analyzing other sets of data.

Further, the processes of observing, measuring, interpreting, classifying, and analyzing data give rise to systematic and random errors. Some errors may be quite large and easily detectable. Other errors and uncertainties in data are more subtle and are not easily detected or evaluated. Users of datasets may not be aware of their presence or even the possibility of their existence. Graphical methods in conjunction with error analysis provide a means to illuminate obvious and more subtle errors and evaluating the uncertainty in data sets.

Humans have strong acuity for visualization with an exceptional ability to recognize structure and relationships. Representing information in a form that matches human perceptual capabilities makes the process of getting information and digesting it easier and more effective. In presently available tools, such as R, MATLAB®, Tableau's Software®, Microsoft's Excel®, it is required to evaluate the data errors from a statistical viewpoint or else just display the data and allow the user to visually imply an error or anomaly in the sets of data.

Additionally, available tools which focus on graphical method of statistics do not allow for methods based on empirical trends in data based on the label or position in the dataset relative to its peers.

Hence, in light of the discussion above, it is desirable to devise a dynamic graph generating tool that could bring data to life and a dynamic graphical error detection technology based on rules associated with the real world application of the data that could demonstrate empirical data errors and could overcome one or more problems and disadvantages associated with conventional systems or processes.

SUMMARY OF THE INVENTION

The present invention discloses a method implementable on a system to address one or more of the above-described deficiencies of existing systems or processes, specifically, related to data and meta-data structured in an array.

At least one of embodiment of the present invention provides a computer implementable method for interrogating and analyzing one or more sets of data and/or meta-data. The embodiments of the present invention further provide a method for generating graphics on a system. The system can be any particular computing device. The system first identifies an electronic data source comprising a plurality of data points. The user selects one or more data points from the plurality of data points. The one or more selected data points may be reflected as the data against which a graphic is needed.

The system further identifies one or more meta-data associated with the selected one or more data points and one or more numerical elements associated with the selected one or more data points. Thereafter, the system recognizes one or more rules associated with the selected one or more data points. Further, the identified meta-data, numerical elements and the rules are analyzed either in combination or individually to instantaneously generate graphical objects where instantaneously means directly in response to an action, such as but not limited to selecting, using the processor, one or more data points from the plurality of data points. The graphical objects are generated in such a way that the visual properties of the graphical objects represent corresponding numerical values of the numerical elements according to a scale. The system further places the graphical objects with respect to a reference surface on an interface screen to generate the graphics.

Further, at least one embodiment of the present invention provides a method for analyzing the meta-data within the data and instantaneously creating a visual/animation, such as different types of graphs, based on the selected data.

At least one embodiment of the present invention provides a method incorporated on a computing device that is configured to generate graphics dynamically as the selection of one or more data point by the user of the device changes. It provides an interface configured to allow users to drill-down into a formula associated with a data point and provide details corresponding to each component in the formula according to contextual relationships with surrounding data points and other components of the formula and instantaneously creating a visual/animation, based on the surrounding data points.

At least one embodiment of the present invention provides a method that enables the system to follow formulas of one sheet or workbook to other sheets or workbooks.

At least one embodiment of the present invention provides a method for defining a rules-based algorithm that would visually identify data errors based on the Labels and surrounding meta-data and allow for exploration by combining this with drill-down and instantaneously creation of a visual/animation.

In some embodiments of the present invention, the plurality of data points are one or more of a single data point, a block of data points, a highlighted area in an electronic document, a screen grab, data in tabular form, graphical data, and textual formatted data.

Some of the aforementioned advantages of one or more embodiments of the present invention are considered by providing a system that comprises a display menu comprising a revolving transparent three dimensional grid view of various templates of the different types of graphical representations of data corresponding to any particular selected cell. This invention is pointed out with particularity to the appended claims. Additional features and advantages of the system will become apparent to those skilled in the art by referring to the following detailed description taken in conjunction with the accompanying drawings.

BRIEF DESCRIPTION OF DRAWING

The features of the present invention, which are novel, are set forth with particularity in the appended claims. The invention may best be understood by reference to the following description, taken in conjunction with the accompanying figures. These figures and the associated description are provided to illustrate some embodiments of the present invention, and not to limit the scope of the invention.

FIG. 4 is an illustrative view of a graphical representation of data in PDF format in accordance with an embodiment of the present invention;

FIG. 8b is an illustrative view of PathwayFinder in accordance with another embodiment of the present invention;

FIG. 9b is an illustrative view of various graphical representations in accordance with an embodiment of the present invention;

FIG. 12a is an illustrative view of the RichViewer Exploration Window in accordance with an embodiment of the present invention;

FIG. 21a is an illustrative view of RichViewer comparing source document versions in accordance with another embodiment of the present invention;

DETAILED DESCRIPTION OF THE INVENTION

The following detailed description is merely exemplary in nature and is to enable any person skilled in the art to make and use the invention. The examples shown in this description are not intended to limit the application and uses of the various embodiments. Various modifications to the disclosed invention will be readily apparent to those skilled in the art, and the methodology defined herein may be applied to other embodiments and applications without departing from the spirit and scope of the present disclosure. Thus, the present invention is not limited to the examples discussed below, but is to be accorded the widest scope consistent with the methodology and features disclosed herein. It should also be noted that FIGS. 1-22 are merely illustrative and may not be drawn to scale.

The exemplary methods described below are typically stored on a computer-readable storage medium, which may be any device that can store code for use by a computer system, mobile and others. The computer-readable storage medium includes, but is not limited to volatile memory, non-volatile memory, magnetic and optical storage devices such as disk drives, magnetic tape, CDs (compact discs), DVDs (digital versatile discs or digital video discs), or other media capable of storing code now known or later developed.

Furthermore, methods described herein can be embossed on hardware modules or apparatus. These modules or devices may include, but are not limited to, an application-specific integrated circuit (ASIC) chip, a field-programmable gate array (FPGA), a dedicated or shared processor that executes a particular software module or a piece of code at a particular time, and/or other programmable-logic devices known or later developed. When the hardware modules or apparatus are activated, they perform the methods and processes included within them.

The disclosed invention(s) along with the hardware module is/are operative in online mode or offline mode or both in online and offline mode. The invention is able to utilize wireless networks that may include, but not be limited to CDMA, GSM, UMTS, HSPA, EV-DO, EV-DO rev. A, 3GPP LTE, WiMAX, Wi-Fi, Bluetooth, internet, telephony, or some other communication format including combinations thereof.

The terms "a" or "an", as used herein, are defined as one or more than one. The term "another", as used herein, is defined as at least a second or more. The terms "including" and/or "having" as used herein, are defined as comprising (i.e. open transition).

Embodiments of the invention will now be described, by way of example, not limitation. It is to be understood that the invention is of broad utility and may be used in many different contexts.

Figure 1A:
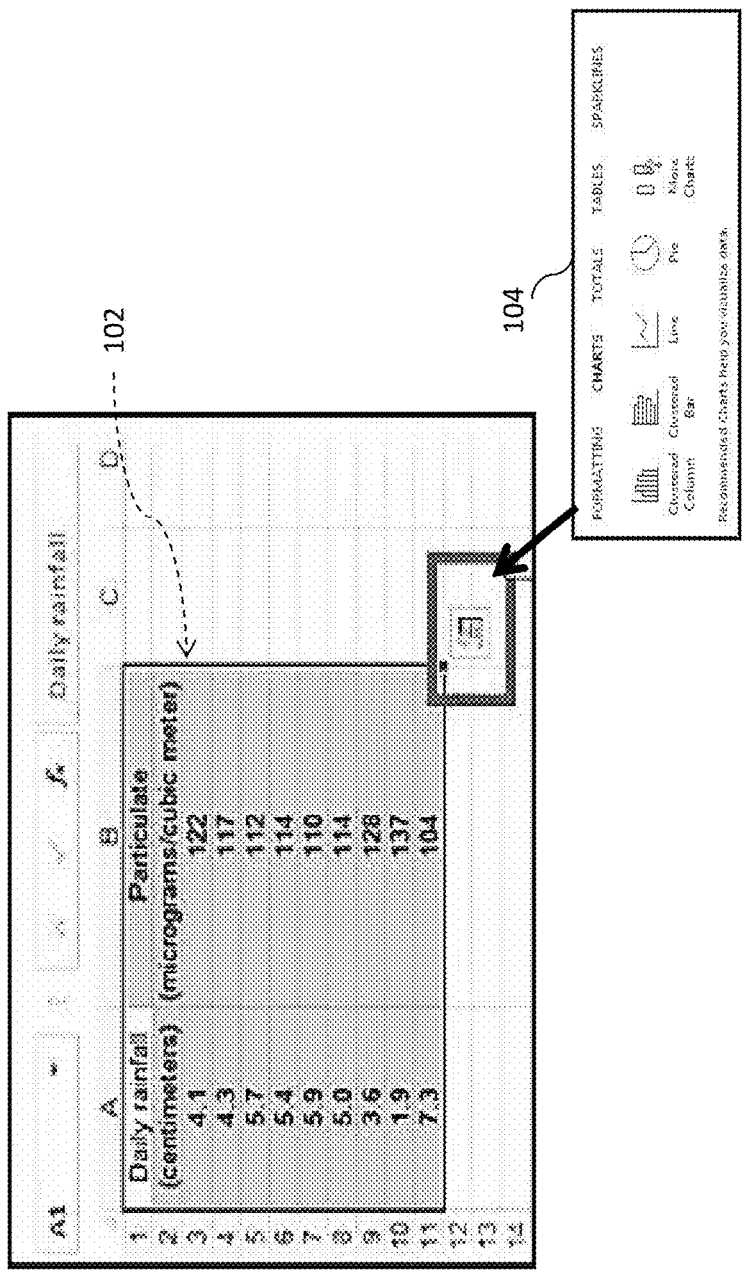
FIG. 1a is an illustrative view of method for creating graphs disclosed in the background of invention.

FIG. 1a illustrates a method used in current systems or processes for graphical representation of data. In current systems or processes the user first needed to define a range of data by selecting (102) the array of data for which a graph is required. After defining the range the user further has to select the appropriate graph type (104). This process is tedious and time consuming. The embodiments of the present invention are configured to analyze the data and to instantaneously create Info-graphical representations as the user's selection moves from one cell to another cell.

Figure 1B:
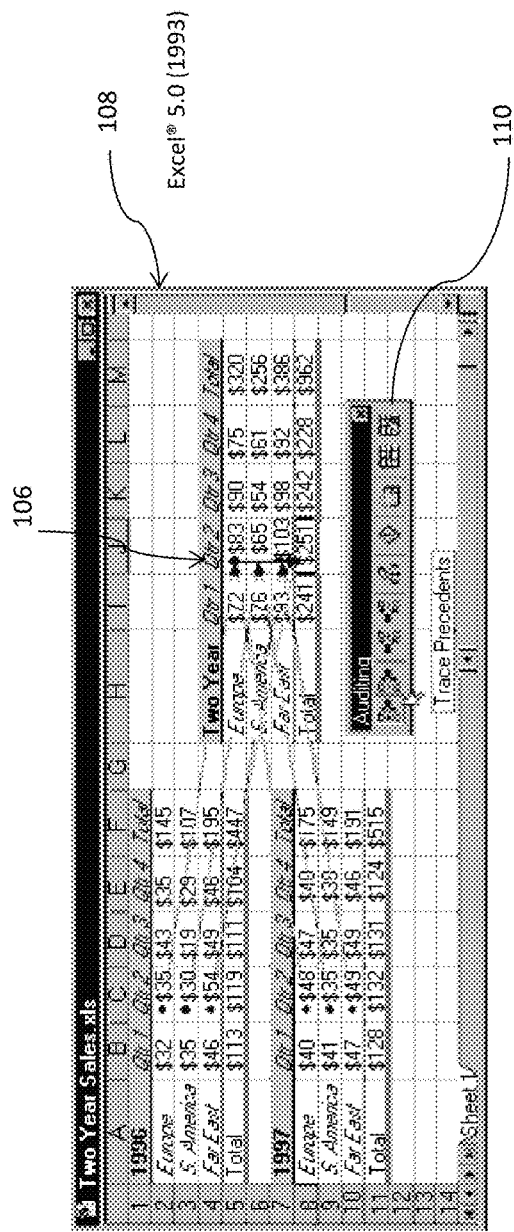
FIG. 1b is an illustrative view of method for evaluating each cell's calculation rule for the purpose of determining the calculation tree disclosed in Excel® 5.0 (1993)
Figure 1B:
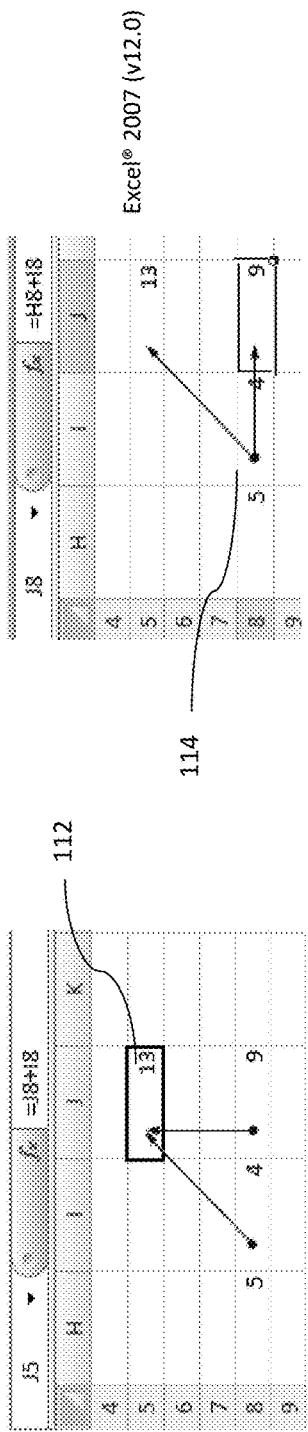

FIG. 1b illustrates a method used in current systems or processes for performing the audit (110) and analysis process of each cells formula being broken down into discrete elements (108). In current systems or processes each cell can be seen in relation to other cells directly referred to in the formula called precedents (112) or those cells that refer to the focus cell called dependents (114). The relationships are not clear and require skill to interpret. This process does not provide a method for presenting the discrete elements in context of surrounding meta-data. The embodiments of the present invention provide a method for the interaction of the discrete elements and the surrounding meta-data being associated through row Labels and column Headers as well as adjacent and related cells in the same row or column as the discrete element in an instantaneous dynamic graph generating tool.

Figure 1C:
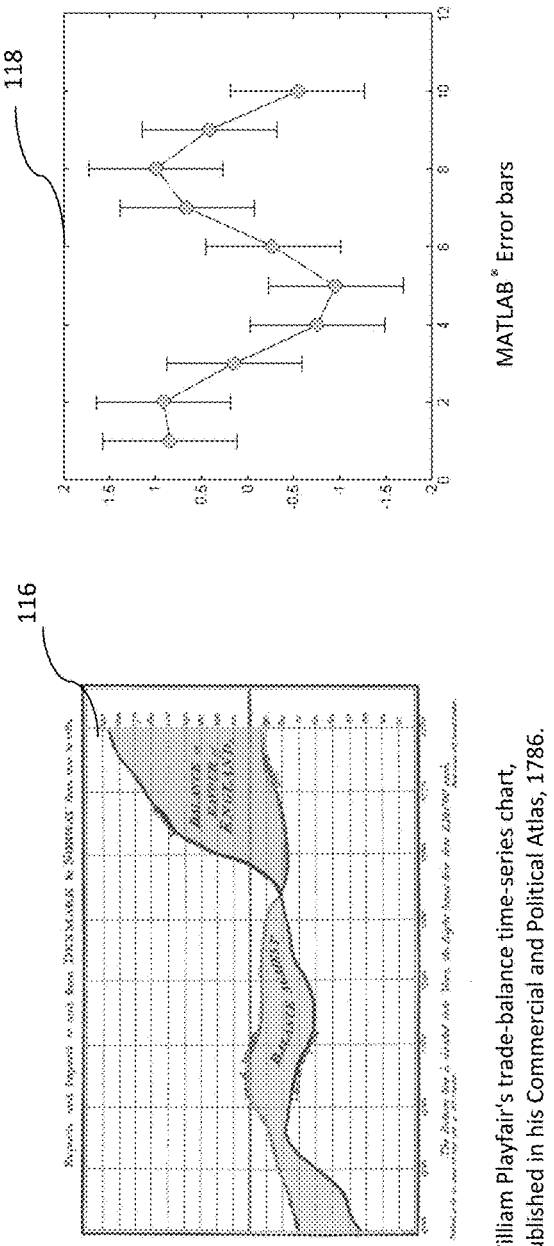
FIG. 1c is an illustrative view of graphical methods in conjunction with error analysis to provide a means for identifying errors.
Figure 1C:
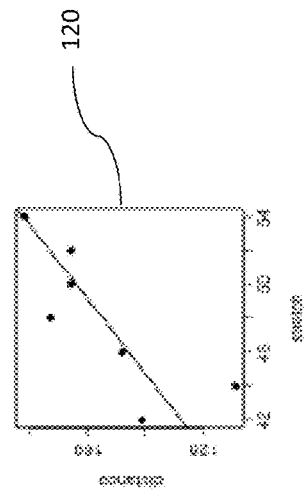

FIG. 1c illustrates a graphical method used in current systems or processes to provide a means for identifying errors. FIG. 1c shows work from William Playfair (116) in a 1786 publication to extracts from MATLAB® (118) & R (120). In current systems or processes statistical methods are used as per the use of error bars (118) as a graphical representation of the variability of data used on graphs to indicate the error, or uncertainty.

Figure 2:
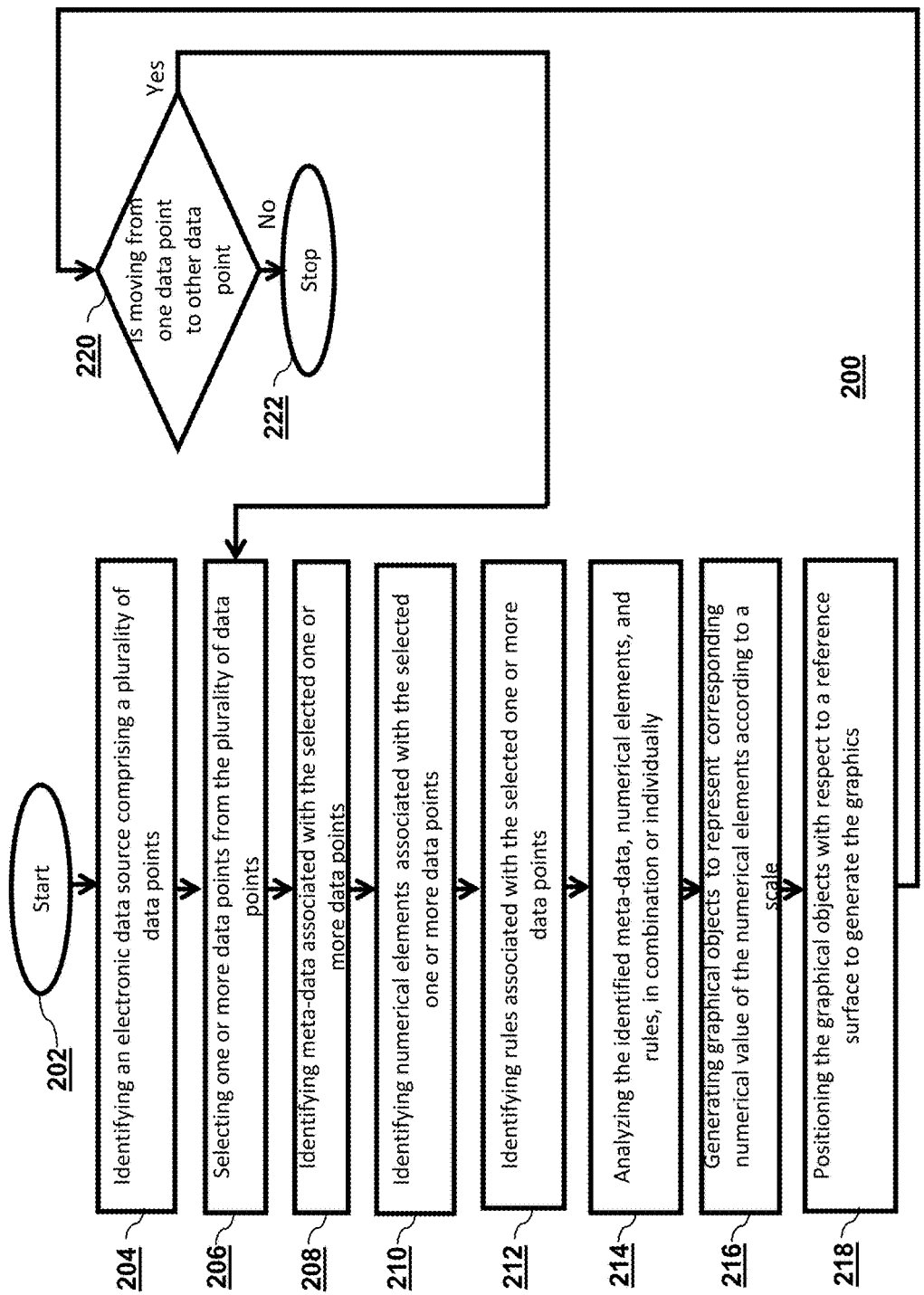
FIG. 2 is a flow chart representing a method in accordance with an embodiment of the present invention.

As depicted in FIG. 2, an embodiment of the present invention provides a method (200) for generating graphics on a computing device. The method (200) initiates at the step (202). In step (204), the system identifies one or more electronic data sources comprising a plurality of data points. The data point may include one or more of a single data points, a block of data points, a highlighted area in an electronic document, a screen grab, data in tabular form, graphical data, and textual formatted data. The data points may be visibly distinguishable or hidden or both visibly distinguishable and hidden. In step (206), the system selects one or more data points from the plurality of data points. The selected one or more data points are the data or meta-data against which a graphic is needed. Afterward, in step (208), the system identifies the meta-data associated with the selected one or more data points. Herein, the meta-data refers to the plurality of data about or related to the selected data. It may include information about certain content; for example, the length, depth, resolution, time, date etc. In step (210), the system identifies numerical elements associated with the selected one or more data points. Further, the system identifies rules associated with the selected one or more data points. The rules are generally a plurality of relationships with respect to the meta-data and its type, each relationship comprehending a reference to at least one numerical element value. It should be noted that there is no limit to the rules to follow for the meta-data and the corresponding numerical element value when creating a graphical visualization. In a further step (214) the system Analyzes the identified meta-data, numerical elements, and rules, in combination or individually. In step (216) the system generates the graphical objects to represent corresponding numerical values of the numerical elements according to a scale. The scale of graphical object may be defined by the system itself or the system is configured to allow the user to manipulate the scale. Afterwards in step (218) the system defines the positions of the graphical objects with respect to a reference surface to generate the graphics or take the user's input or both. The system is further configured for instantaneously generating the graphical objects, such that visual properties of the graphical objects represent corresponding numerical value of the numerical elements according to a scale. Further, in step (220) if the user wishes to continue the selection, the system is configured to perform one or more, or all the steps from step (206), otherwise the system stops at step (222).

Figure 3A:
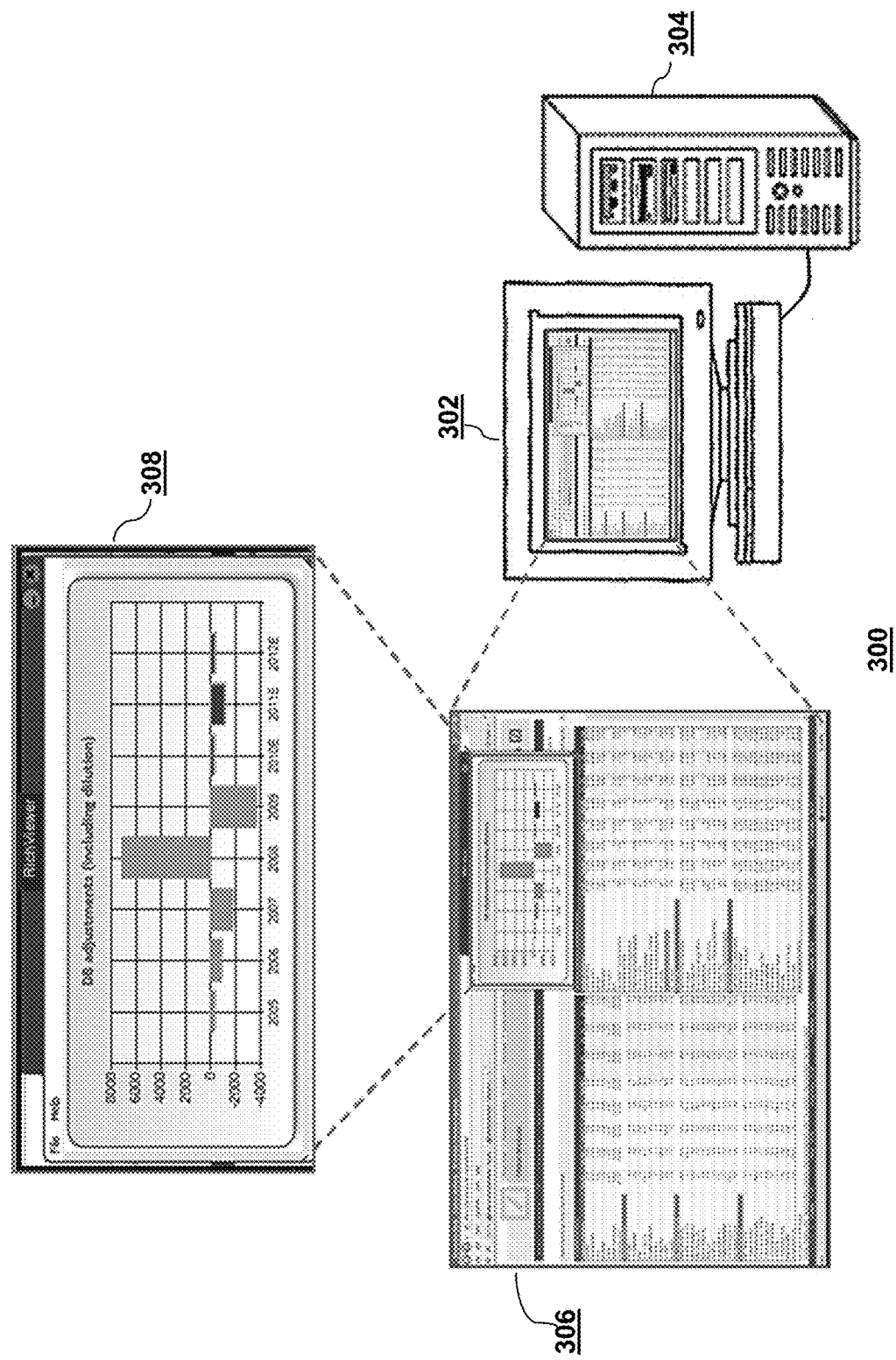
FIGS. 3a-3b are illustrative views of a system in accordance with an embodiment of the present invention.

At least one embodiment of the present invention also relates to a system for performing the above mentioned steps. This system may be a dedicatedly built system for performing the method (200) or it may comprise a special purpose computer selectively activated and/or reconfigured by a computer program stored in the computer. In an embodiment of this invention as depicted in FIG. 3a, the method (200) is performed as a result of a computer program product implemented on a computer system (302) having a processor (304). The processor (304) comprises or is otherwise coupled to at least one non-transitory computer-readable storage medium having computer-readable program code portions stored therein. The system is configured to take inputs from users and provides an interactive graphical interface. In the embodiment, the graphical interface allows the user to make a selection and to analyze the data instantaneously. For example, the data (306) in this case being a web browser page but could also be any other desktop applications such as, but not limited to, a spreadsheet, email program, PDF file, third-party business intelligence tool or other product that is displayed on the system (302), and the system (302) instantaneously visualizes the graph (308) corresponding to the selected cell and the meta-data related to the selected cell.

In other embodiments of the present invention, various special purpose devices may be used for performing the method (200), for example, mobile devices, smart phones, tablets, virtual devices such as holograms, and others now known or later developed, or other application specific specialized apparatus can be constructed to perform the required acts of the method. The tool(s) described herein are voluntarily called RichViewer. RichViewer may also be configured to open with applications such as but not limited to a web browser, spreadsheet, email program, document editor, PDF file, third-party business intelligence tool or other product.

An embodiment of the present invention is configured to interrogate data in any format starting with but not limited to tabular, graphical, or textual formats that are available or visible to the user on any system as mentioned above. The method (200) implementable on the system (302) can recognize one or more databases and applications inheriting the data points in it and is also able to search for available and hidden data including Headers and Labels.

In an embodiment of this invention, the method (200) implementable on the system (302) explores the relationships within the non-visible data inside the application and also within the other versions of the data/applications which may be contained in but not restricted to spreadsheets, PDF files, remote data sources, web-based databases etc. In another embodiment of this invention, the method (200) implementable on the system (302) allows open-source application interfaces for searching external services, such as in-house data warehouses.

Figure 3B:
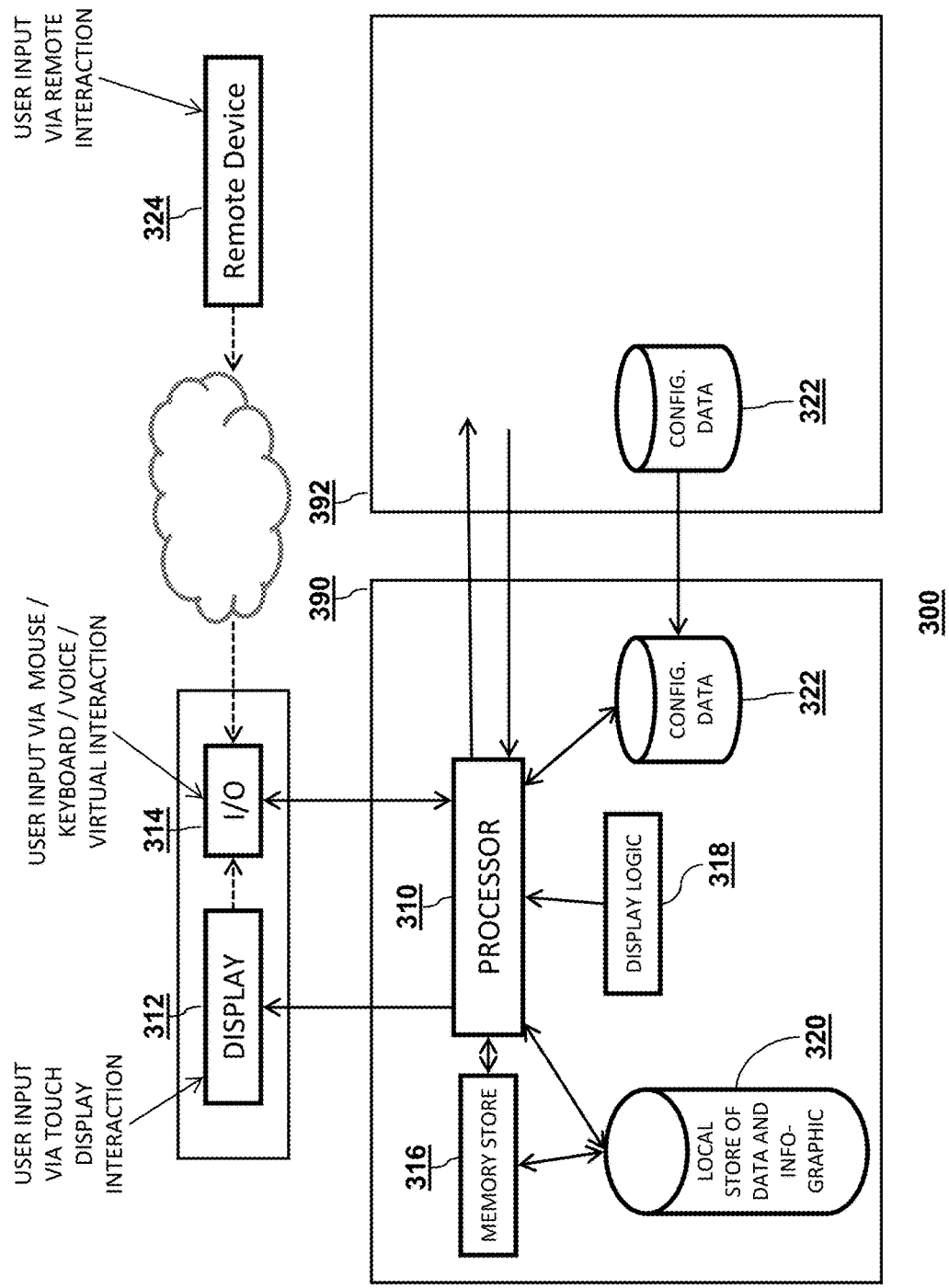

FIG. 3b is an illustration of the data interaction, information retrieval, messaging system and communication network shown in further detail including interaction of a client system (390), an optional server system (392) and a display system (394) which includes user or system interaction.

As shown, client system (390) comprises a processor (310) and associated memory (316) for handling operations and a data local store (320) for storing method (200) results, underlying dataset, applied rules and display logic for Info-graphical representations locally (components may also be stored and accessed server-side (392)), logic (318) as embodied in methods (200, 920, step 926 to step 938,1200, 1600, 1700, 1800, 1900, 2000) and storage for configuration data (322) if not stored on server system (394) configuration data (342).

As shown, server system (392) comprises a processor (330) for handling operations, logic (338) as embodied in methods (200, 920, step 926 to step 938,1200,1600, 1700, 1800, 1900, 2000) and storage for configuration data (342).

As shown, display system (394) comprises a display (312) or remote device (324) and I/O (314) for user interface, where each of these component devices may accept user interaction. The input to these devices may be through keyboard or mouse or pen interaction as well as touch on display (312) or human gestures or from a remote device (324) across one or more networks (326) and one or more devices coupled to the network (326) that cause the I/O (314) to work with the processor (310) to implement method (200) of the present invention. The display (312) being an interface screen and the remote device (324) if used for display and therefore also able to be an interface screen could be in the form of a desktop personal computer, Workstation, laptop, PDA (personal digital assistant), cell phone, holograph presented through a wearable lens of or any other device capable of presenting an Info-graphical representation.

In a typical operation, processor (310) accepts user input performing the method (200) for generating graphics on a computing device. One example of performing the method (200) is for the user to interact with a web browser (306) to instantaneously visualize the graph on RichViewer (308) via the graphics chip on display (312) corresponding to the selected cell and the meta-data related to the selected cell, but other embodiments of the present invention might be used as well. In this example the operating environment identifies each form in an application by assigning it a handle in memory (316). Processor (310) transmits the handle from the associated memory (316) through messaging (328) of the web browser (306) to RichViewer (308) where messaging can be but not limited to windows messaging, DDE, TCP/UDP, HTTP, Service Bus Queues, or Semaphores with corresponding shared memory (316). RichViewer (308) through the processor (310) extracts the meta-data from the memory (316) associated with the web browser (306) based on configuration data (322) that might be of Style Financial and using the rules logic (318) determines that the header data is of date form where the rules logic is to examine the dates as historic and forecast dates and that being the case color codes historic data separately to forecast data (308). Another part of rules logic (318,338) is for the client processor (310) or the server processor (330) to execute a Labels (904) lookup in client configuration data (320) or server client configuration data (320) to associate the Labels (904) to predefined Keywords based on the Style of User (901) or user supplied Keywords. The processor (310) using rules logic (318) applies these Keywords to the local store of data (320) which causes the instantaneous visualization the Info-graphical representation on RichViewer (308) via the graphics chip on display (312) being an interface screen which could be in the form of a desktop personal computer, Workstation, laptop, PDA (personal digital assistant), cell phone, holograph presented through a wearable lens of or any other device capable of presenting an Info-graphical representation.

Figure 4:
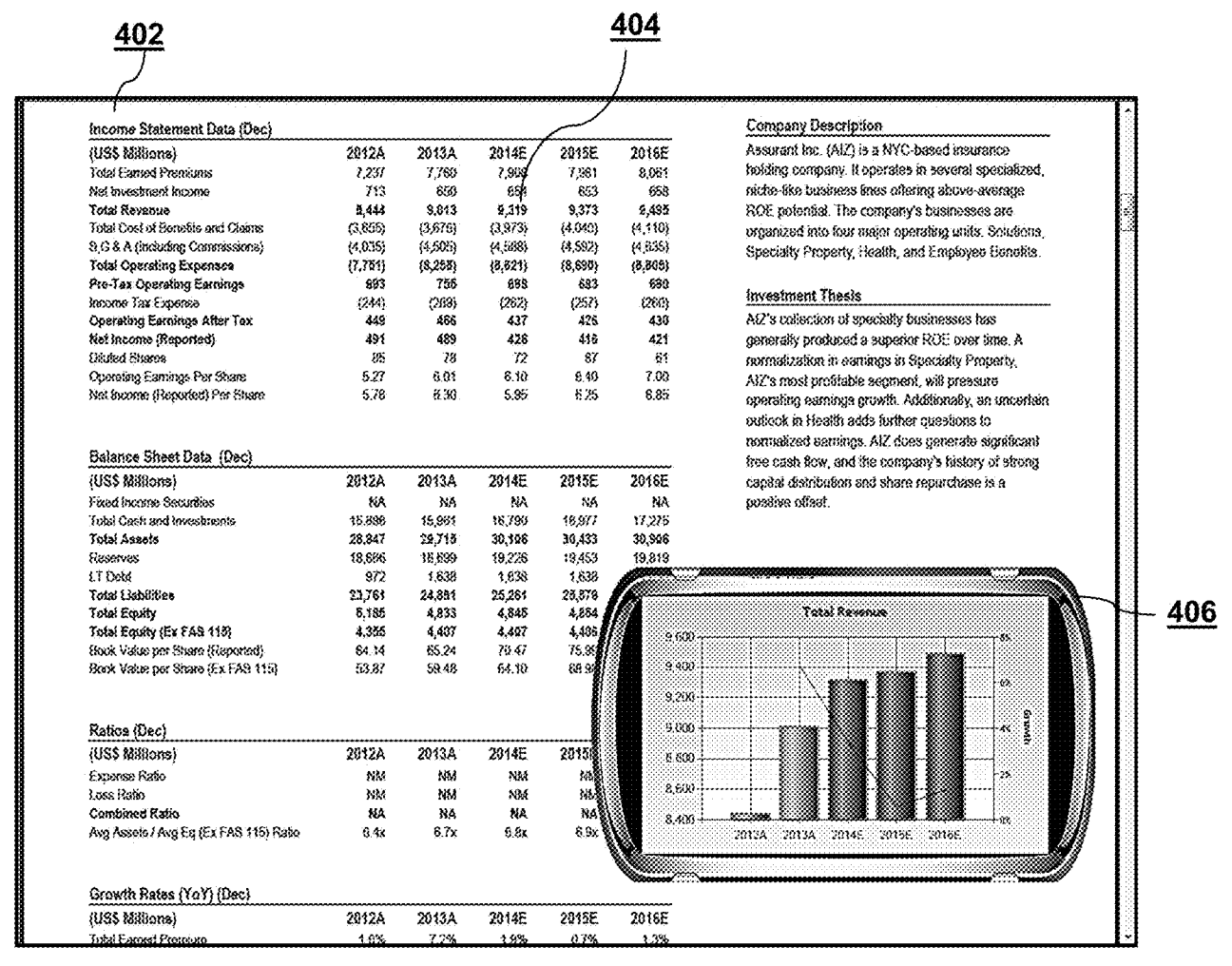

As illustrated in FIG. 4, the method (200) implementable on the system (302) enable the graphical visualization of data shown in a PDF format (402), as the user moves the cursor towards a single data block (404), the system recognizes the data and shows the graph (406) corresponding to the numerical element values associated with that data block.

Similarly, in other embodiments of the invention, the method (200) implementable on the system (302) is configured to identify the data, numerical values associated with the data and rules acceptable in other formats as mentioned above.

An embodiment of the present invention provides a mechanism for selection of data for bringing data to life with instant gratification and touch. To instantaneously visualize the graph associated with data, the user just needs to move the cursor to the cell, the system will immediately show the related graph. An exemplary embodiment for the ready understanding of a person skilled in the art is shown in the FIGS. 5a, 5b, 5c and FIG. 5d.

Figure 5A:
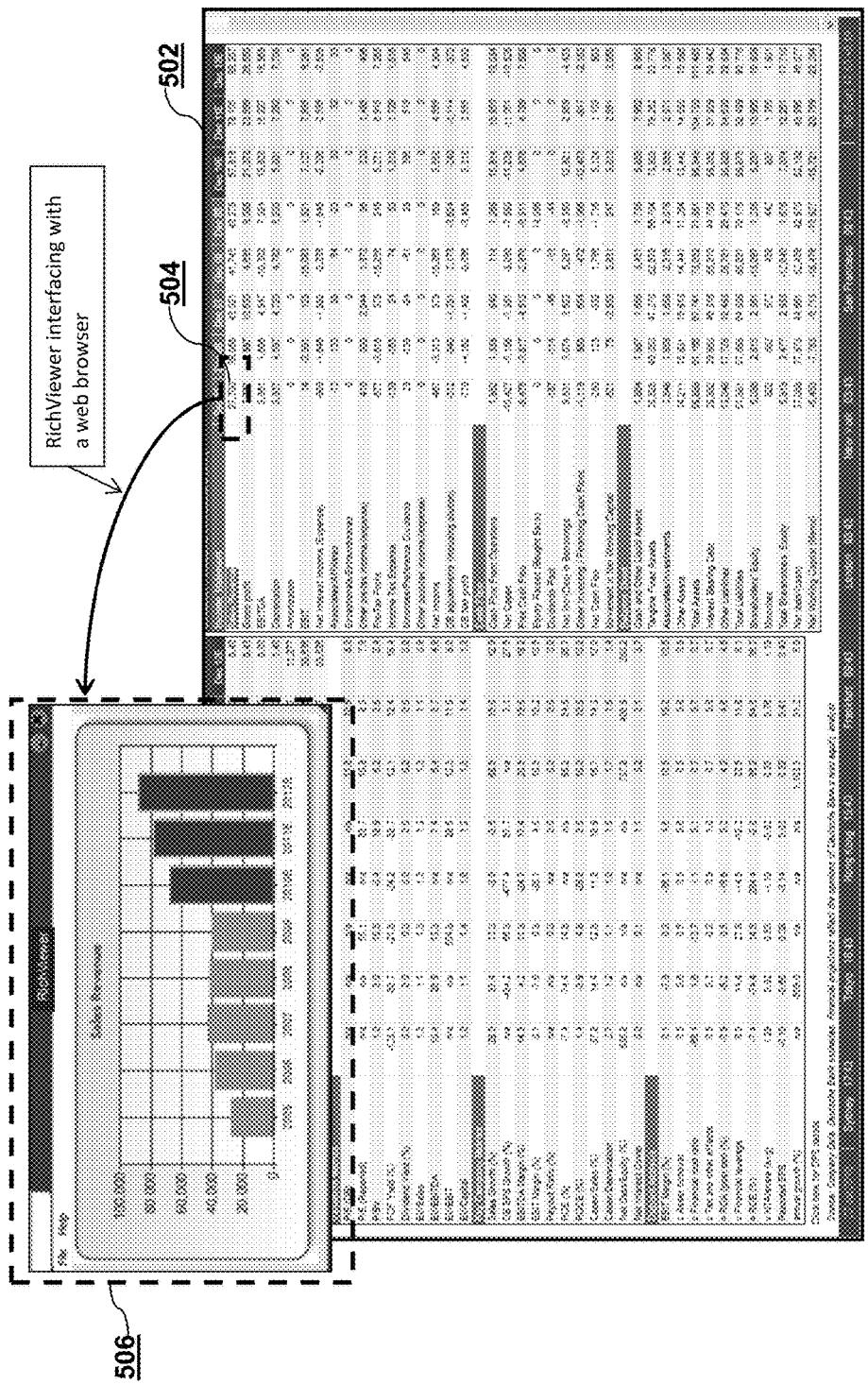
FIG. 5a is an illustrative view of a method for graphical representation of data of selected cell in accordance with an embodiment of the present invention.
Figure 5B:
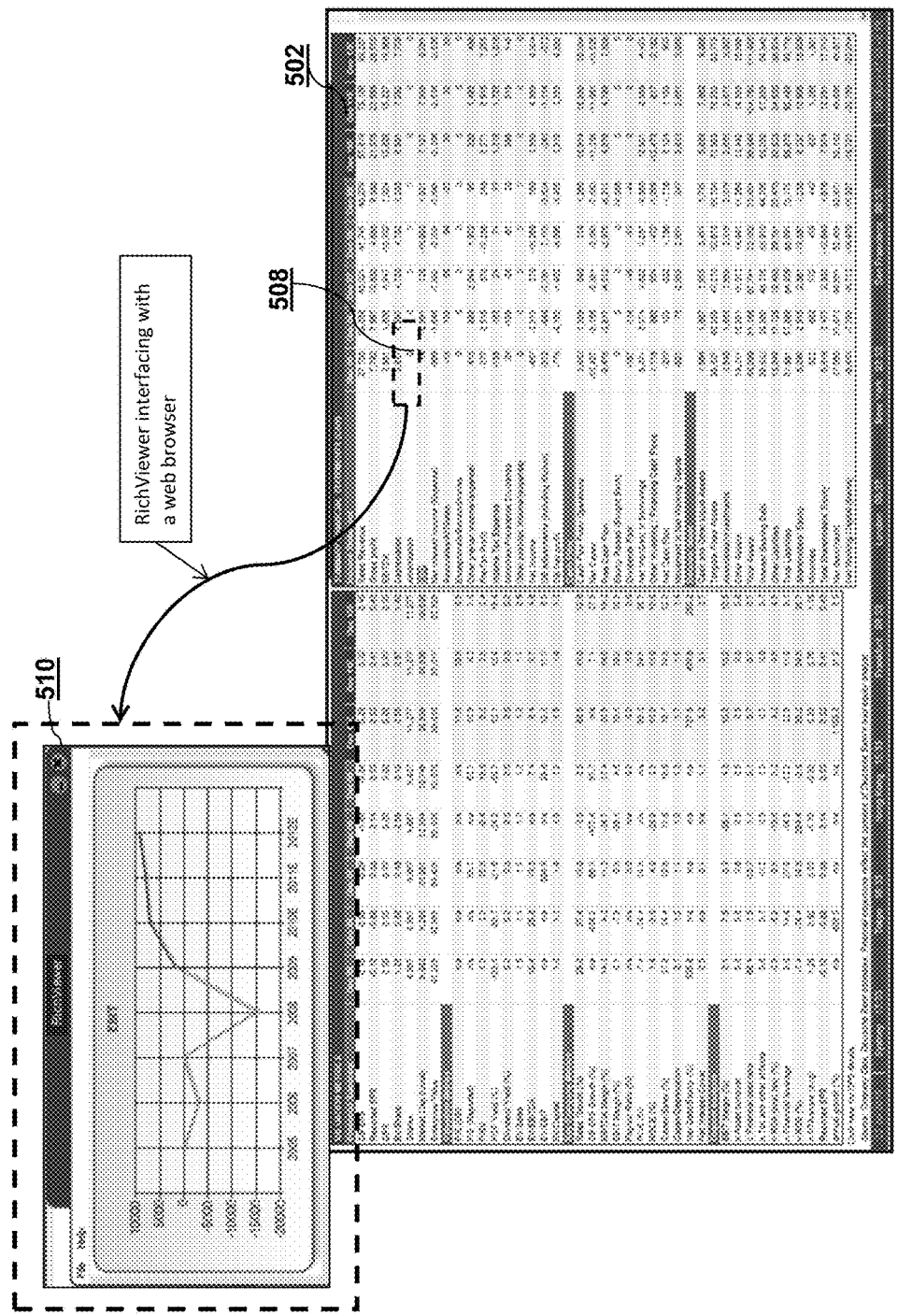
FIG. 5b is an illustrative view of a method for graphical representation of data of selected cell in accordance with an embodiment of the present invention.
Figure 5C:
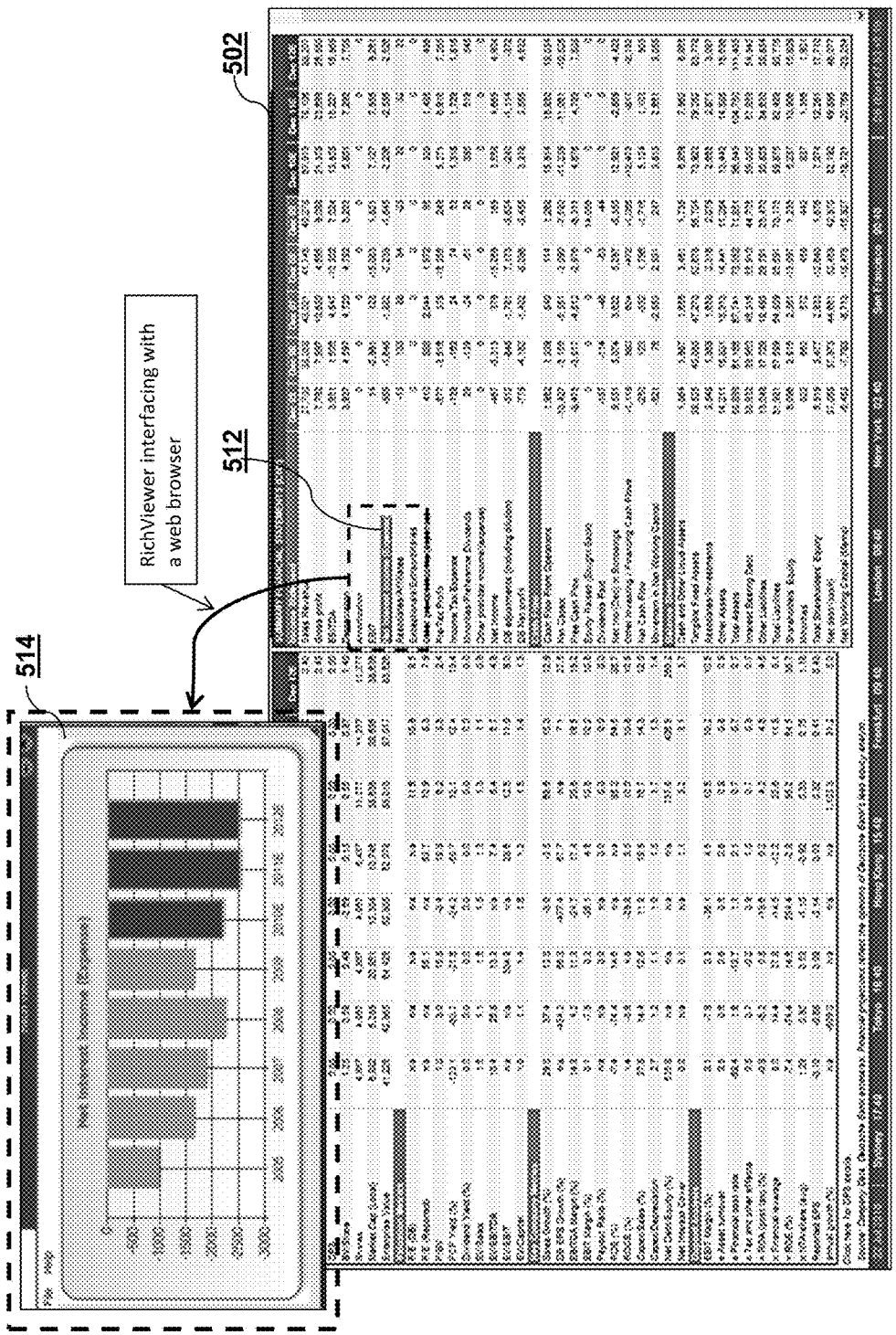
FIG. 5c is an illustrative view of a method for graphical representation of data of selected cell in accordance with an embodiment of the present invention.
Figure 5D:
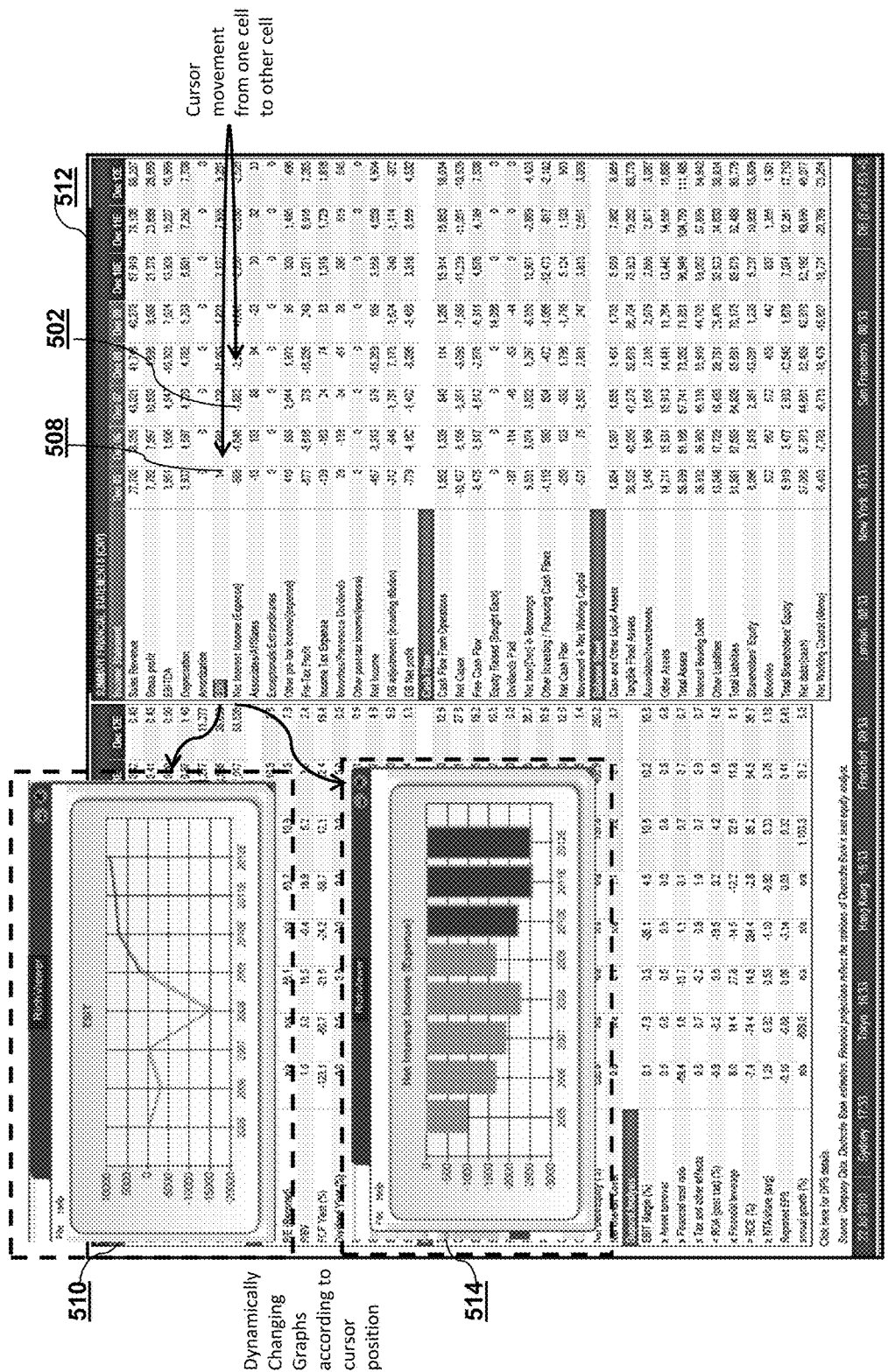
FIG. 5d is an illustrative view of a method for dynamically changing the graphical representation of data of selected cells in accordance with an embodiment of the present invention.

As depicted in FIG. 5a, when a user selects a cell (504) from a data set (502), the system will generate the graph (506). The system will automatically analyze the data type and will select the appropriate graph. In the exemplary embodiment, the graph (506) for Sales Revenue during the years 2005-2012E has been shown. Further, as illustrated in FIG. 5b, when the user scrolls down the cursor from cell (504) to cell (508), the system will generate the graph (510). In the exemplary embodiment, the graph (510) for EBIT during the years 2005-2012E has been shown. Similarly in FIG. 5c, the graph (514) for Net Interest Income corresponding to cell (512) during the years 2005-2012E has been shown. The FIG. 5d illustrates the dynamic changes in graph while moving from one cell (508) to another cell (512). As shown in figures the method implementable on the system is configured to instantaneously change the graph type in accordance with the selected data type.

Figure 6A:
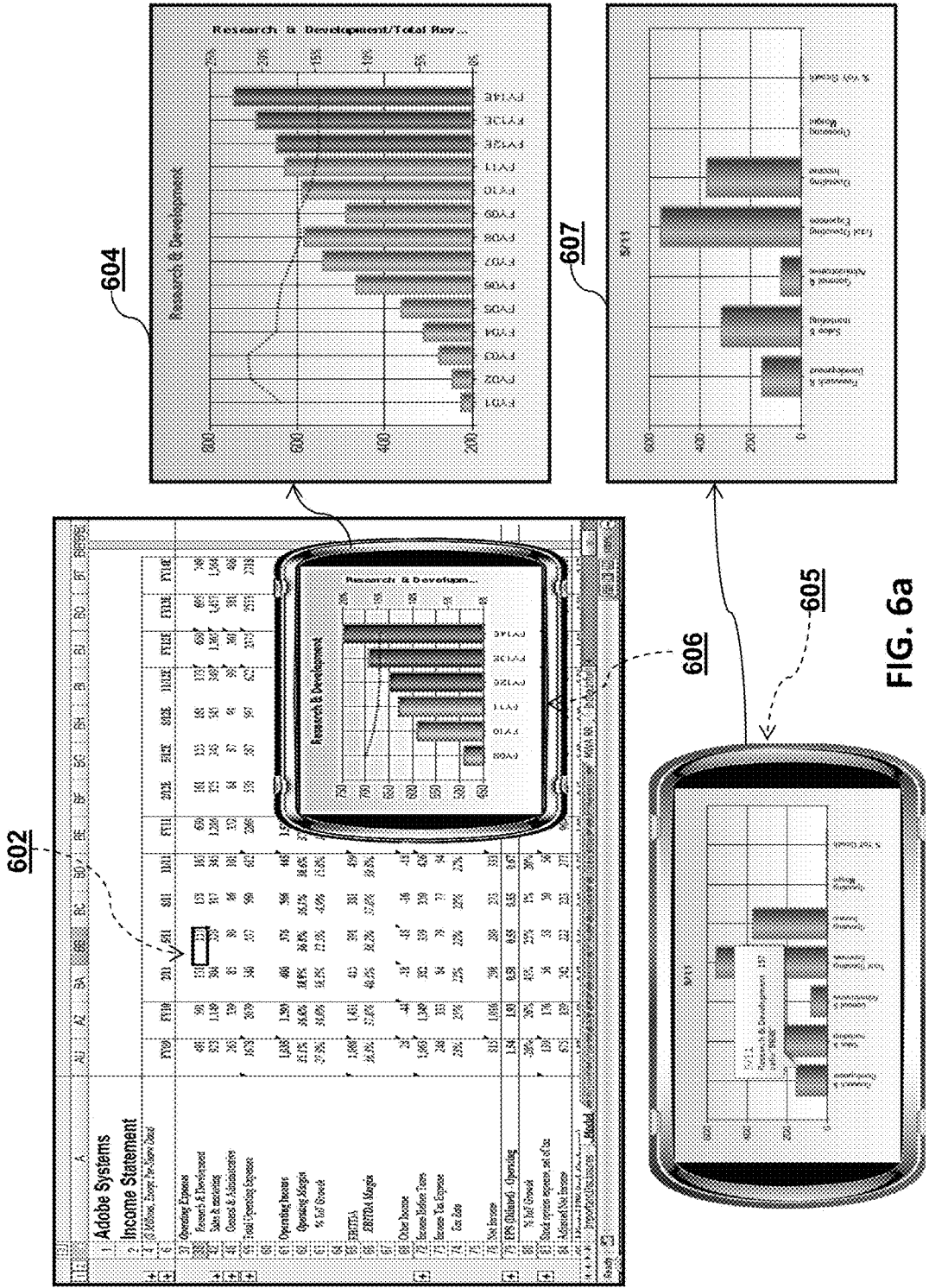
FIG. 6a is an illustrative view of a method for graphical representation of data of selected row of a spreadsheet document in accordance with an embodiment of the present invention.
Figure 9A:
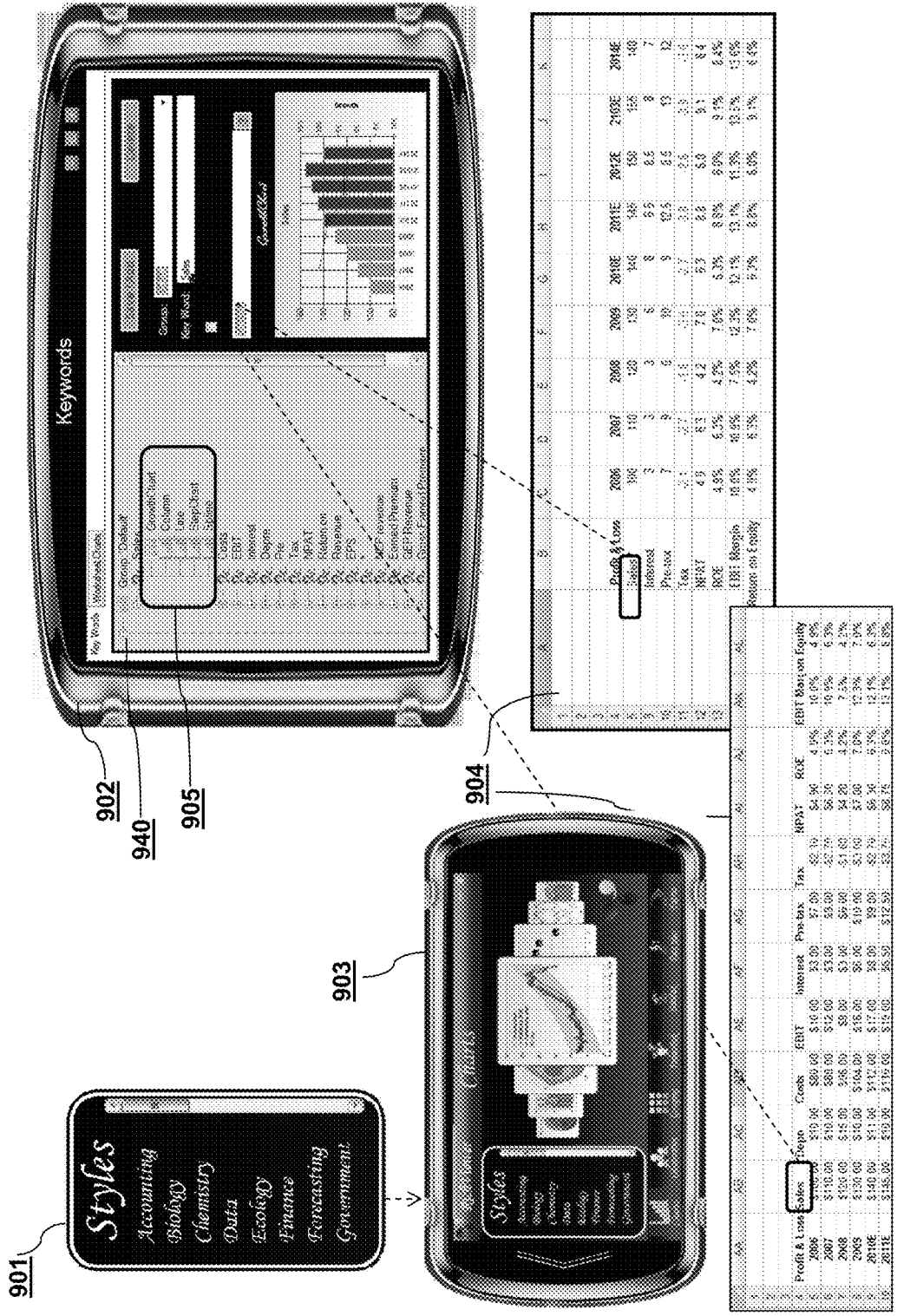
FIG. 9a is an illustrative view of RichViewer with customized Labels in accordance with an embodiment of the present invention.

In an exemplary embodiment of the present invention, as depicted in FIG. 6 when the user selects "Cell BB38" (602); it should be noted that the selection may include the waving of the mouse over the point in this context. The system will find the Header row which is made up of dates and can recognize quarters and annual selection of dates. So the system is able to recognize the dates containing the relationship beyond time series that are generally required in a stock price chart. The method implementable on the system may choose to present annual data, in the embodiment of the invention (610) or the user can override the annual data (612,614). In the exemplary embodiment, the method implementable on the system examines the Label "Cell A38" with the value of "Research & Development". The method implementable on the system further checks for the relationship between that Label and output types. In this case, the system has chosen a column chart on the left axis. The system records that the user has designated a special row in the spreadsheet block to which all other data relates. This row is voluntarily called the Pivot Row. In the case of a Profit & Loss statement, the user has marked "Total Revenue" as a special Pivot Row. So the system presents each year's "Research & Development" divided by "Total Revenue" on the Right Axis of a line chart. If there are multiple-rows of data, then the system would also pick up the surrounding rows with Row 38. FIG. 9a and FIG. 9b will make it apparent to any person skilled in the art that the system may have chosen multiple charts as shown in (905).

In an embodiment of the invention, the method implementable on a system is configured in such a way that if the chart is rotated (605), the system will provide the graphical representation of the data associated to the respective column. In the exemplary embodiment, if the chart is rotated, then the system would show Column BB (605,607) rather than Row 38 (606). In an embodiment of the present invention, if the user decides that the graph should pick up hidden data in Columns G to BT, then the chart would also show that data. The method implementable on the system thus analyzes the available relationships and presents them in a superior and unique form.

Figure 6B:
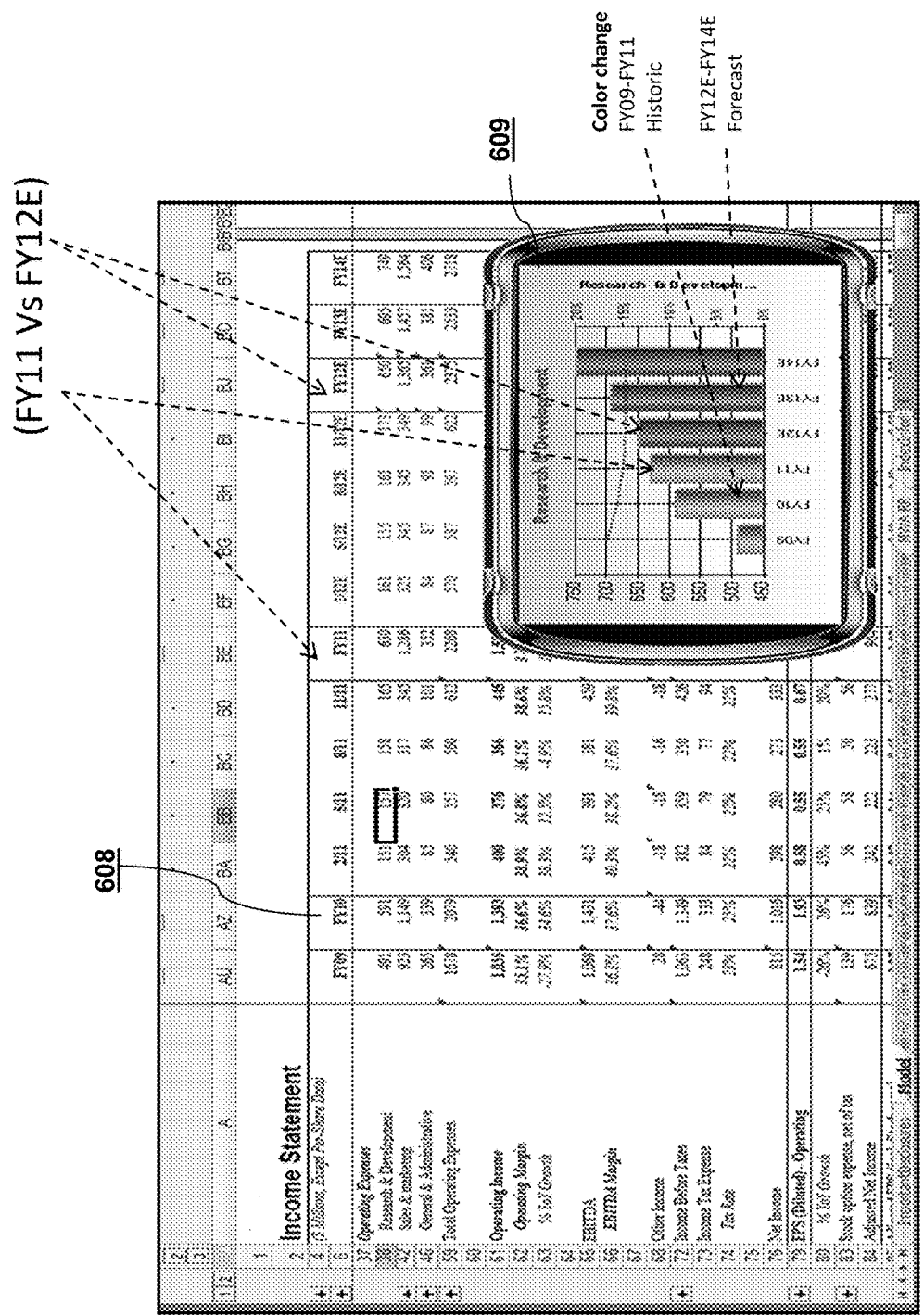
FIG. 6b is an illustrative view of a method for graphical representation of data of a selected row of a spreadsheet document in accordance with an embodiment of the present invention.

In an embodiment of the invention, as illustrated in FIG. 6b, the method implementable on the system is configured to extract relationships from Headers and Labels. In an exemplary embodiment the system recognizes that the Header (608) is made up of dates. The system extracts the relationship "Forecast versus History" and changes the resultant color in the chart after analyzing the Headers FY09 to FY11 as History being one color and FY12E to FY14E as Forecast or Estimate being another color (609).

Figure 6C:
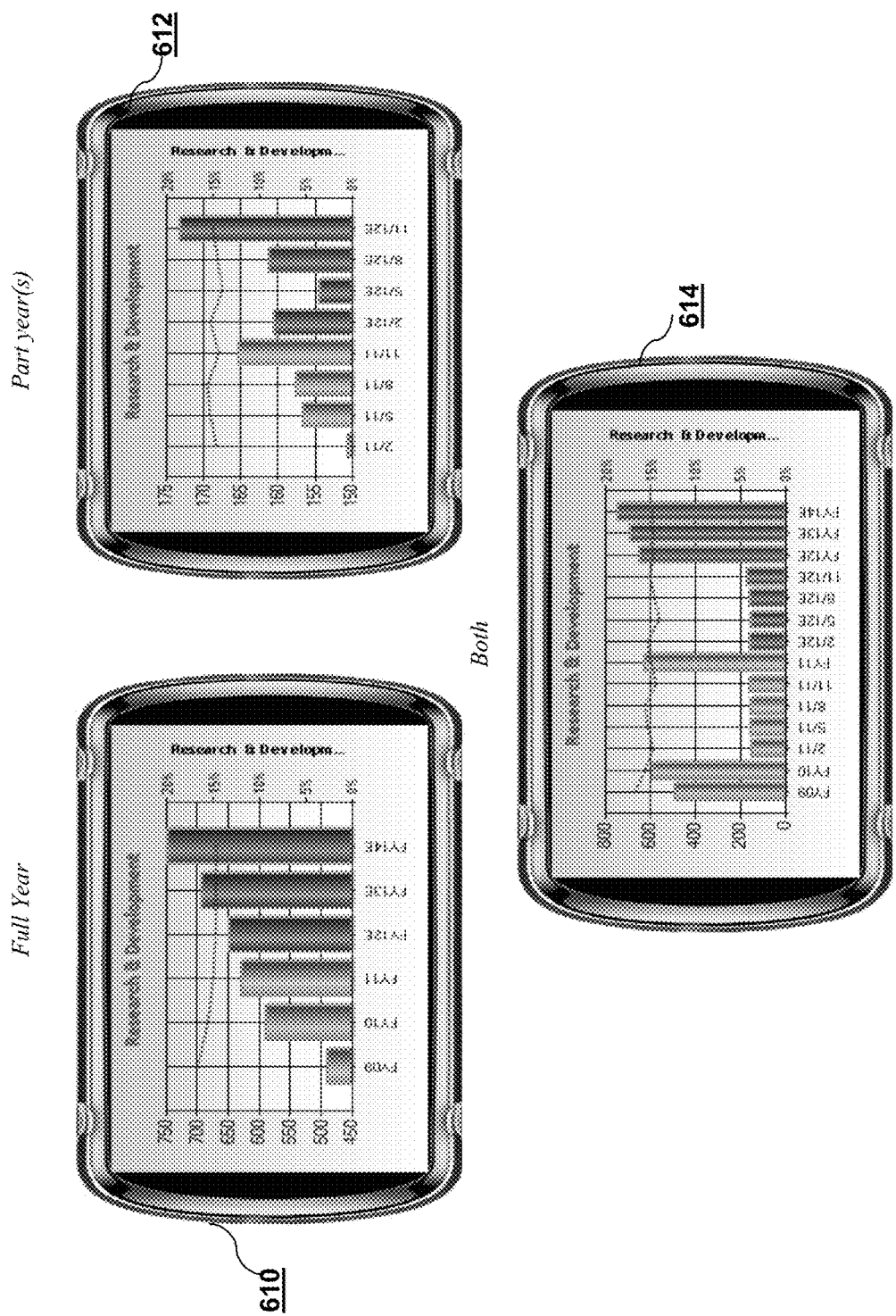
FIG. 6c is an illustrative view of a method for graphical representation of full year, part year or mixed data in accordance with an embodiment of the present invention.

In another embodiment of the present invention, the method implementable on a system is configured to distinguish the dates as a mix of full and part year and is able to present them appropriately as shown in FIG. 6c. In the exemplary embodiment of FIG. 6c, the graph for full year (610), part years (612) and mix graph for both (614) have been shown.

Figure 7:
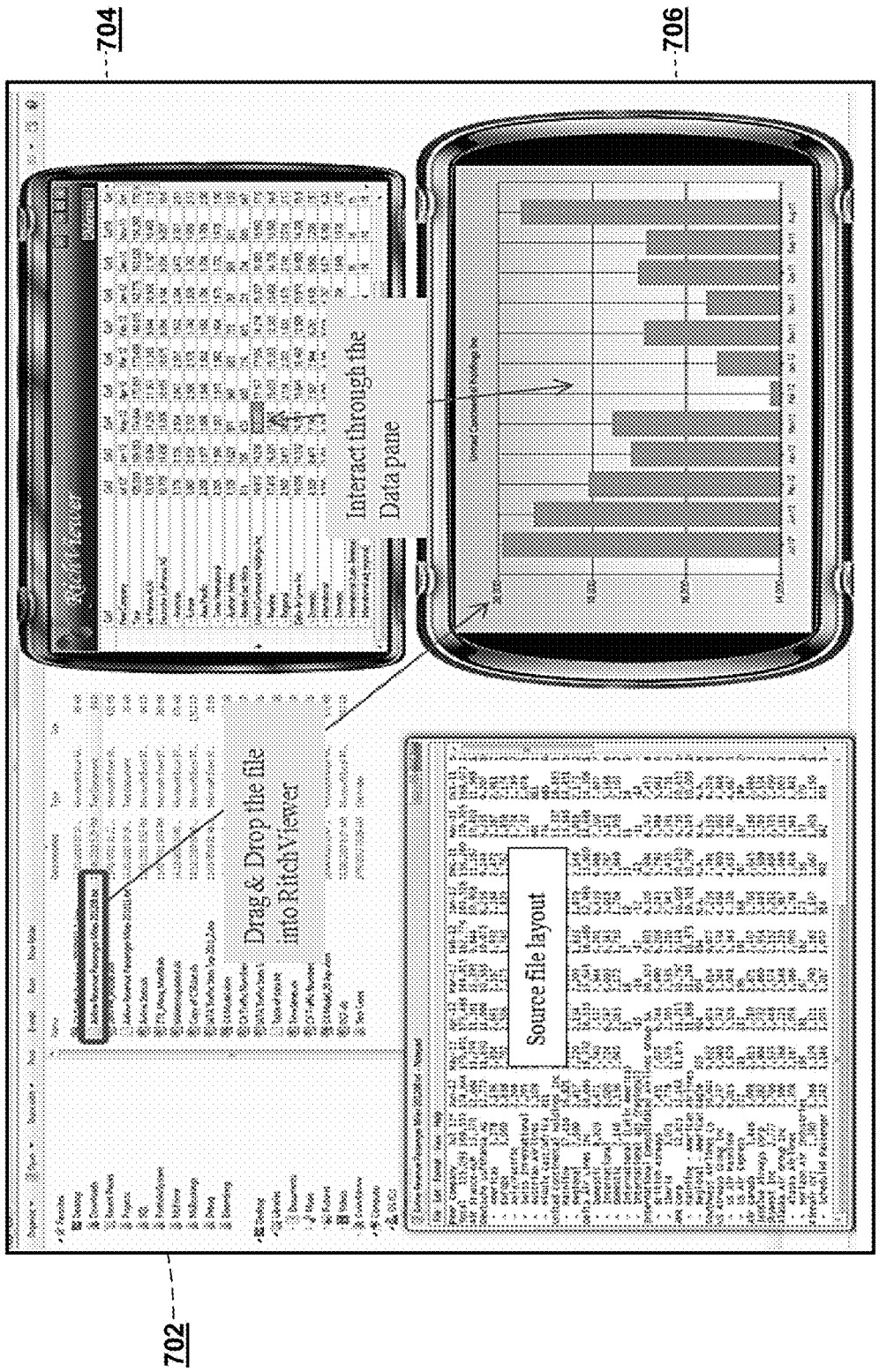
FIG. 7 is an illustrative view of the method for dragging and dropping a file in RichViewer for the graphical representation of data in accordance with an embodiment of the present invention.

In an embodiment of the present invention, the method implementable on a system allows the user to drop a file (702) into RichViewer (704,706) window as shown in FIG. 7. In the embodiment, a pop-up data selector (704) allows the user to walk through the data in the same way as they would with a spreadsheet. As the user moves up/down or across the displayed data the graph (706) changes depending on the data and the Label. The system is enabled for the exact interpretation of Headers and column Labels as they would appear on a spreadsheet.

Figure 8A:
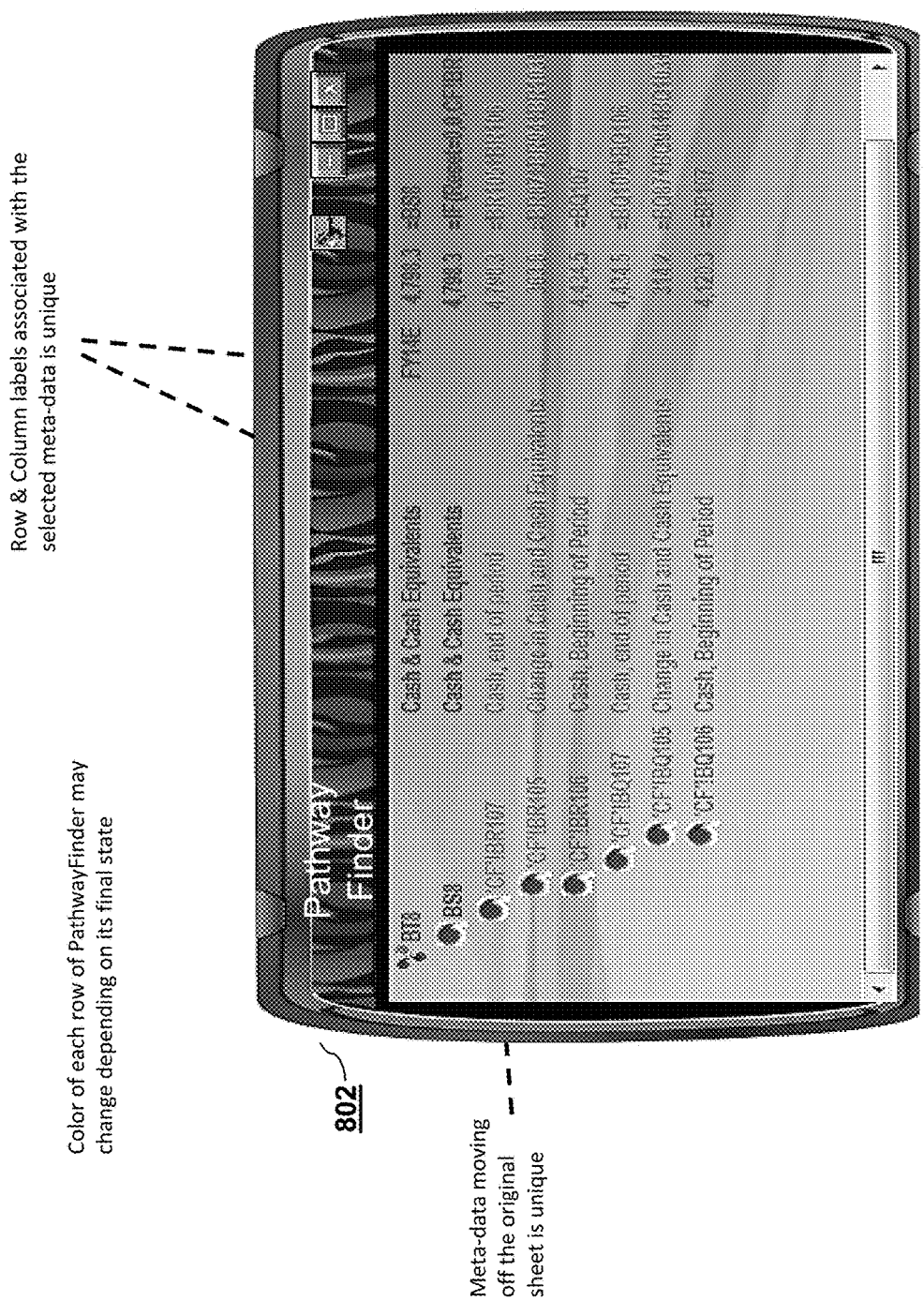
FIG. 8a is an illustrative view of PathwayFinder in accordance with an embodiment of the present invention.
Figure 8B:
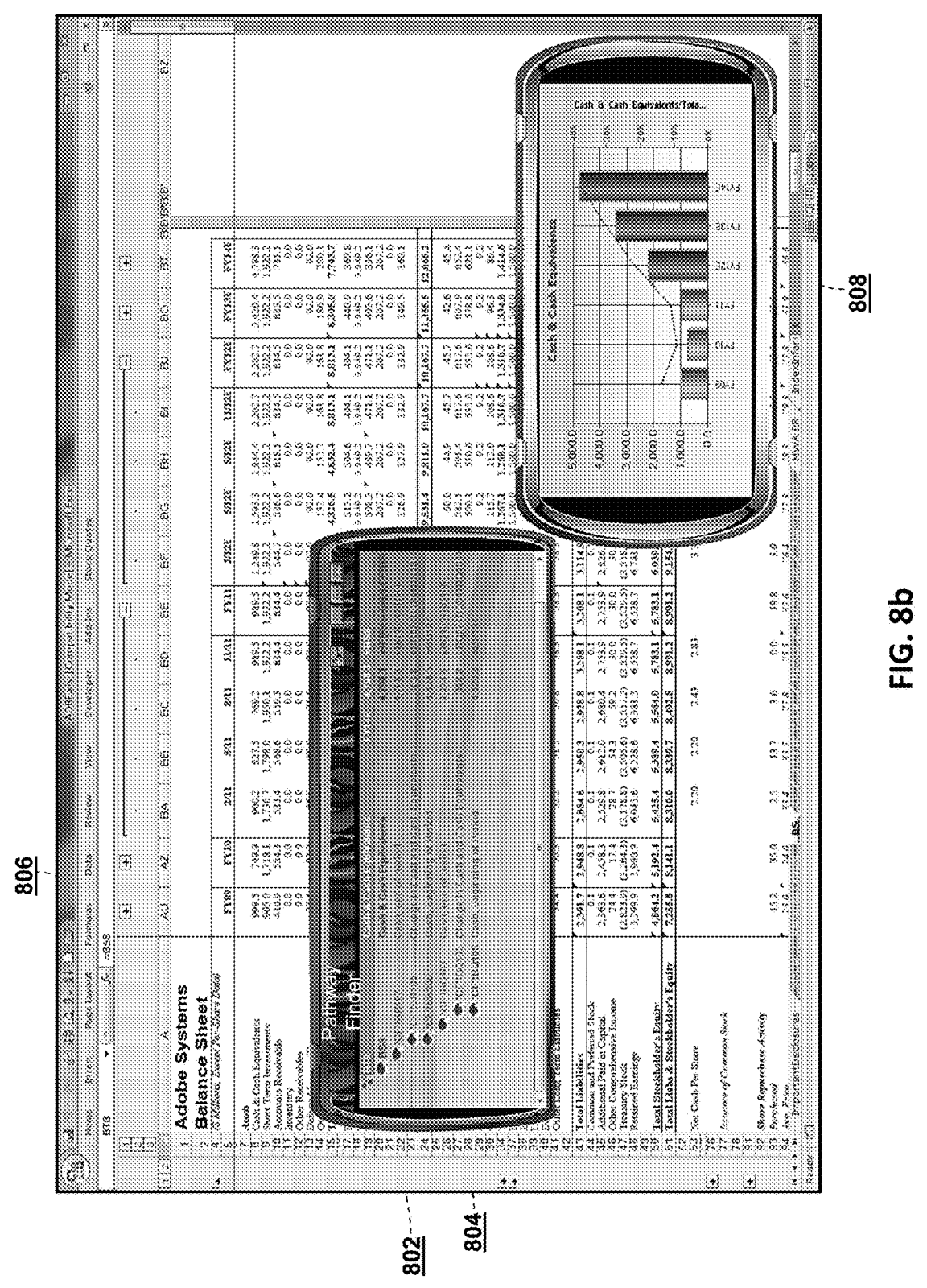
Figure 8C:
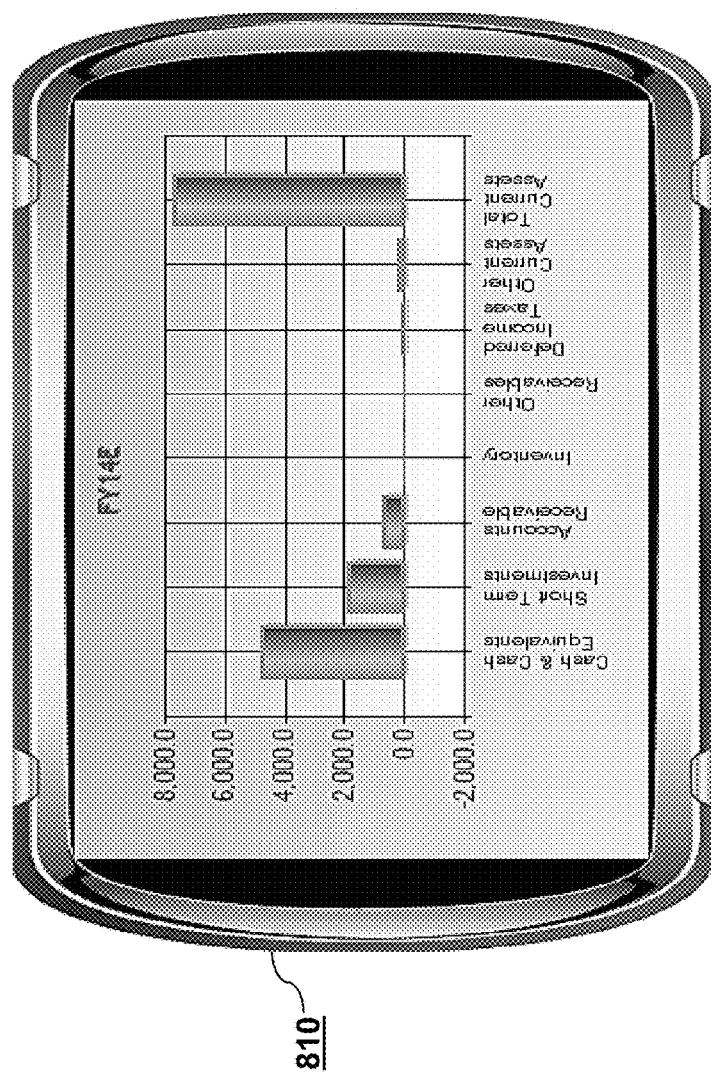
FIG. 8c is an illustrative view of the method of rotating graphical objects in accordance with an embodiment of the present invention.
Figure 8D:
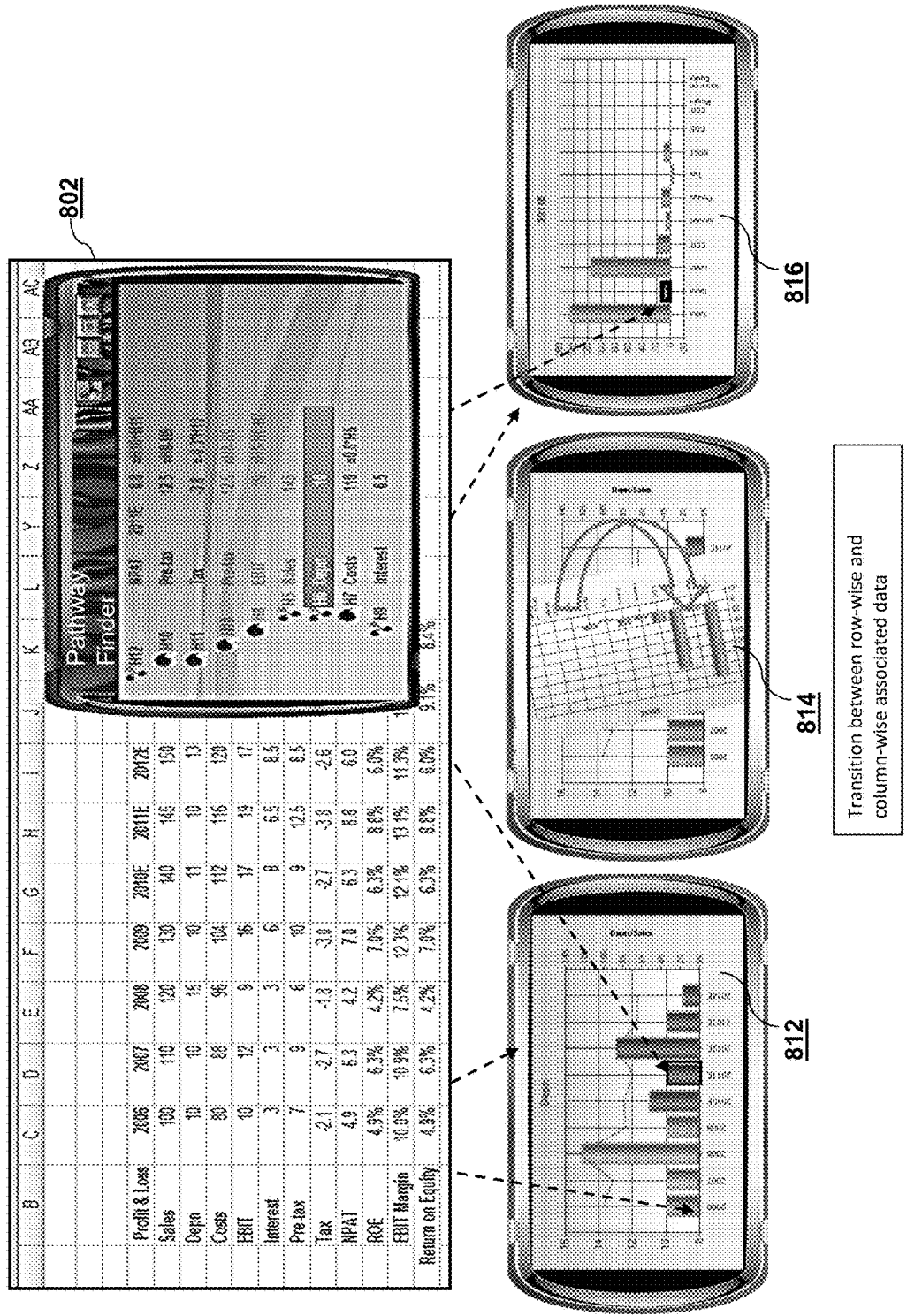
FIG. 8d is an illustrative view of PathwayFinder in accordance with another embodiment of the present invention.

In an embodiment of the invention, the system has a mechanism to drill-down into a formula associated with a data point and provide details corresponding to each component in the formula according to the contextual relationship with surrounding data points and other components of that formula and uniquely visualizes the relationship using RichViewer which visually presents that data point in context with the surrounding points and row Labels and column Headers associated with that data point taking into account the Labels and associated presentation format. No current systems or processes provides for showing the data point in a formula auditor or editor in context with the surrounding data points and Labels outside that formula or displays the surrounding data point in a graphical representation. The system incorporated with the mechanism to drill down is voluntarily called PathwayFinder (802). In the exemplary embodiment of FIG. 8(b), PathwayFinder (802) allows the user to navigate to the source data by a button or a right-click. If the user right-clicks over the row (804) with 'CF'!BR106 then PathwayFinder (802) will be directed towards the contents that the user will find in the Excel® Spreadsheet corresponding to that location. PathwayFinder (802) further allows the user to explore each component of the underlying data in context with its neighboring data points through a graphical representation (808). This makes PathwayFinder with RichViewer superior and unique. As depicted in FIG. 8c, if the user rotates the graph (808), then it will show the column data associated with FY14E instead (810). The user gets to see the data point in context with the points around it, again making PathwayFinder with RichViewer superior and unique. The graph also shows the associated data for 'Cash & Cash Equivalents' (808). The feature of exploring column Headers and row Labels along with cells, values and formulas makes the RichViewer superior and unique. Further, for ease of understanding, the exemplary embodiment of FIG. 8d illustrates the mechanism of exploring data through PathwayFinder (802) and allows for the precise graphical visualization of data (812), rotating the graph (814) and the rotated graph showing data associated with 2011E (816).

In an embodiment of the present invention, RichViewer can associate the Labels (904) to predefined Keywords based on the Style of User (901) or user supplied Keywords. These Keywords are matched against one or more display types (902). The Keywords can be full words or part words matches. The system is voluntarily called IntelligentCharts. In the exemplary embodiment as illustrated in FIG. 9a, RichViewer is customized to the column Labeled as "Sales" and enabled to generate different chart types (905). The FIG. 9b shows the various charts according to the customized Labels. The chart (906) being a Growth Chart, as per the Keywords (905); the left hand axis is the Sales Revenue; the Right hand axis is the year on year growth of Sales revenue, the relationship called Sales Growth is immediately obvious.

Figure 10:
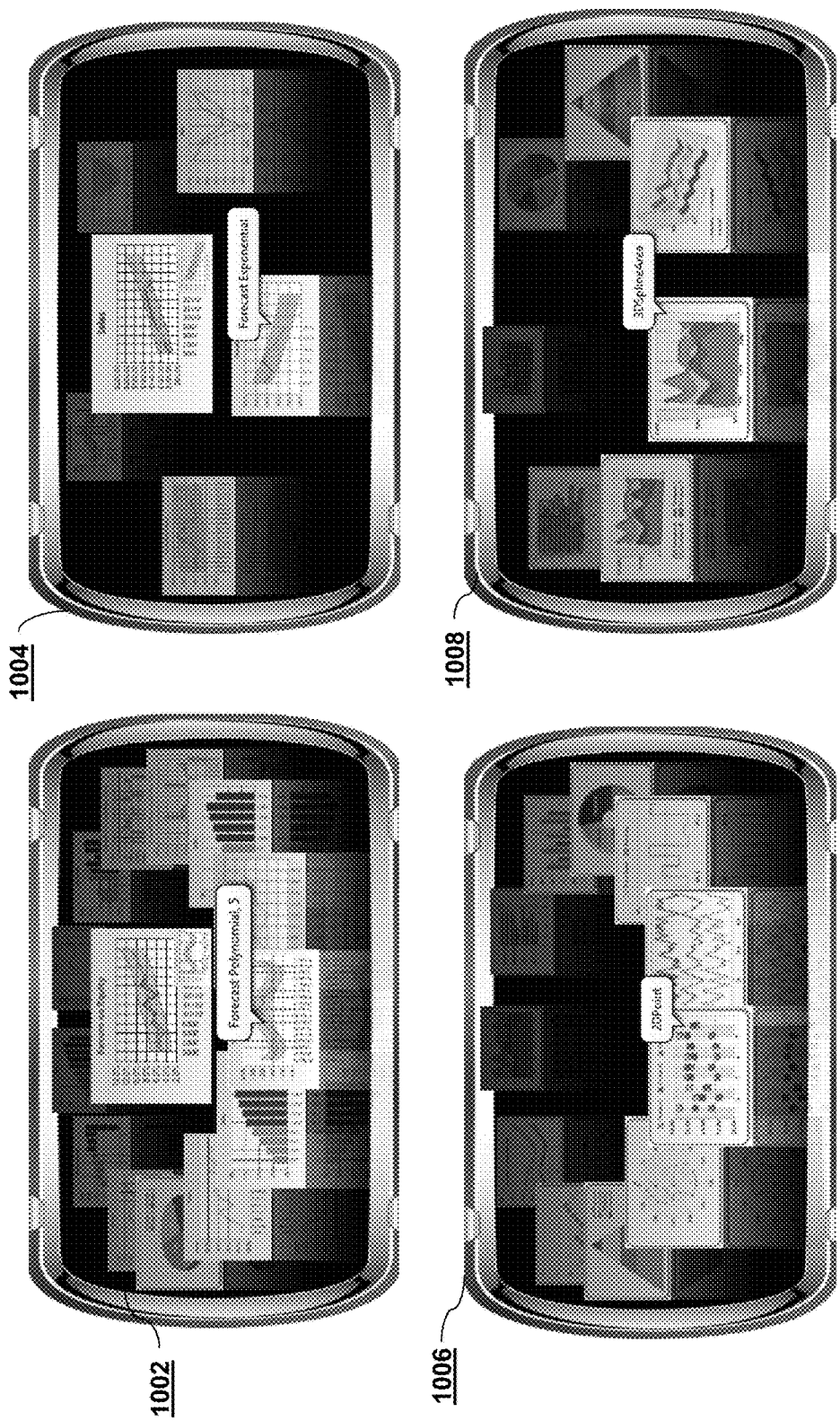
FIG. 10 is an illustrative view of RichViewer having various graphical representations in accordance with an embodiment of the present invention.

The process of instantaneously displaying Second Order relationships such as a Growth Chart is unique to RichViewer. In current systems or processes, the user must first create the series Growth to display a Growth Chart. Swiping the mouse left or right (907) moves through the charts (905). Other charts such as column, line (908) and step chart (910) can be generated. Multiple Info-graphical representations (905) associated with the Keyword or a data series is unique to RichViewer, current systems or processes have one series to one chart, or a user must select a chart type manually (903). Moving down the Keywords, the Pre-Tax chart (912) presents the left-axis as Pre-Tax profit and the right-axis presents the relationship between Pre-Tax and the series associated with the Label Sales as the Pivot Row. Specifically Pre-Tax pivots around Sales and supplies a relationship beyond the limited focus data of pre-tax to also present the Second Order relationship of pre-tax margins. Similarly, when the user moves to the row having the Label with the Keyword string "Margin", the left-hand axis shows the data in the row, whilst the two lines represent the Historic Average and the Forecast Average (914). When the user moves to the row having the Label with the Keyword string "Return on", the chart moves to a step-chart as the most appropriate way of presenting this data. In an embodiment of this invention as depicted in FIG. 10, at any time the user can change the chart using one of the chart groupings that have been specially created for each Style of User (901).

Figure 9C:
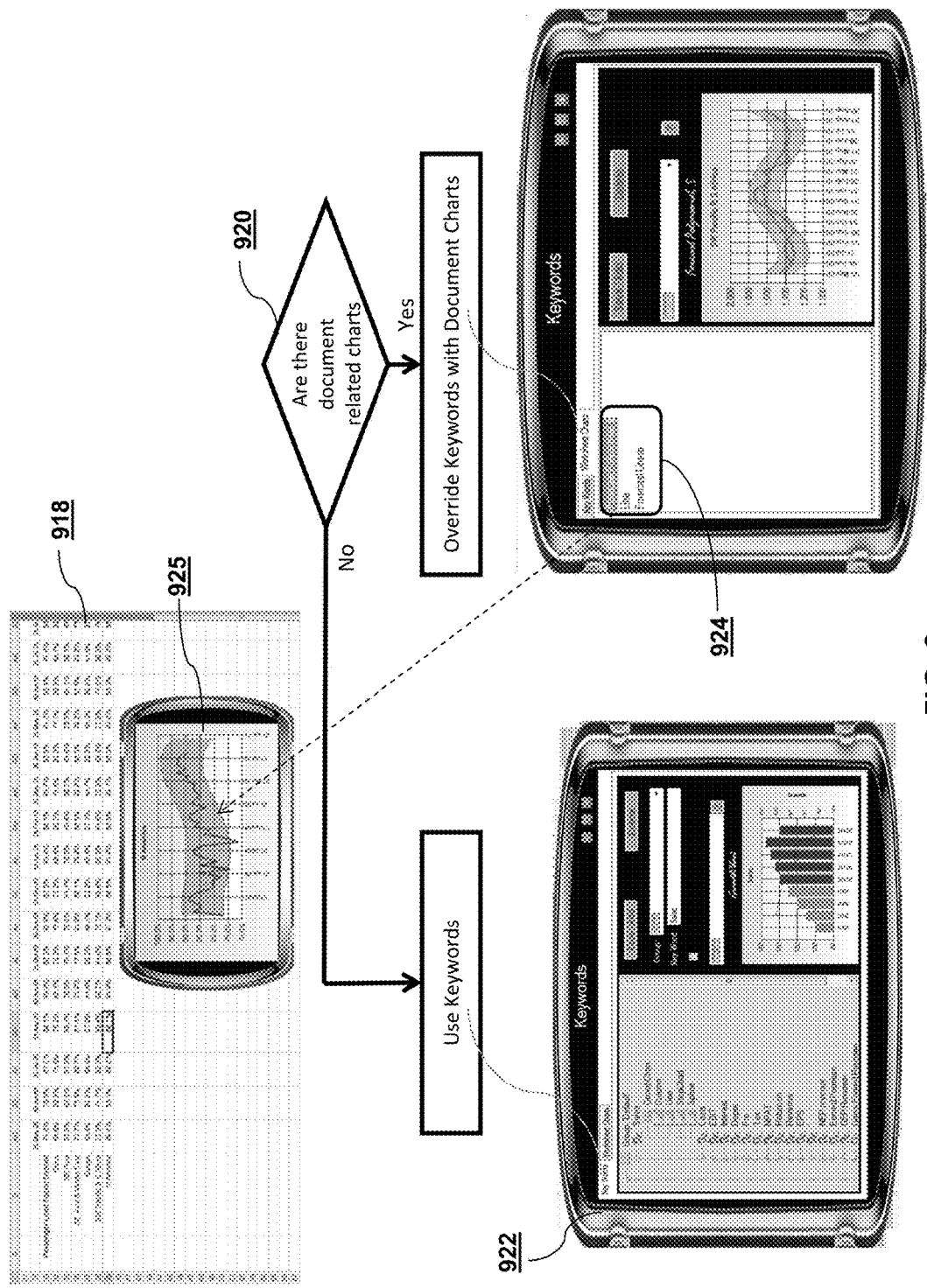
FIG. 9c is an illustrative view of the RichViewer decision tree to use Worksheet or Keyword basis to choose various graphical representations in accordance with an embodiment of the present invention.

In an embodiment of the present invention, as well as RichViewer associating the Labels (904) to predefined Keywords based on the Style of User (901) or user supplied Keywords; FIG. 9c will make it apparent to any person skilled in the art that the system has a decision based process (920) that examines if the electronic document (918) has Document Charts (924) that override use of the Keywords (922) mechanism. In the case of a worksheet, the Document Charts are embedded in the worksheet. FIG. 9c indicates that chart (925) is a result of Document Charts (924) embedded in a worksheet (918). Keywords and Document Charts may both be components of RichViewer IntelligentCharts.

Figure 9D:
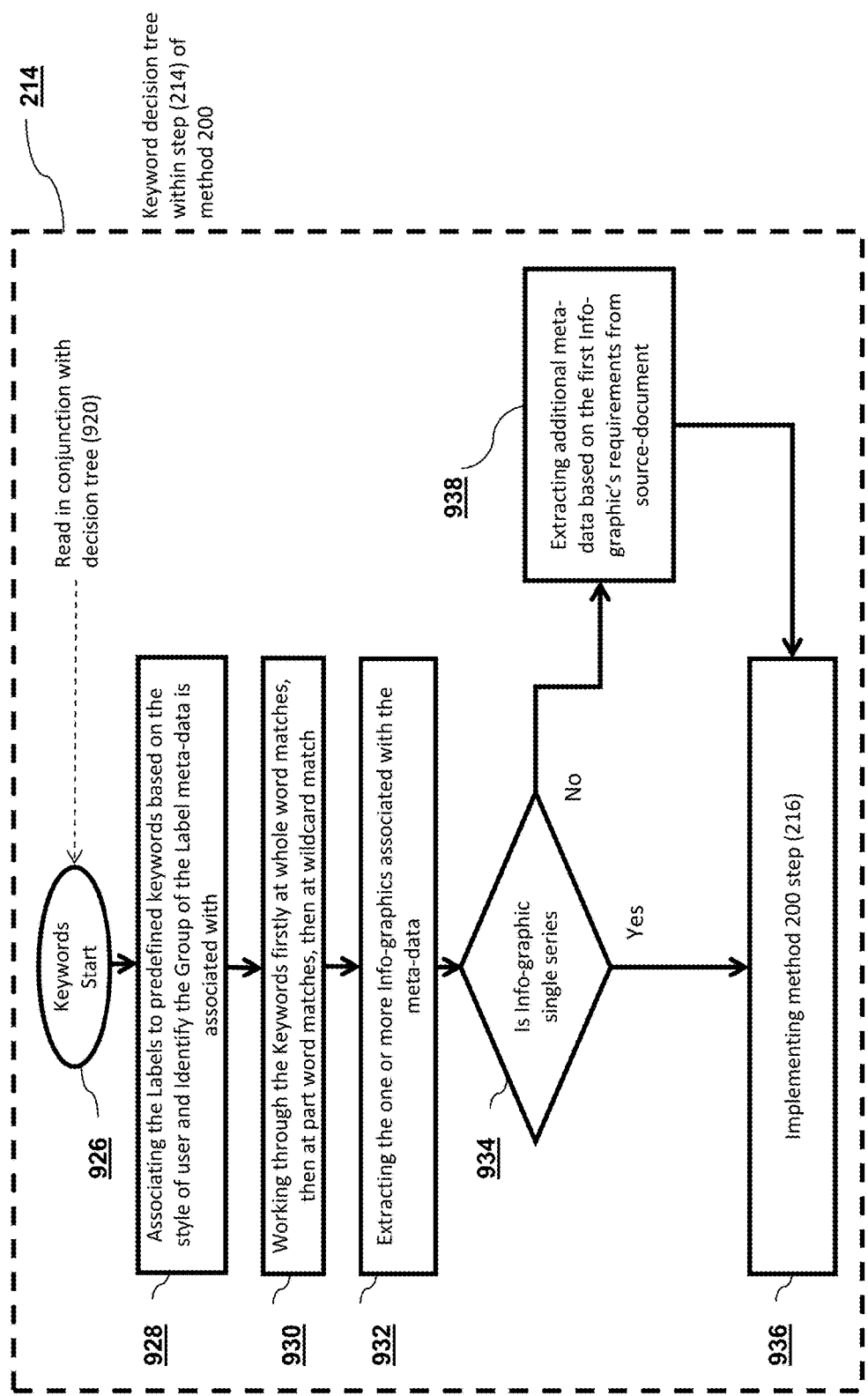
FIG. 9d is a flow chart representing the RichViewer decision tree method on a Keyword basis to choose various graphical representations in accordance with an embodiment of the present invention.
Figure 11:
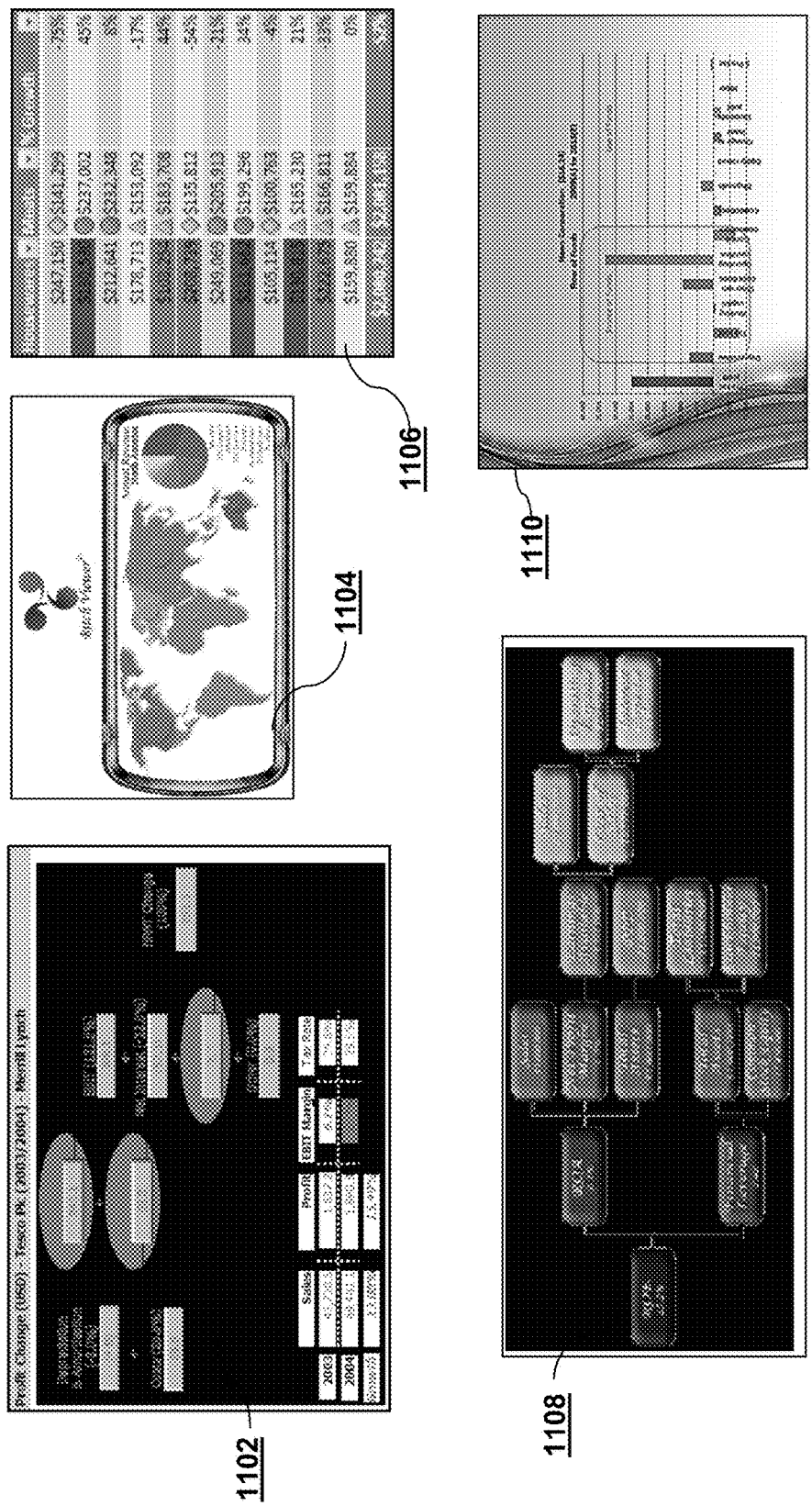
FIG. 11 is an illustrative view of RichViewer having various Info-graphical representations in accordance with an embodiment of the present invention.

As depicted in FIG. 9d, an embodiment of the present invention provides for using Keywords from the meta-data Label to generate graphics on a computing device. The method is a detail of step (214) within method (200) where the system Analyzes the identified meta-data, numerical elements, and rules, in combination or individually and initiates at step (926). In step (928) using the Style of User (901 on FIG. 9a), identify the Group with which the Label meta-data is associated (940 on FIG. 9a). The concept of a Group allows for multiple uses of a Keyword within a Style of User. For example, a Style of User (901 on FIG. 9a) may be classified as Accounting where they work with financial accounts containing a profit and loss statement that may contain the Label "Bad & Doubtful Debts" while also having a balance sheet containing the Label of "Bad & Doubtful Debts". In this case a "Profit & Loss" Group and an alternative "Balance Sheet" Group could be created allowing the Keyword "Doubtful Debts" to have a different series of Info-graphical representations based on each defined Group. Afterwards, in step (930), the system works through the Keywords firstly trying to match the Label to whole word Keywords, then if unsuccessful to match the Label to part Keywords, then if still unsuccessful look for a wildcard match. After identifying the group of Info-graphical objects (905 on FIG. 9a) associated with the meta-data in step (932), the step (934) examines the first Info-graphic and decides what flow diagram path to take based on whether the Info-graphic requires a single series of meta-data or a multi-series of meta-data. If a single series then in step (936) go back to the method (200) step (216). If the data required is multi-series, then extract from the source-document additional meta-data to satisfy that Info-graphical representation before performing step (936);

Further, in an embodiment of the present invention, the method implementable on the system is configured to generate Info-graphical objects as depicted in FIG. 11. The system is enabled to recognize the data type and creates the Info-graphical objects accordingly. It will be apparent to one skilled in the art that FIG. 11 depicts higher order analysis and insights by allowing the user to see the drivers that underlie the meta-data (1102) such as where the change in profit is coming from or a tree depiction of Return On Equity (1108), the location on a map of the annual revenue extracted from the underlying meta-data (1104), the Source and Use of Cash Flow (1110) and a tabular view of the data (1106).

Figure 12A:
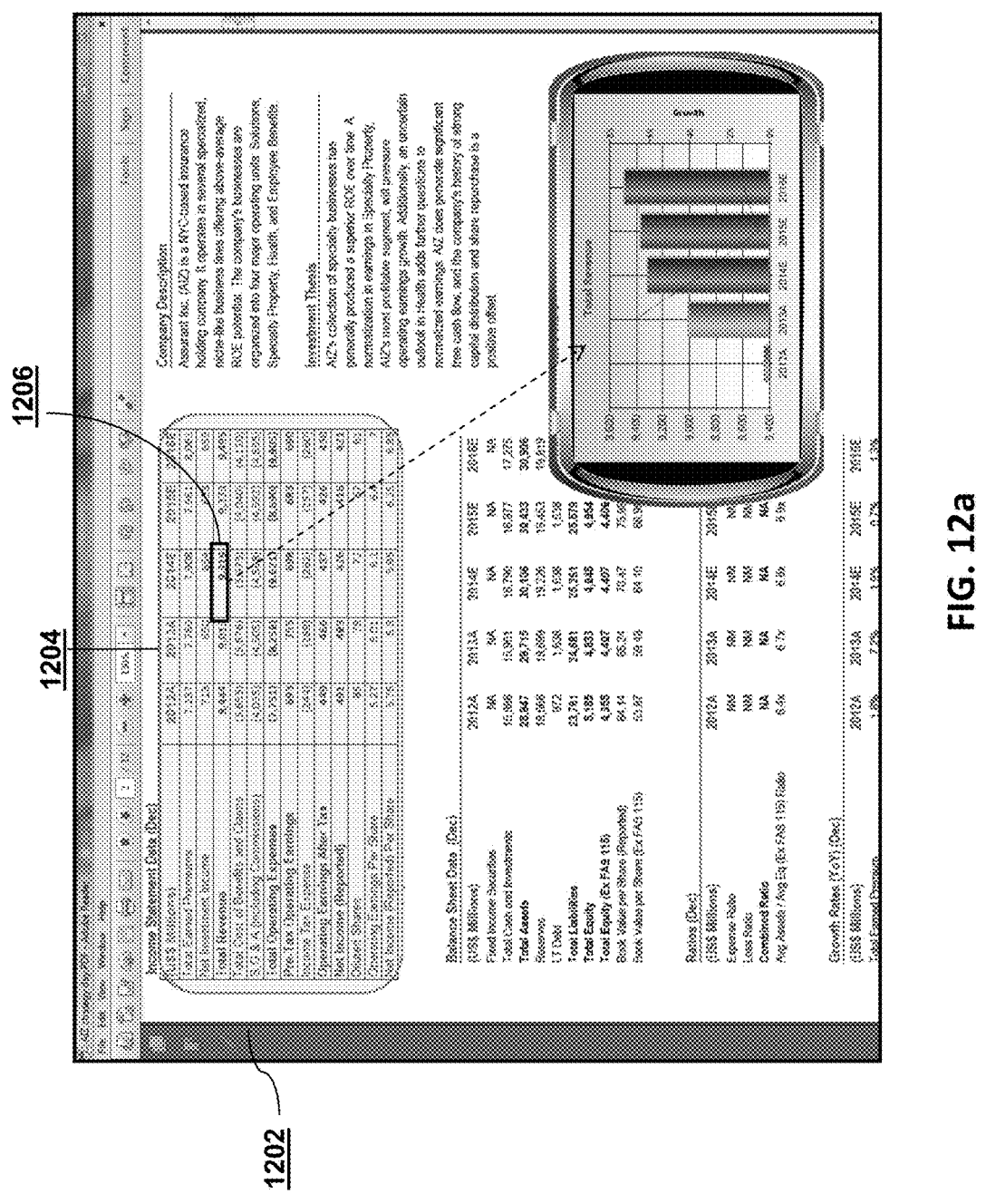

In an embodiment of the present invention as depicted in FIG. 12a, the system is voluntarily called RichViewer Exploration Window (1202), which allows the user to move a transparent floating 'grid' (1204) over the top of any visible data. The image under the floating grid is converted to text using Optical Recognition and the result is uniquely visualized in a grid form as an overlay on the original image.

It will become apparent to those skilled in the art that Optical Recognition (OpR) varies from Optical Character Recognition (OCR) in so much that OCR extracts characters from text where OpR encompasses OCR as well as extracting data points and labels from Info-graphical representations (1304); as well as numerical data from words within sentences (1314) such as the example of the text "Forty-nine" translating to the number 49 using OpR. The user may merge cells presented on the grid if needed for RichViewer to better take advantage of the relationships available in the data extracted by the RichViewer Exploration Window. In the embodiment the method implementable on the system the user may take any data (1206) from the unique overlay grid of any highlighted (1204) area and work with that data in the same way described in other parts of the invention. The optical RichViewer thus allows a visual walk through of the data highlighted under the RichViewer Exploration Window—Bringing Data to Life.

Figure 12B:
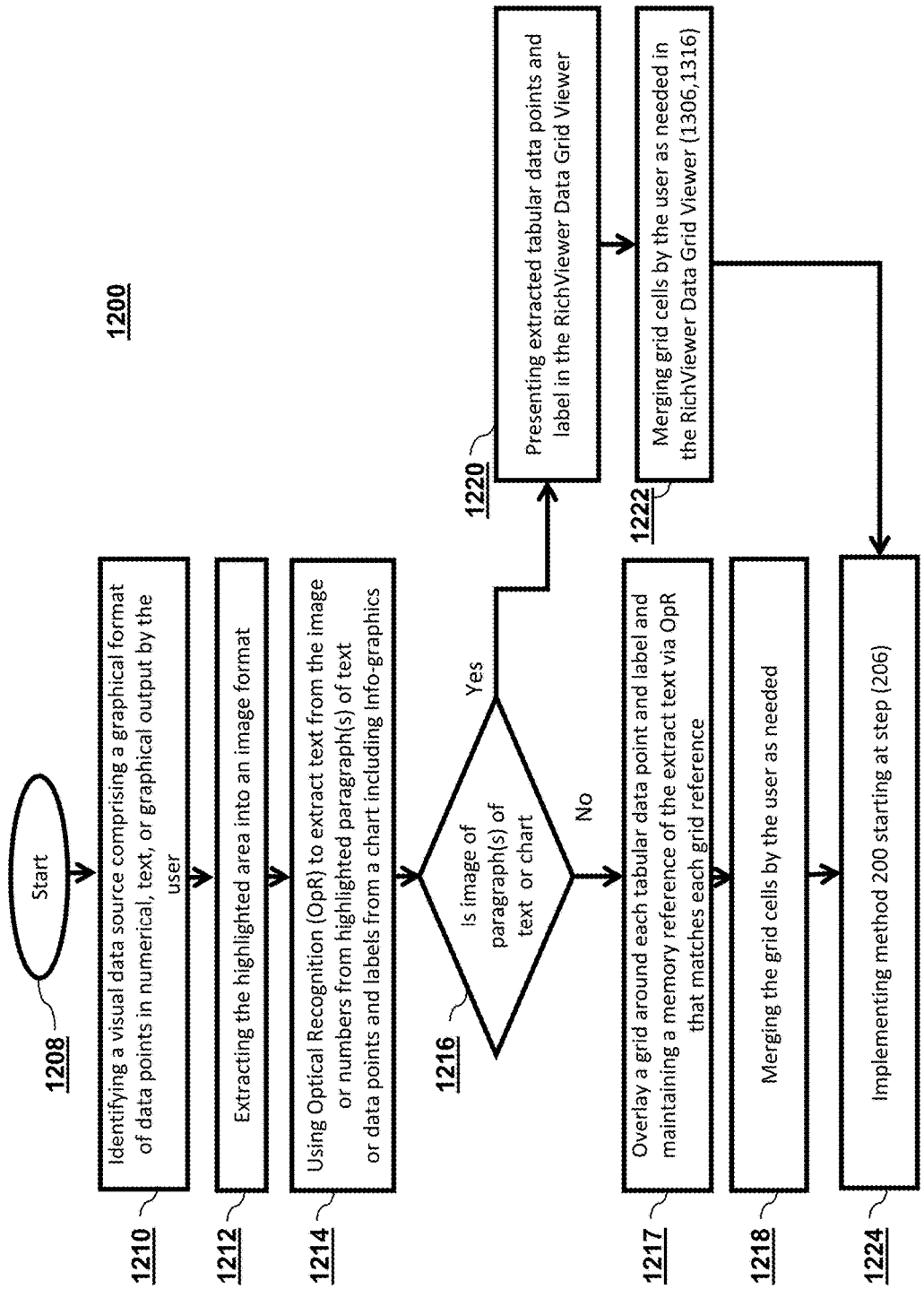
FIG. 12b is a flow chart representing the RichViewer decision tree method for extracting an Optical Recognition of graphics on a computing device in accordance with an embodiment of the present invention.

As depicted in FIG. 12b, an embodiment of the present invention provides a method (1200) for extracting an Optical Recognition of graphics on a computing device. The method (1200) initiates at step (1208). In step (1210), the User Identifies a visual data source comprising a graphical format of data points in numerical, text, or graphical output. In step (1212), the system extracts the highlighted area into an image format for processing. The image may contains data in tabular format containing rows and columns of data with Headers and Labels (1204) or the image may contain an Info-graphical representation (1304) or the image may contain one or more sentences of text (1314). In step (1214), the system uses Optical Recognition (OpR) to extract text from the image or numbers from highlighted paragraph(s) of text or data points and labels from a chart including Info-graphics. In step (1216) the system or user recognizes if the image is an image of a paragraph(s) of text (1314) or chart or Info-graphical representations (1304). Step (1217) is for tabular format and the system overlays a transparent grid around each tabular data point and label. The system maintains a memory reference of the extracted text via OpR that matches each grid reference so that interaction with the grid effects RichViewer in the same way as described in other embodiments of the present invention. In step (1218) the user may merge cells presented on the grid if needed. In further step (1224) the method (200) is implemented. The method (200) starts at step (206). Step (1220) is for numbers from highlighted paragraph(s) of text (1314) or data points and labels from a chart including Info-graphics (1304) and presents extracted tabular data points and label in the RichViewer Data Grid Viewer (1306, 1316). In step (1222) the user may merge cells presented on the grid if needed. In further step (1224) the method (200) is implemented. The method (200) starts at step (206).

Figure 13A:
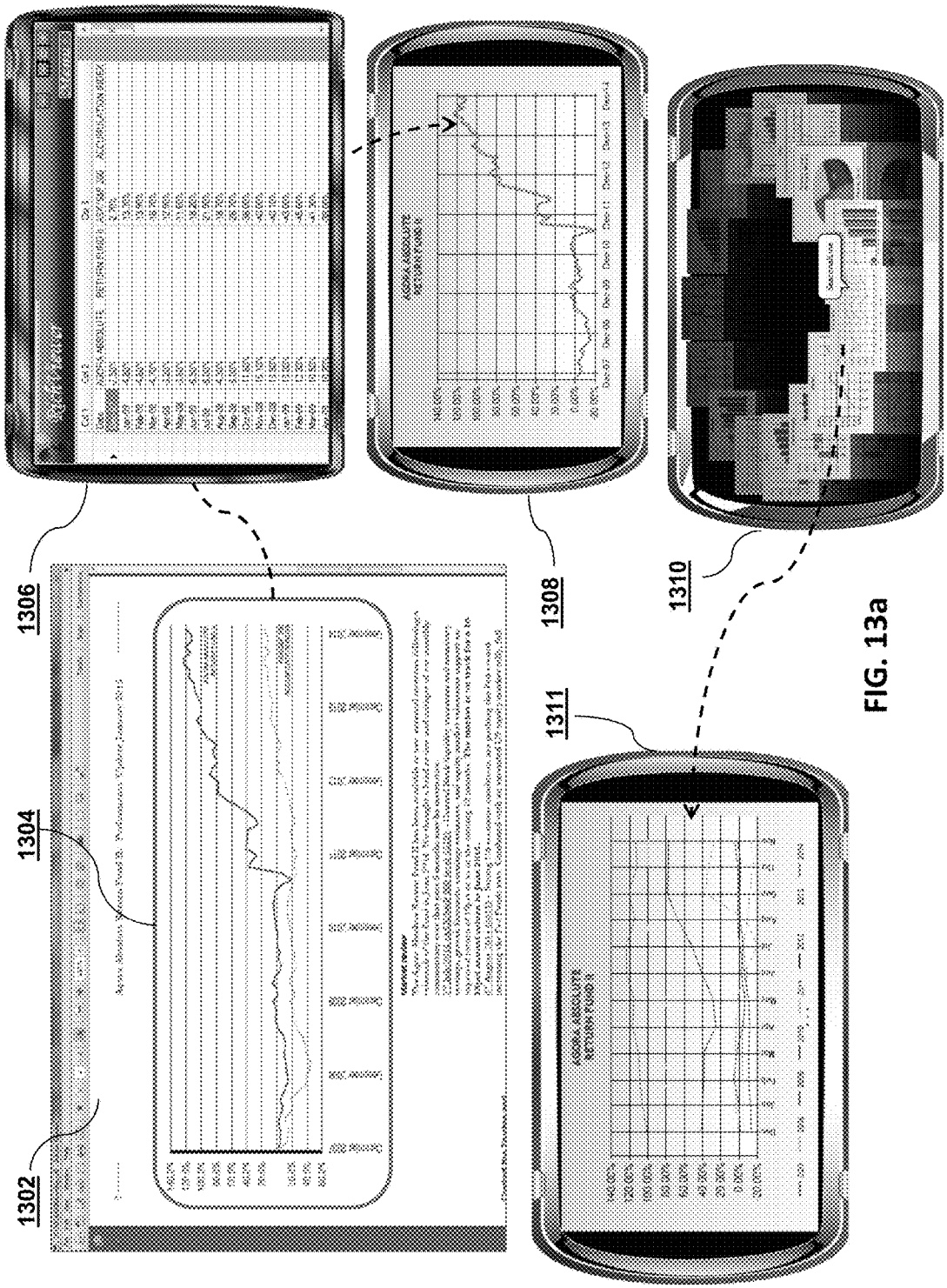
FIG. 13a is an illustrative view of a method for graphical representation of data of a selected graphical object in accordance with an embodiment of the present invention.

In an exemplary embodiment of the present invention, as depicted in FIG. 13a, when the user highlights a chart (1304) on a PDF file (1302) using the RichViewer Exploration Window, the system extracts the underlying data points from the chart including labels and presents that data in a data grid voluntarily called RichViewer Data Grid Viewer (1306) which in turn interacts with RichViewer (1308) and presents that data in the same chart format as highlighted by the RichViewer Exploration Window (1304). The user now has the ability to represent the output in a different format (1310) and unlike other available products, in FIG. 13a the data is represented in a Second Order Seasonality Chart (1311).

Figure 13B:
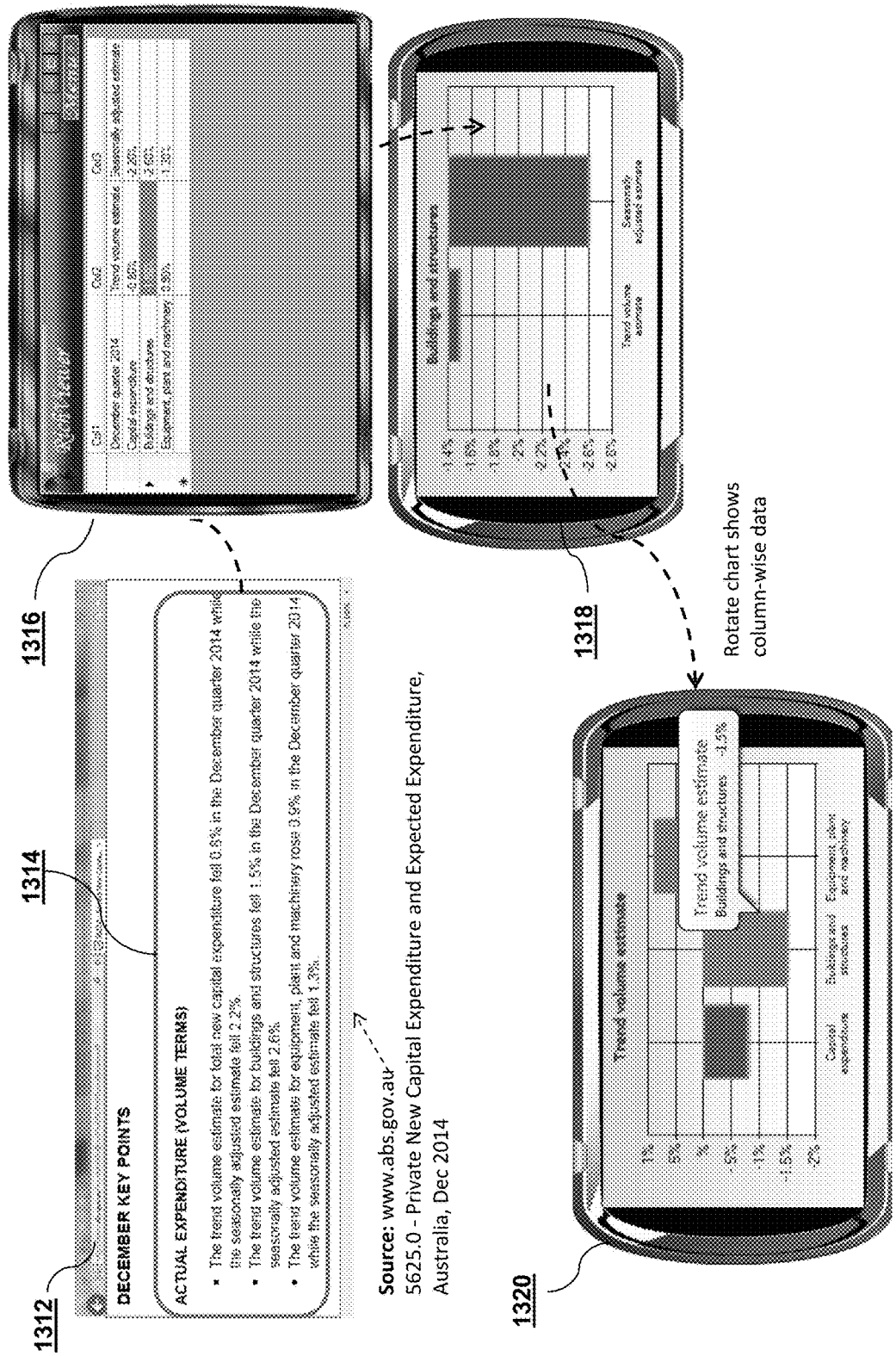
FIG. 13b is an illustrative view of a method for graphical representation of data of selected highlighted paragraph(s) of text in accordance with an embodiment of the present invention.

In an exemplary embodiment of the present invention, as depicted in FIG. 13b, when the user highlights a sentences of text (1314) on a web browser page (1312) using the RichViewer Exploration Window, the system extracts the underlying data points from the sentences of text and presents that data in the RichViewer Data Grid Viewer (1316) which in turn interacts with RichViewer and unlike other available products presents that data in the chart format (1318). The user now has the ability to represent the output in a different format (1320) where the chart is rotated.

Figure 14:
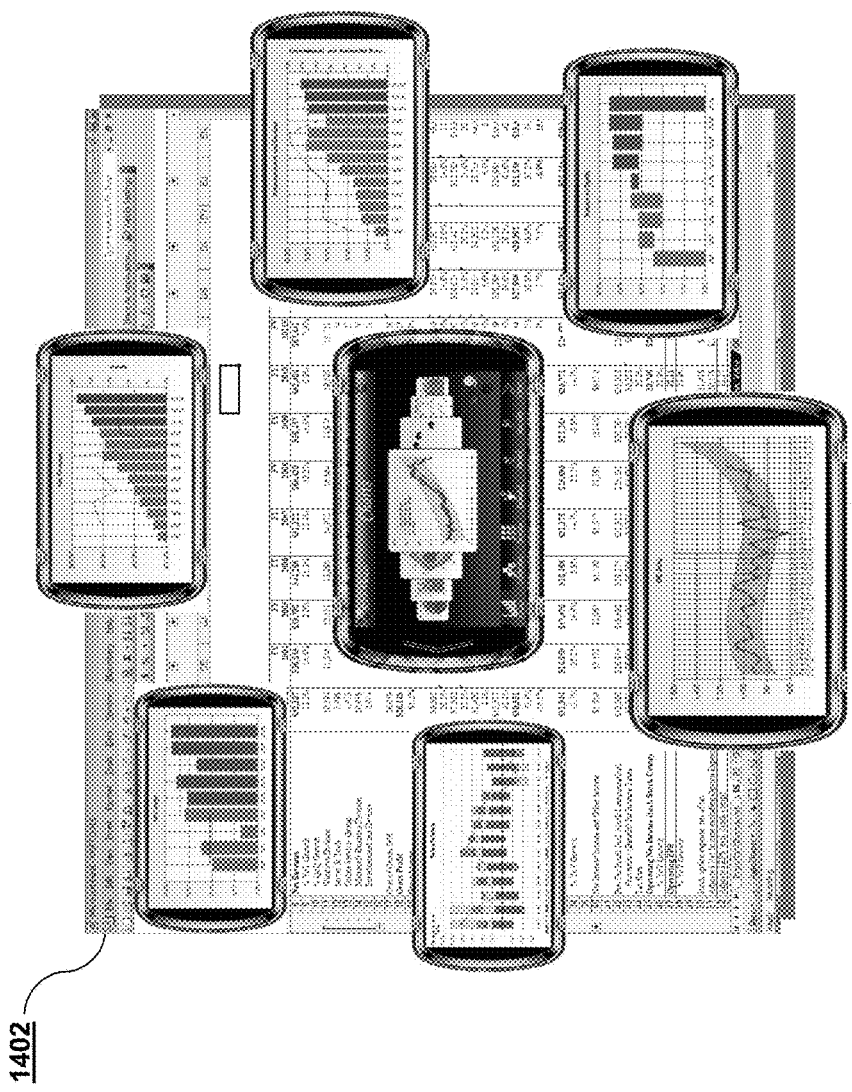
FIG. 14 is an illustrative view of RichViewer opening various previously stored templates or favorites and creating graphical representations of the current data in accordance with an embodiment of the present invention.

In an embodiment of the present invention as depicted in FIG. 14, the system is an illustrative view of RichViewer instantaneously opening multi Info-graphical representations of varying relations from a document at the same time. This may be a result of various previously stored templates or favorites, or may be as a result of the relationships associated with the selected data point or data points.

Figure 15:
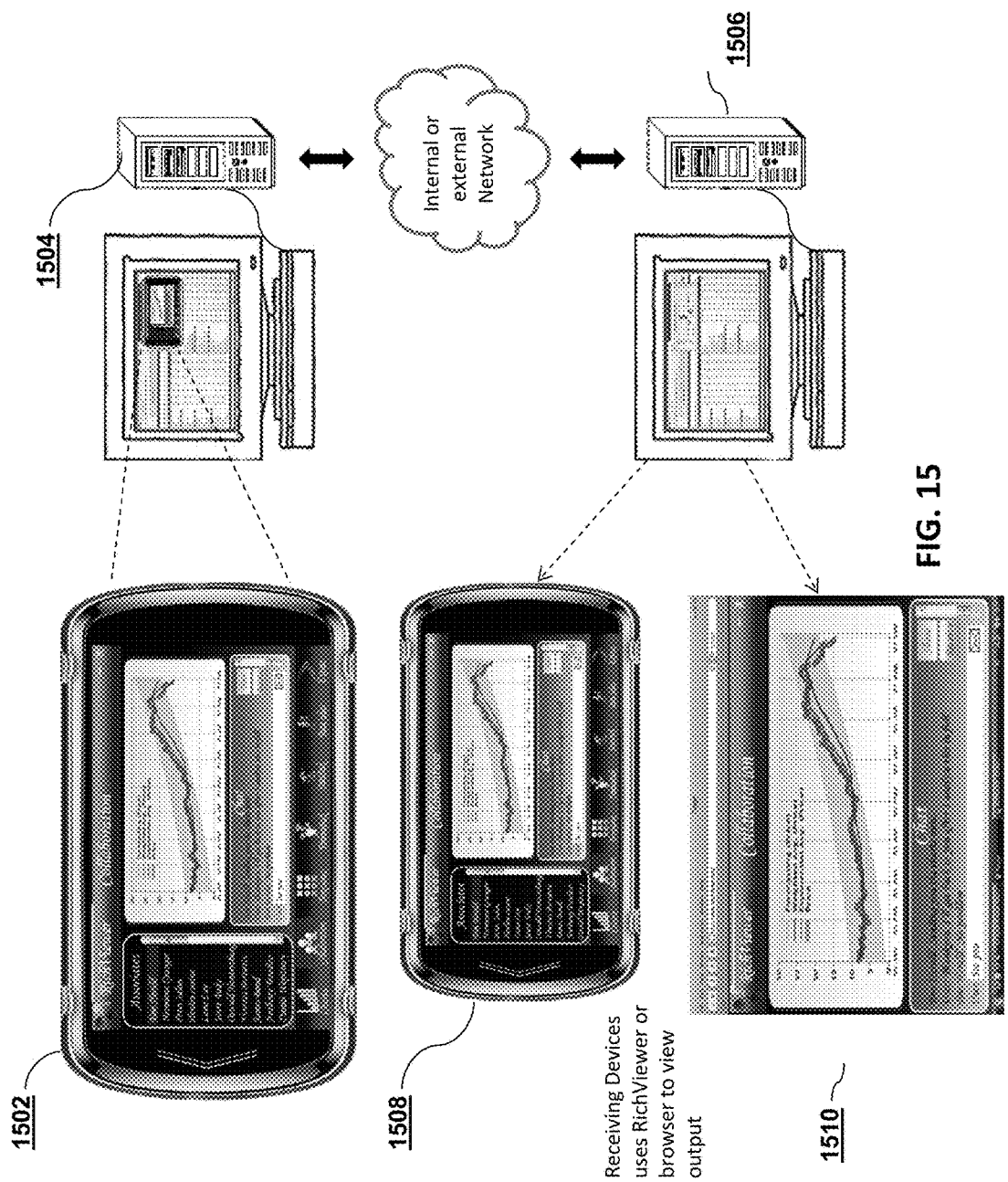
FIG. 15 is an illustrative view of RichViewer having various graphical representations passed real-time between the system and another user on a different system in accordance with an embodiment of the present invention.

In an embodiment of the present invention as depicted in FIG. 15, the system is an illustrative view of RichViewer (1502) instantaneously pushing Info-graphical representations in real-time from a source computer (1504) across one or more networks (1505) and one or more devices coupled to the network to other user(s) on a different system (1506) with either its own version of RichViewer (1508) accepting the Info-graphical representations or a web browser (1510) and collaborating through chat and image capture that is unique to the RichViewer system through analyzing data and creating the instantaneous graphical objects as embodied in method (200).

Figure 16A:
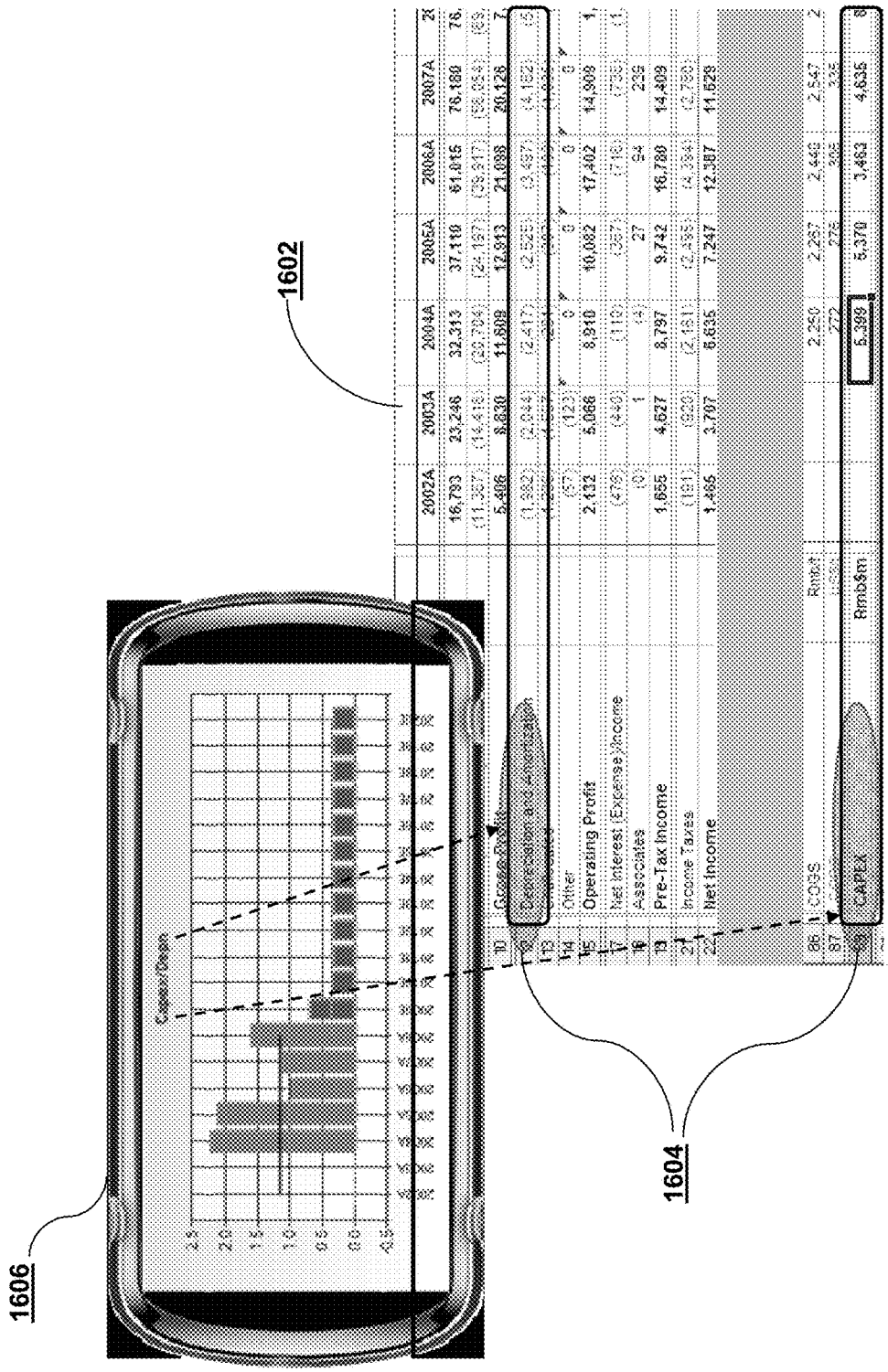
FIG. 16a is an illustrative view of RichViewer using multiple Tagged Labels to produce a graphical representation of Second Order meta-data in accordance with an embodiment of the present invention.
Figure 16B:
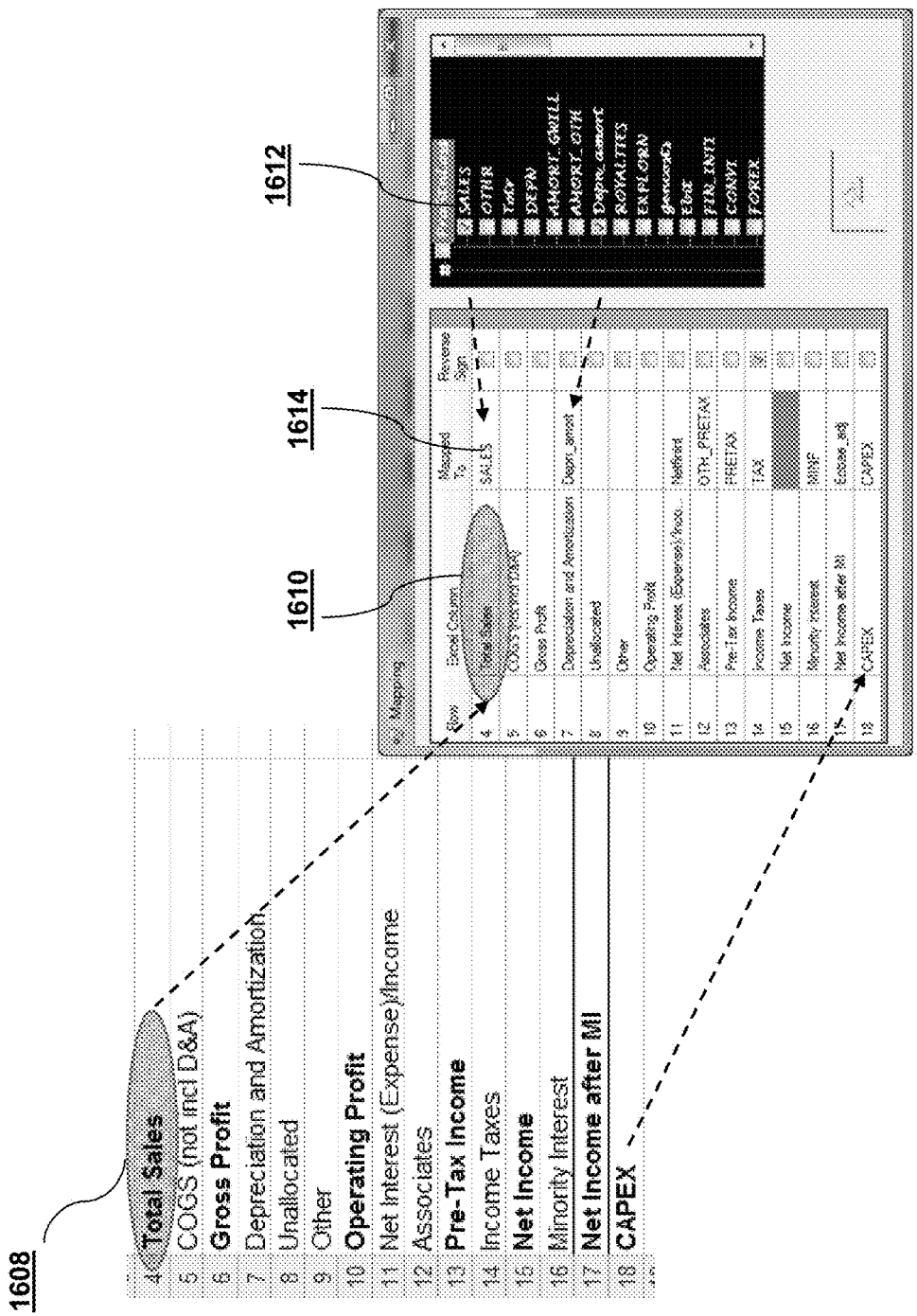
FIG. 16b is an illustrative view of the mapping of Excel® Labels to a Tagged taxonomy.

In an exemplary embodiment of the present invention, as depicted in FIG. 16a, when the user selects a cell from the presented rows 12 or 89 (1604) then a Second Order chart (1606) is created as a composite of the two rows being "Capex" divided by "Depreciation and Amortization". The chart (1606) shows both the ratio of "Capex/Depn" as well as historic average against forecast average adding insights into relationships not available to just one of the variables by itself. FIG. 16b shows a mechanism for mapping Labels to a user defined taxonomy (1612) which for example could be the eXtensible Business Reporting Language (XBRL). This mechanism may be referred to as Tagging. FIG. 16b shows the Tagging of "Total Sales" (1608) via a mapping table (1610) to taxonomy point "SALES" (1612) via the mapping table (1614). When RichViewer encounters a data point where a Tagged relationship exists, it searches through a taxonomy mapping list of available Tagged meta-data, combines this with a corresponding set of relationships, analyzes the available relationships, and presents one or more Info-graphical representations (1606) associated with the Tagged meta-data in a superior and unique form.

Figure 16C:
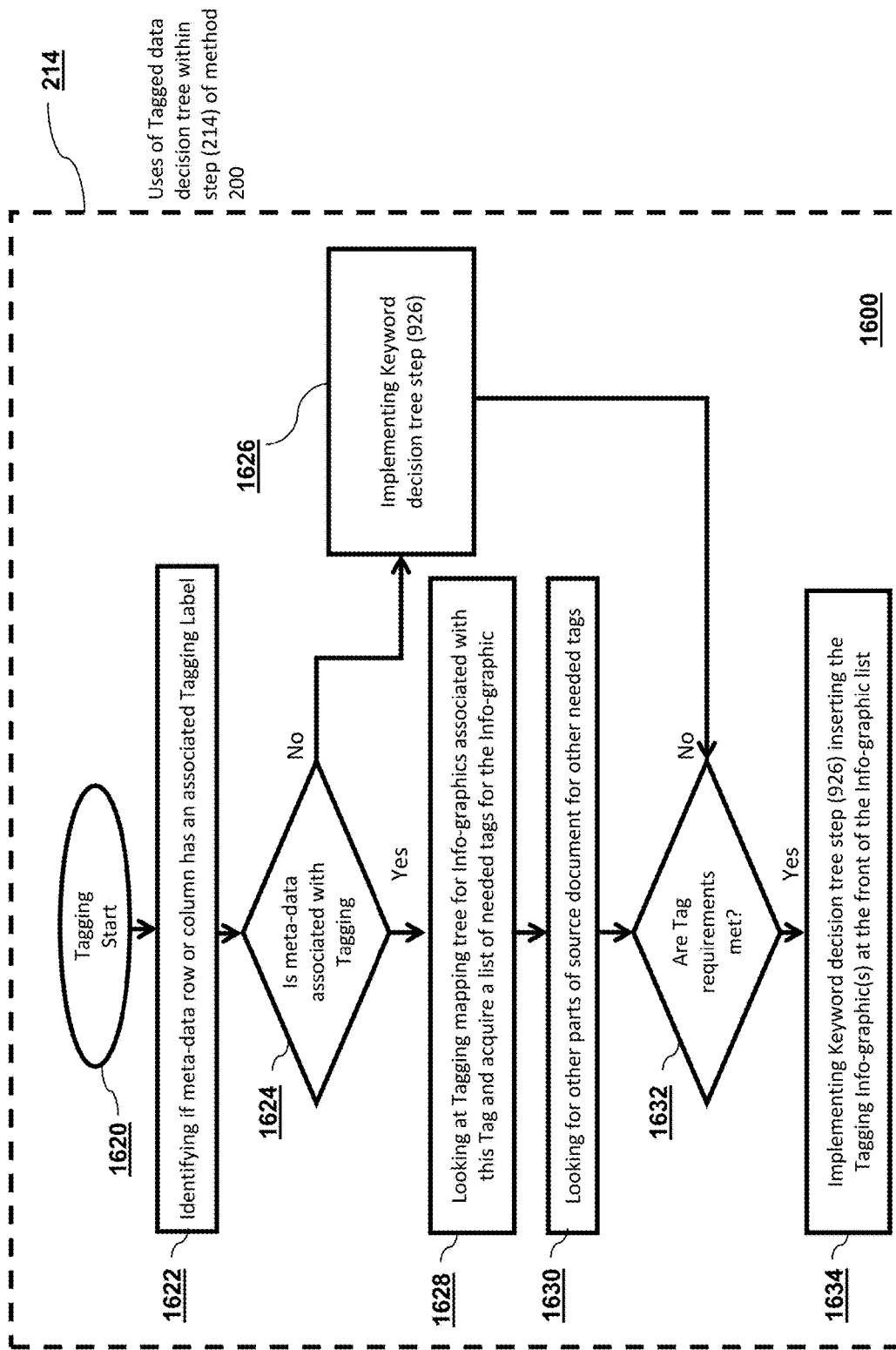
FIG. 16c is a flow chart representing the RichViewer decision tree method to generate graphics on a computing device based on available Tagged taxonomy in accordance with an embodiment of the present invention.

As depicted in FIG. 16c, an embodiment of the present invention provides a method (1600) for using Tagging from a user defined taxonomy to generate graphics on a computing device. The method (1600) is a detail of step (214) within method (200) where the system Analyzes the identified meta-data, numerical elements, and rules, in combination or individually and initiates at step (1620). In step (1622), the system analyzes the meta-data location to see if an associated Tagging Label exits. The Tag may refer to row-wise data or column-wise data associated with the initial data source as described in method (200). Afterward, in step (1624) the system decides Tagging exits. If no Tag exists, then (1626) moves to implementation of the Keyword decision tree step (926). If a Tag exists, then in step (1628) the system builds a list of Tags required to produce Tag related Info-graphics including charts and tables. Afterwards, in step (1630) the system searches through the source document for the presence of these Tags and finds the associated meta-data needed for the related Info-graphics. In step (1632) if no other Tags are found that were previously identified as being needed, then (1626) moves to implementation of the Keyword decision tree step (926). In step (1632) if Tags and associated meta-data exists, then the related Info-graphics charts and tables are inserted in the front of those related to Keywords implemented in the Keyword decision tree step (926).

In an embodiment of the present invention, RichViewer has the superior and unique ability to present Info-graphical representations of what can be voluntarily called Second Order relationships. Second Order relationships are created from the meta-data of the selected data-point and extend the analysis as depicted but not limited to the examples in FIGS. 17b, 18a, 18b, and 18c.

Figure 17A:
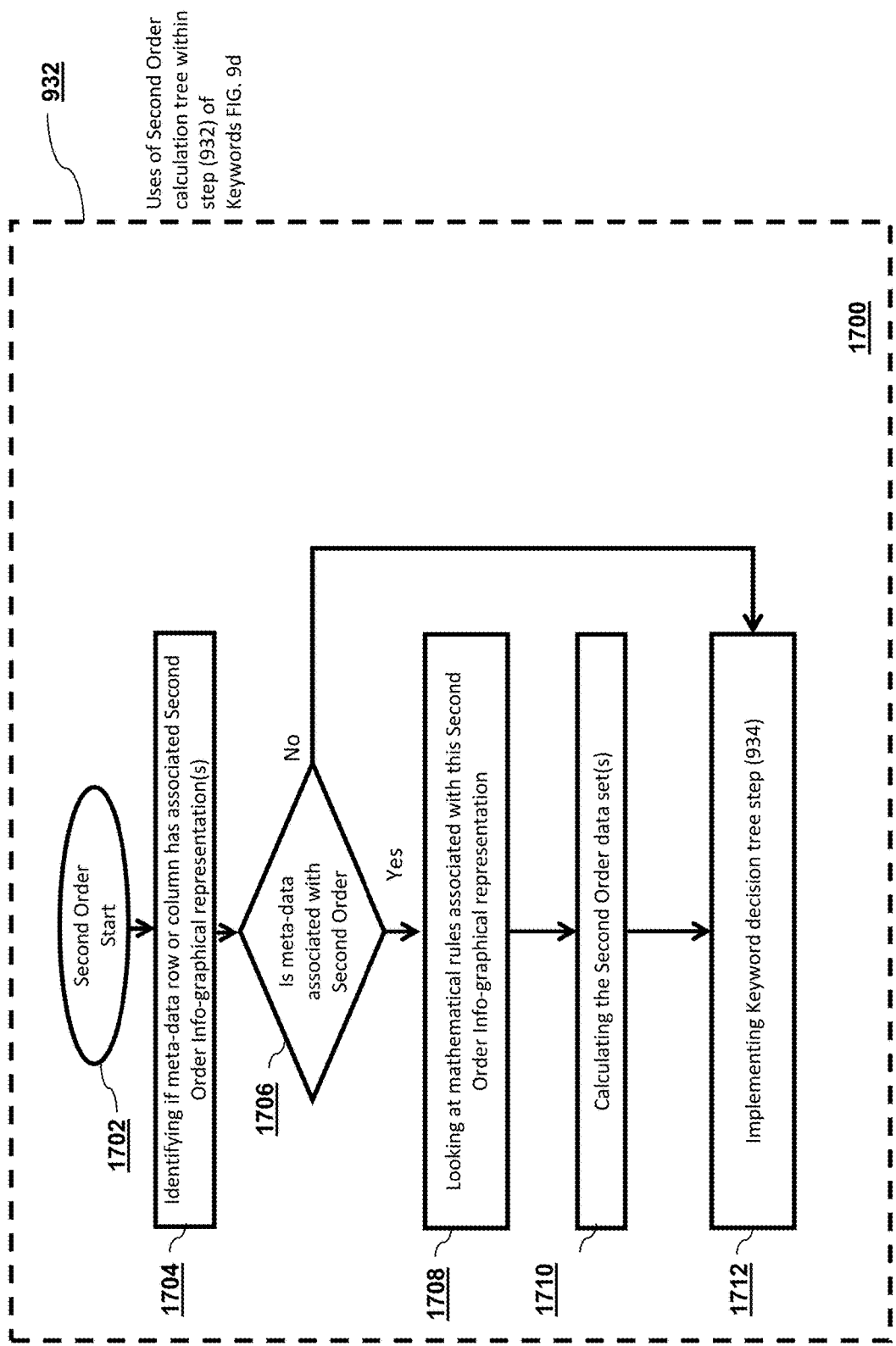
FIG. 17a is a flow chart representing the process mechanics of RichViewer creating a graphical representation of Second Order meta-data in accordance with an embodiment of the present invention.

As depicted in FIG. 17a, an embodiment of the present invention provides a method (1700) for generating Second Order data to generate graphics on a computing device. The method is a detail of step (932) within FIG. 9d where the system extracts the one or more Info-graphics associated with the meta-data and initiates at step (1702). In step (1704) the system identifies if the meta-data row or column has an associated Second Order Info-graphical representation. Using the results of step (1704), step (1706) decision tree moves to step (1712) if there is no associated Second Order Info-graphical representation. Otherwise in step (1708) the system looks at the mathematical rules associated with this Second Order Info-graphical representation and using those rules in step (1710) the system calculates the Second Order data set(s) that result from those rules. Afterwards in step (1712) the Second Order data set(s) are passed to the Keyword decision tree step (934).

Figure 17B:
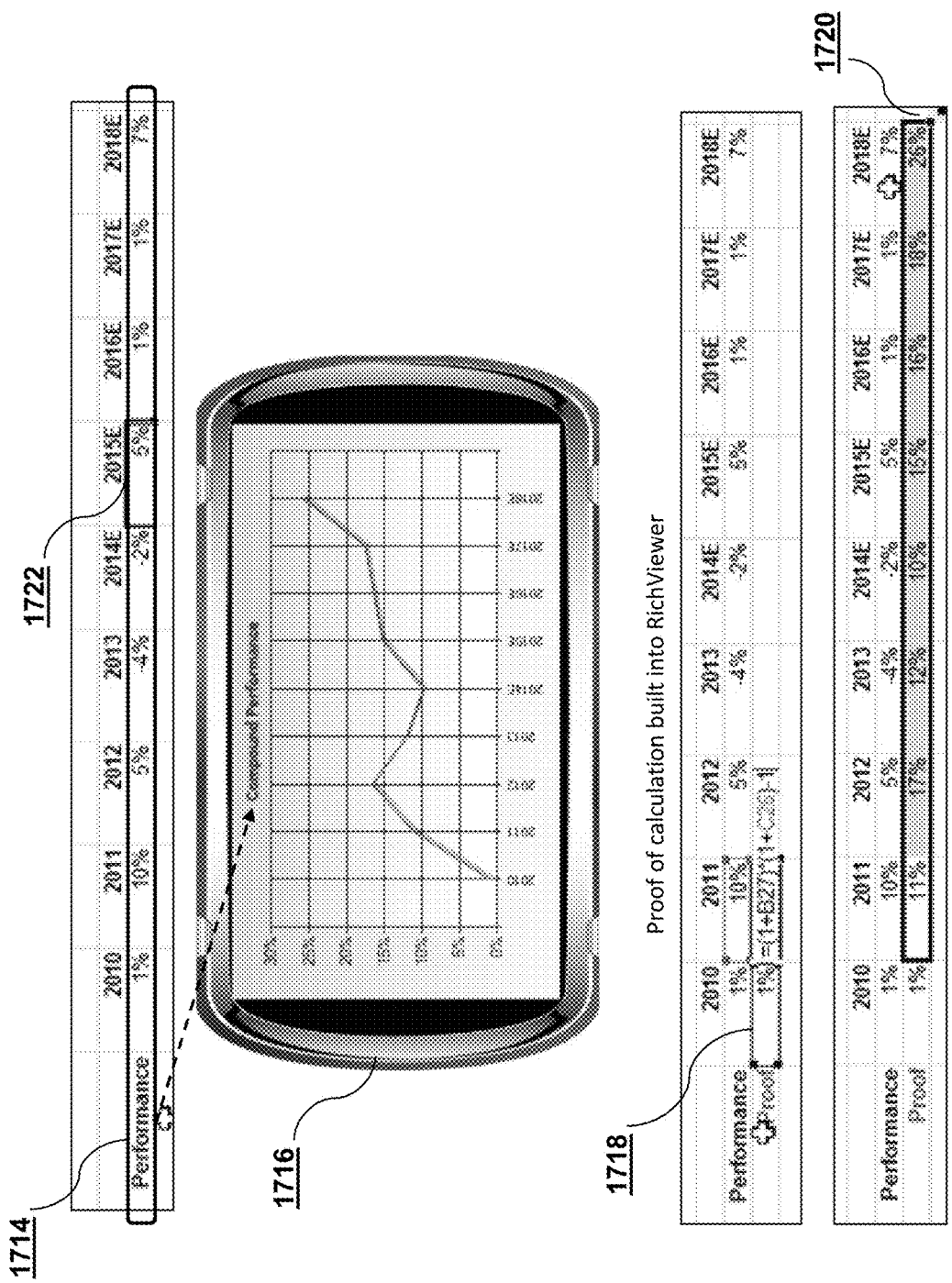
FIG. 17b is an illustrative view of RichViewer having a graphical representation of Second Order meta-data in accordance with an embodiment of the present invention.

In an exemplary embodiment of the present invention, as depicted in FIG. 17b when the user selects a data point (1722), rather than presenting the surrounding row data (1714) RichViewer creates a Second Order chart of Compound Performance (1716). As apparent to any person skilled in the art, this chart (1716) represents the mathematical compounding of percentages as displayed in the formula (1718) and extended data set (1720). RichViewer does not need the user to create the meta-data (1718, 1720) but instantaneously presents the Second Order chart (1716).

Figure 18A:
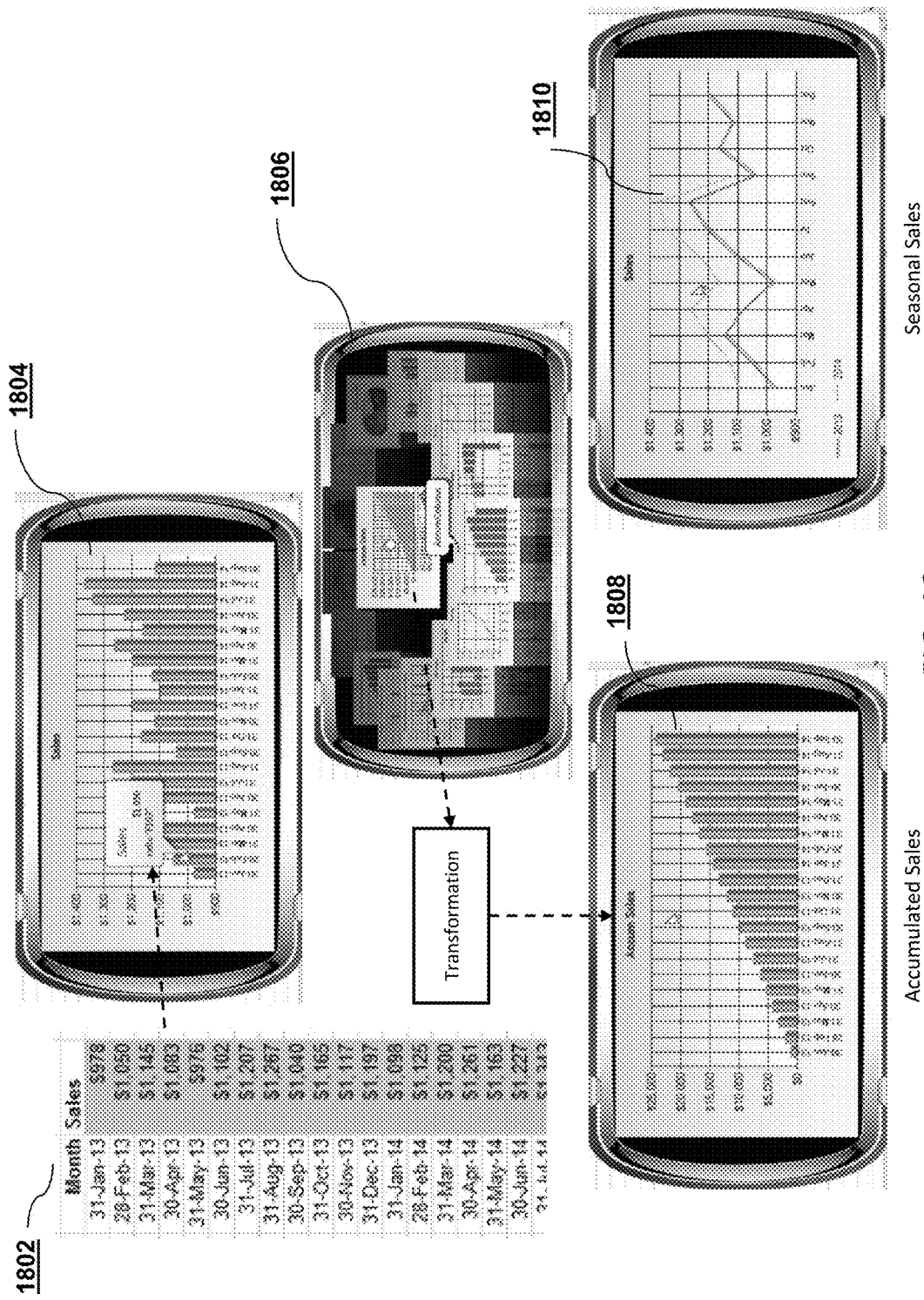
FIG. 18a is an illustrative view of RichViewer having a graphical representations of Second Order meta-data in accordance with an embodiment of the present invention.

In an exemplary embodiment of the present invention, as depicted in FIG. 18a when the user selects meta-data associated with monthly "Sales" (1802), RichViewer has created chart (1804) to depict this "Sales" data month-by-month. The user can also select an accumulated column chart (1806) where RichViewer transforms the meta-data to create a Second Order chart of "Accumulated Sales" (1808). As apparent to any person skilled in the art this chart (1808) represents the mathematical accumulation of "Sales" over the supplied meta-data. RichViewer does not need the user to create the accumulation meta-data but instantaneously presents the Second Order chart. The user can also select a chart that depicts seasonal sales where each twelve months of the available meta-data is plotted as lines on the same graphical representation (1810). As can be observed on the chart (1810), the meta-data is split into years 2013 and 2014 and the available data for each year is drawn as a line with the most recent year 2014 only extending to its last data-point of September allowing the user to visualize the possible outcome of 2014 month-by-month "Sales" trend post September against the known 2013 month-by-month "Sales". Again RichViewer does not need the user to create the time consuming and complex structure of the seasonal meta-data but instantaneously presents the Second Order chart.

Figure 18B:
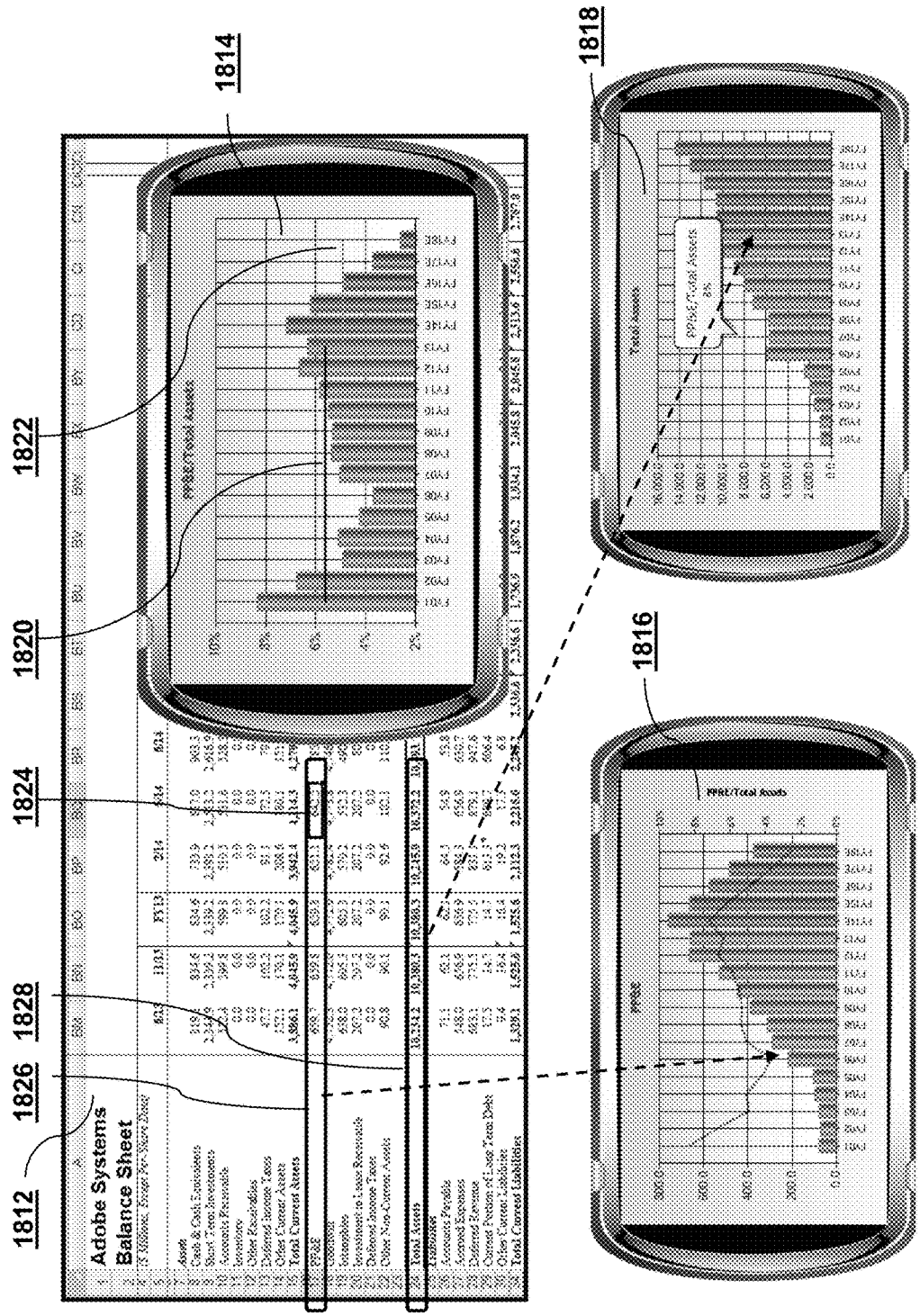
FIG. 18b is an illustrative view of RichViewer having a graphical representations of Second Order meta-data in accordance with an embodiment of the present invention.

In a further embodiment of the present invention as depicted in FIG. 18b, the system is an illustrative view of RichViewer (1814) instantaneously displaying only the Second Order relationship of "PP&E/Total Assets" (1814) being "PP&E" (1826) dividend by "Total Assets" (1828) and presented as further Second Order relationship with the two lines representing the Historic Average (1820) and the Forecast Average (1822) of "PP&E/Total Assets". As apparent to any person skilled in the art the user selected cell BQ17 (1824) and RichViewer has the ability to instantaneously generated an Info-graphical representation of the Second Order relationship between the meta-data "PP&E" (1826) associated with the selected cell BQ17 (1824) and the predefined Pivot Row (1828) of "Total Assets" as in the image (1816) where "PP&E" the column chart is on the right-axis and "PP&E/Total Assets" is on the left-axis and depicted by the line chart. The user has however chosen to see only the Right-axis meta-data in a superior and unique form of Historic Average and Forecast Average.

Figure 18C:
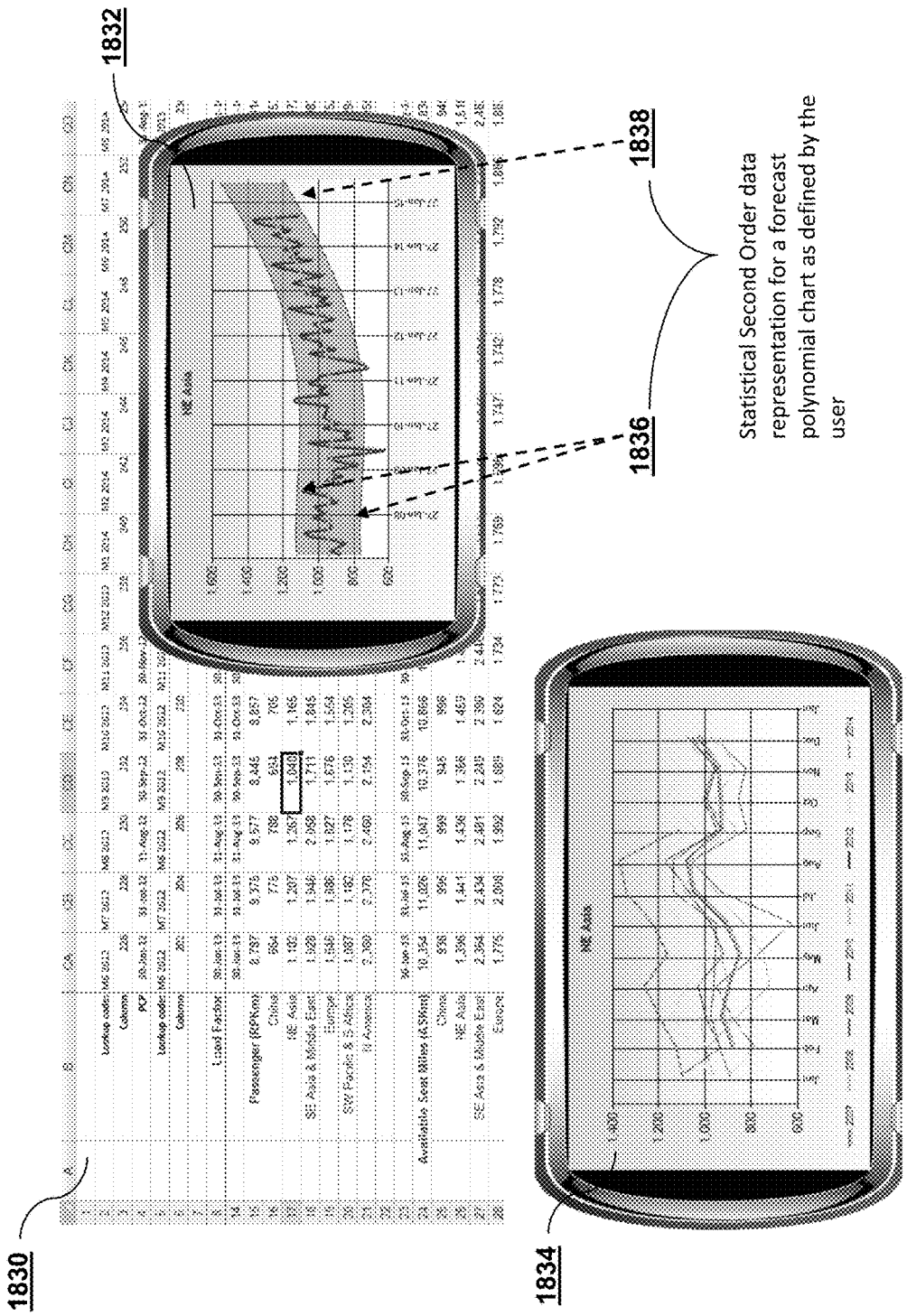
FIG. 18c is an illustrative view of RichViewer having a graphical representations of Second Order meta-data in accordance with an embodiment of the present invention.

In the embodiment of the present invention as depicted in FIG. 18c, the system takes the meta-data (1820) both visible and non-visible data inside the spreadsheet and creates a Second Order seasonal chart (1834) with multiple years from 2007 to September 2014. RichViewer is also able to represent the meta-data with a Second Order Polynomial chart which performs a statistical function as defined by the user and presents upper and lower bands (1836) as well as a forecast period (1838).

Figure 18D:
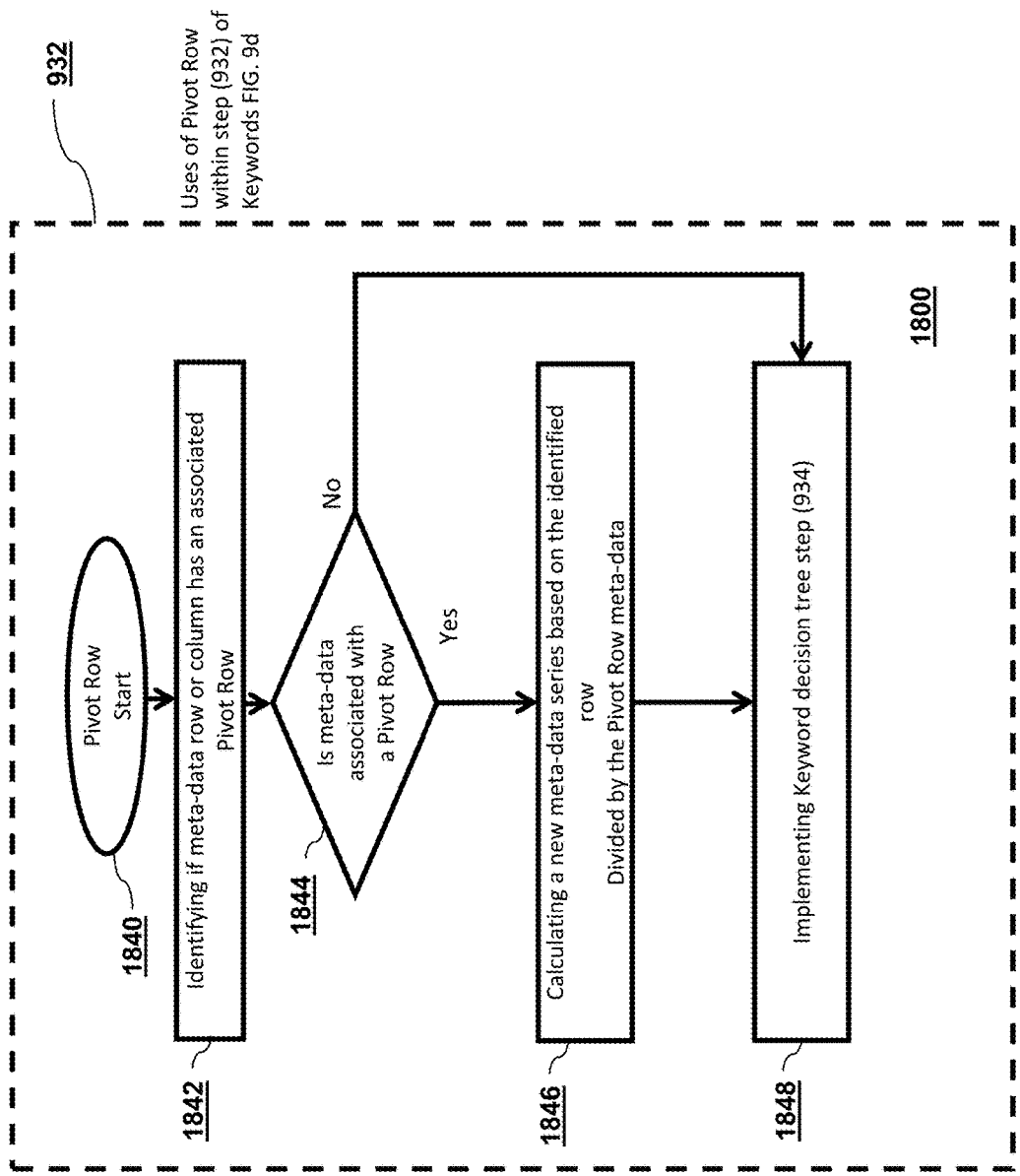
FIG. 18d is a flow chart representing the RichViewer method for extracting the Pivot Row and calculation of a new meta-data series in accordance with an embodiment of the present invention.

As depicted in FIG. 18d, an embodiment of the present invention provides a method (1800) for extracting Pivot Row meta-data and creating a new meta-data set as a series based on the identified meta-data divided by the Pivot Row meta-data to generate graphics on a computing device. The method is a detail of step (932) within FIG. 9d where the system extracts the one or more Info-graphics associated with the meta-data and initiates at step (1840). In step (1842) the system identifies if meta-data row or column has an associated Pivot Row. Using the results of step (1842), step (1844) decision tree moves to step (1848) if there is no associated Pivot Row. Otherwise in step (1846) the system calculates a new meta-data series based on the identified row meta-data divided by the Pivot Row meta-data. Afterwards in step (1846) the resultant data set is passed to the Keyword decision tree step (934).

Figure 19A:
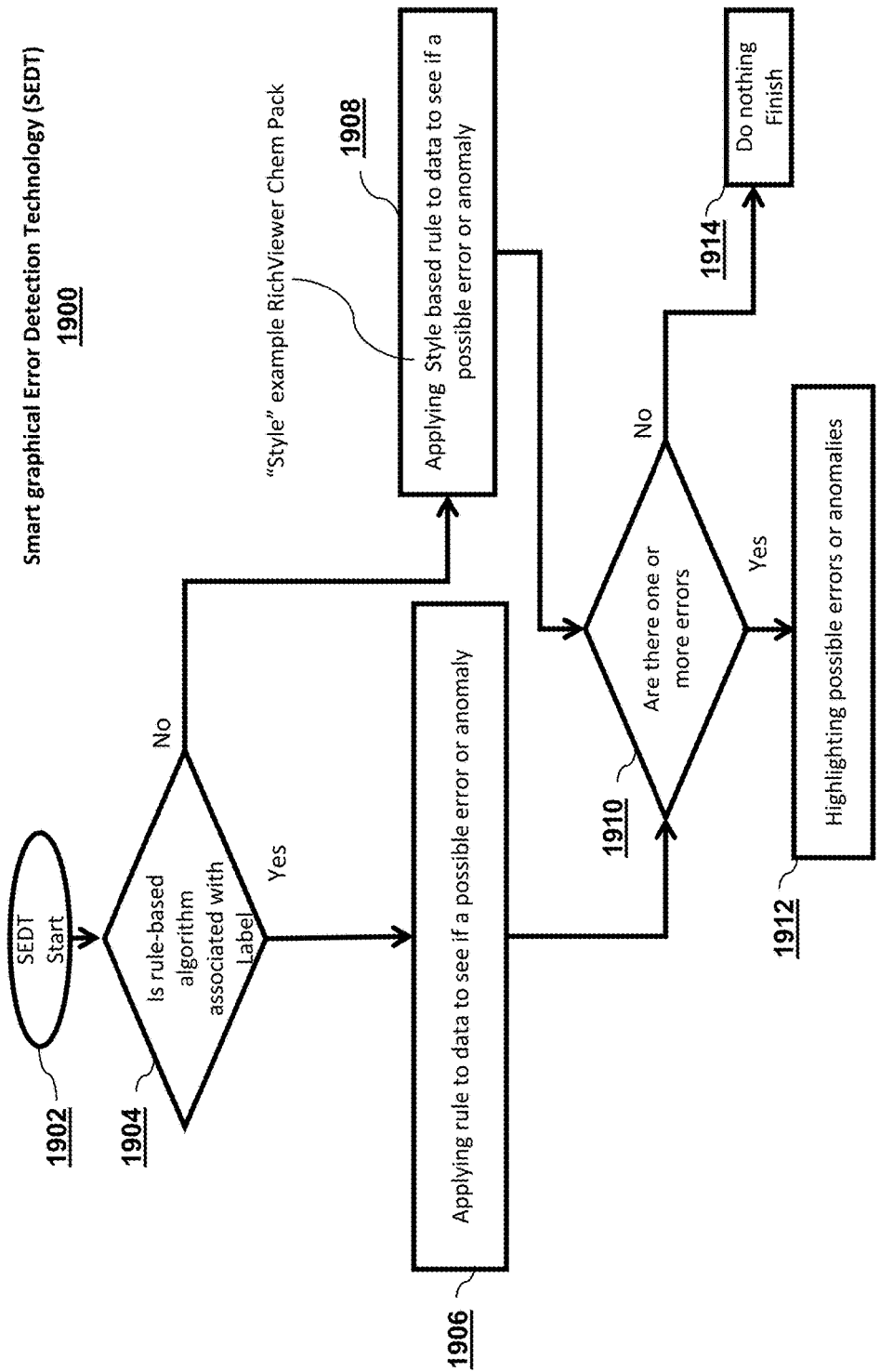
FIG. 19a is a flow chart representing the RichViewer decision tree method on a Smart graphical Error Detection Technology (SEDT) for defining a rules-based algorithm that would visually identify data errors in accordance with an embodiment of the present invention.

As depicted in FIG. 19a, an embodiment of the present invention provides a method (1900) for visually identifying data errors on graphics on a computing device. The method (1900) voluntarily called Smart graphical Error Detection Technology or SEDT initiates at step (1902) if Smart graphical Error Detection Technology is turned on. In step (1904), the system Analyzes the identified meta-data, numerical elements, and rules, in combination or individually associated with the Label. If the Label is found to have a rule-based algorithm, then in step (1906) that rule is applied. If the Label is not found to have a rule-based algorithm, then in step (1908) a Style of User (901) based rule is applied. In step (1910) the meta-data, numerical elements, in combination or individually associated with the Label or Style of User are processed with the rule and in step (1912) are highlighted (1922) or nothing is highlighted (1914). Smart graphical Error Detection Technology is unique in nature as its function and form are suited to PathwayFinder and RichViewer as embodied in the present invention which in their own right are unique to other available products. Without the existence of RichViewer and PathwayFinder, the concept and need for SEDT is not obvious but will become apparent to those skilled in the art by referring to the claims, detailed description and accompanying drawings.

Figure 19B:
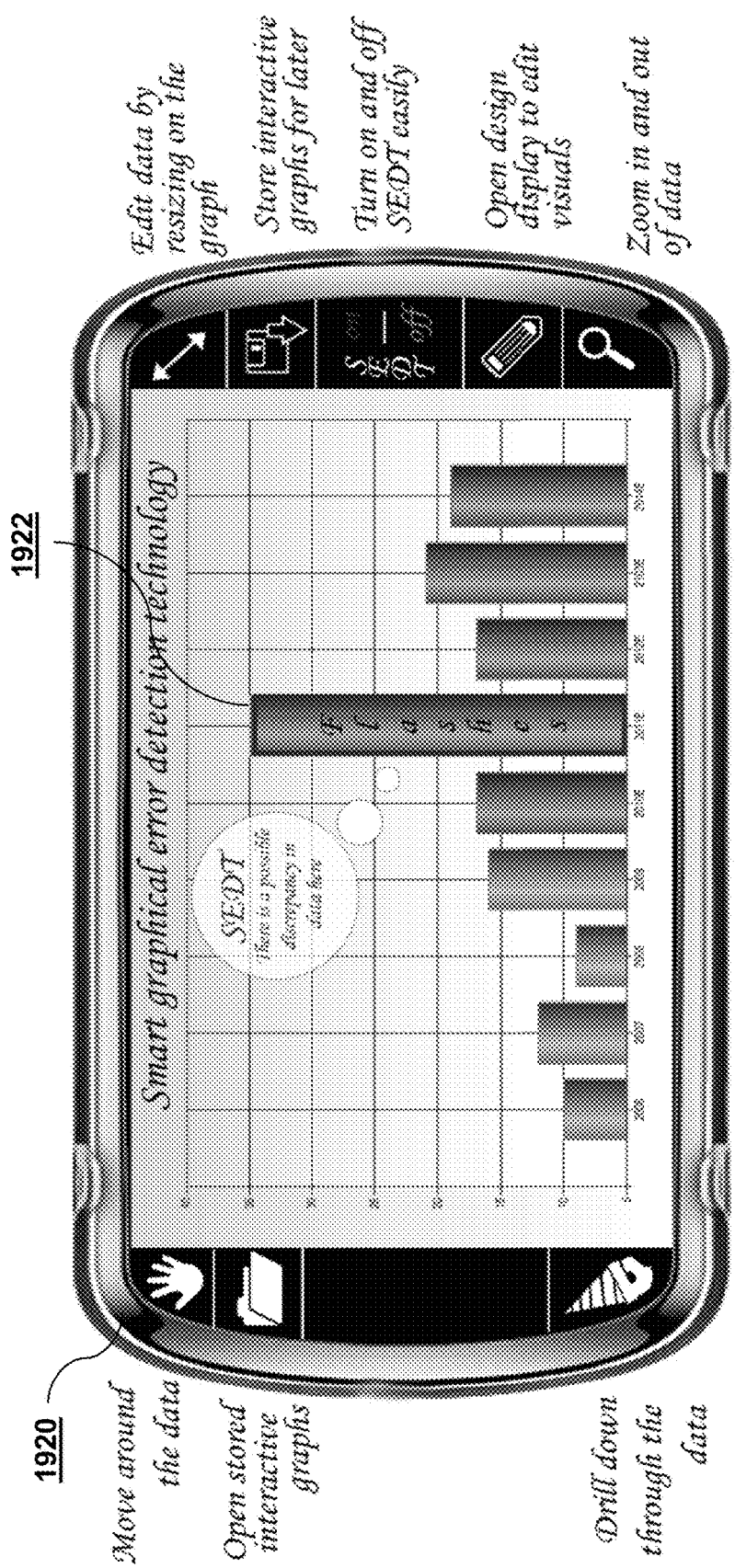
FIG. 19b is an illustrative view of RichViewer Smart graphical Error Detection Technology having a graphical representations of anomalies in the meta-data in accordance with an embodiment of the present invention.

In an exemplary embodiment of the present invention, as depicted in FIG. 19b the rules-based algorithm visually identifies data errors (1922) in accordance with an embodiment of the present invention.

Figure 19C:
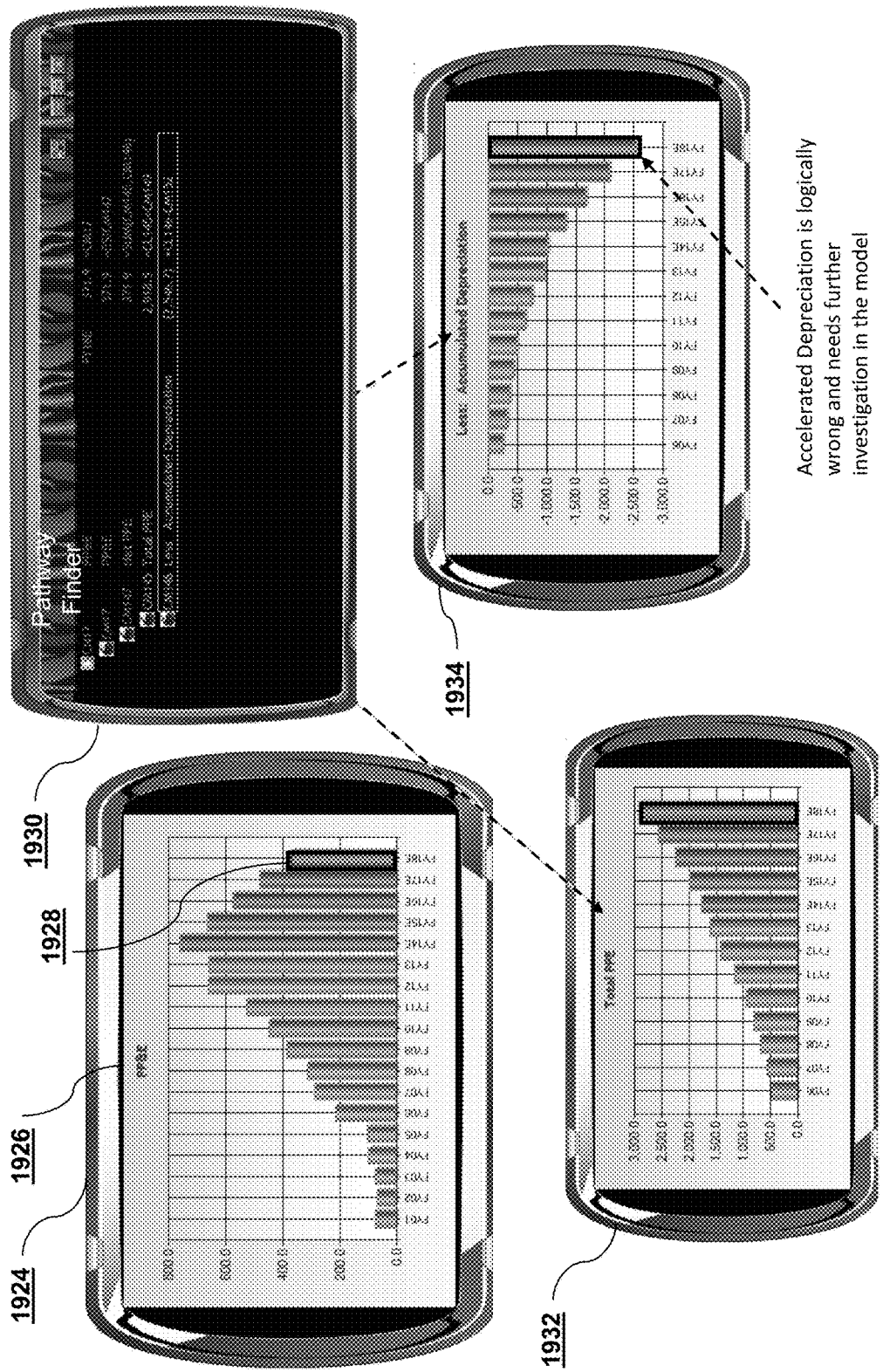
FIG. 19c is an illustrative view of RichViewer Smart graphical Error Detection Technology interacting with PathwayFinder and RichViewer in accordance with another embodiment of the present invention.

In an exemplary embodiment of the present invention, as depicted in FIG. 19c a rule has been set under method (1900) and step (1904) such that it would generally be expected the Property Plant & Equipment (PP&E) as defined in the Label (1926) for a balance sheet would continue its historical growth profile and thus triggering step (1906) to step (1912). The chart (1924) shows a downward trend in forward years FY14E to FY18E that would not be picked up using statistical methods FIG. 1c. Smart graphical Error Detection Technology has highlighted the FY18E meta-data as a possible error (1928) as per step (1912). Using PathwayFinder (1930) as defined in the present invention (802), the user can follow the formula to Cell CM147 being Net PPE with a formula equaling the sum of Cell CM145 and CM146. PathwayFinder interacting with RichViewer reveals that the meta-data associated with Cell CM145 is the growth in Total PPE (1932) and the meta-data associated with Cell CM146 is Accumulated Depreciation (1936). It is apparent to those skilled in the art of understanding financial statements that the Accumulated Depreciation (1936) is accelerating in growth which is logically wrong as defined in method (1900) step (1906) and needs further investigation.

Figure 20A:
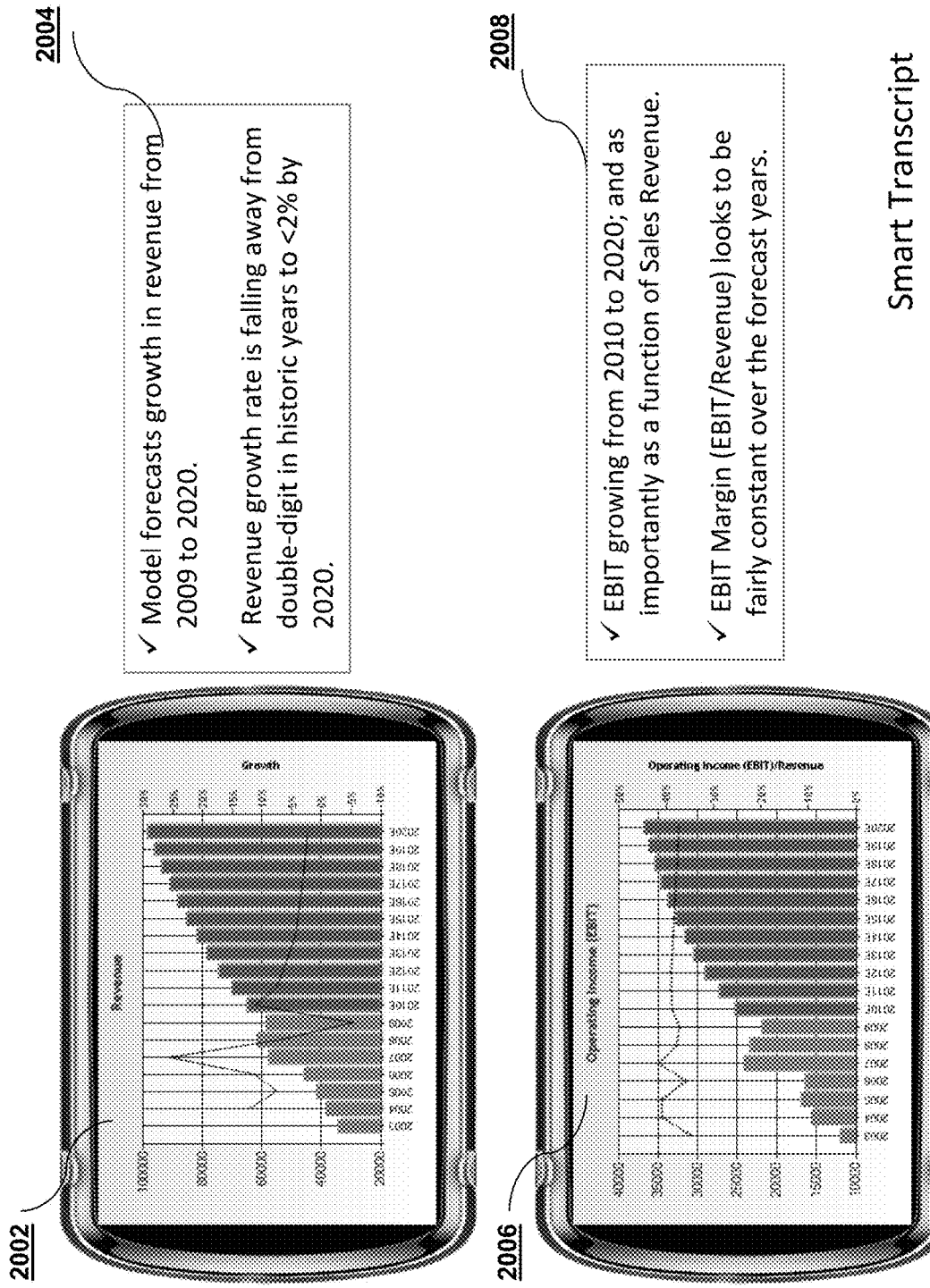
FIG. 20a is an illustrative view of RichViewer Smart Transcript in accordance with another embodiment of the present invention.
Figure 20B:
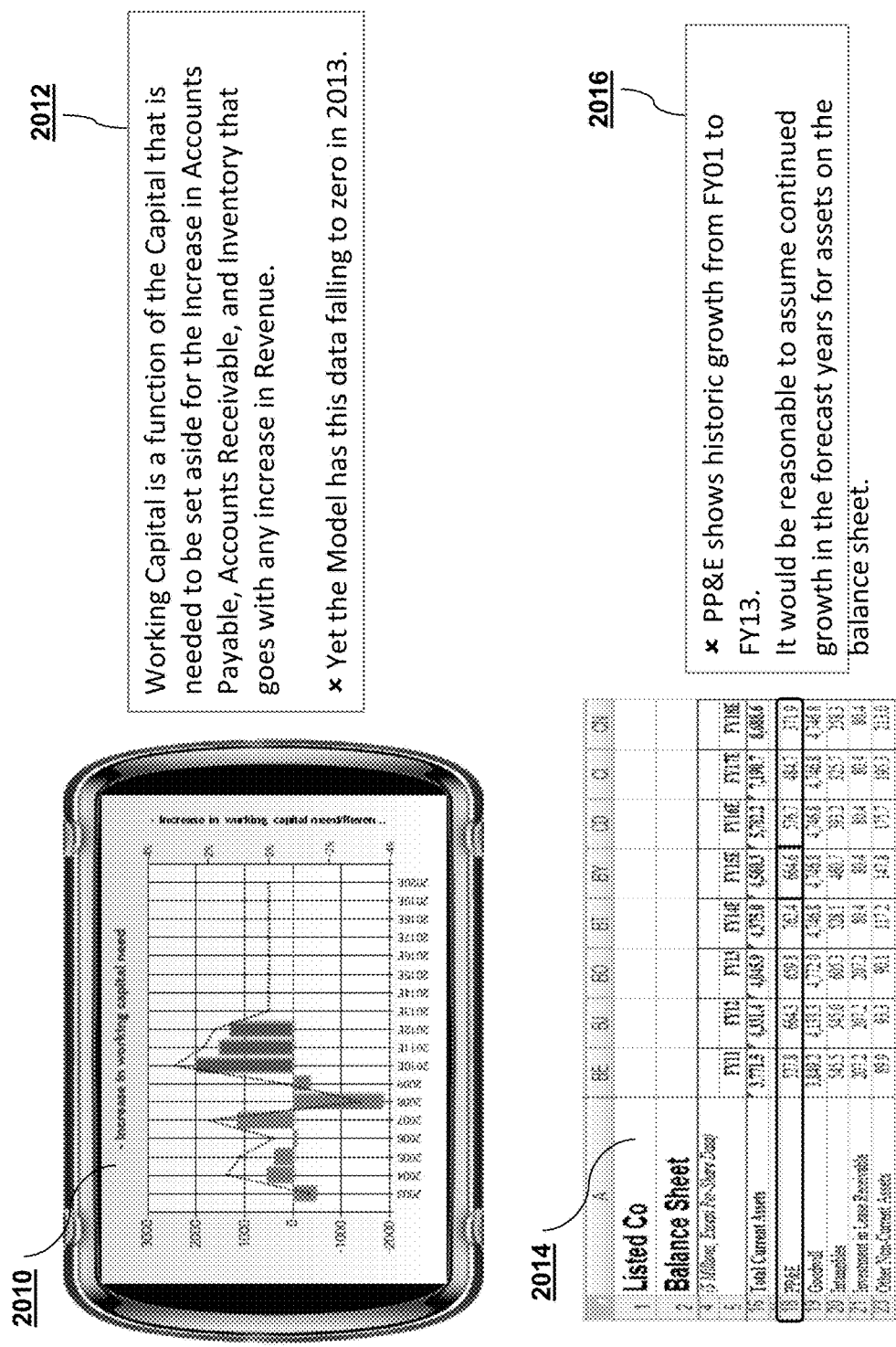
FIG. 20b is an illustrative view of RichViewer Smart Transcript in accordance with another embodiment of the present invention.

In an exemplary embodiment of the present invention, as depicted in FIG. 20a and FIG. 20b is a mechanism incorporated with the system to turn Info-graphical or numerical representations of the meta-data into textual descriptions or stories of what the Info-graphic and meta-data depicts and is voluntarily called Smart Transcript. Smart Transcript is focused on a real-time description of what the table or chart is depicting based on a set of rules from the known Tagging, column Headers and row Labels, Second Order meta-data, shape of the chart, and any other relationship that may be extracted from the systems environment. The user can have RichViewer Smart Transcript describe the chart (2002) based on the fact that it has a Label "Revenue" that matches a known Keyword, has historic and forecast data as depicted by the color coding from the Header dates, and has a growth chart on the right-axis again based on the known Keyword's relationship. The text (2004) has been constructed as Smart Transcript, and describes the forecast growth from the year 2009 being the last historic data-point to the year 2020 being the last forecast data-point, and also describes the growth profile based on the right-axis Second Order meta-data (2004). The text (2008) has been constructed as Smart Transcript from chart (2006), and describes both the "Operating Income (EBIT)" and its relationship to the Pivot Row "Revenue" within the forecast space as depicted by the line chart and the right-axis (2006).

Further, in the embodiment of the present invention as depicted in FIG. 20b, the system is an illustrative view of RichViewer Smart Transcript (2012) instantaneously displaying text that describes a possible anomaly in the meta-data from chart (2010). In this case the rule refers to working capital requirements which are known to be a function of Sales and the Smart Transcript rule has identified this as not being the case and has supplied text to explain this (2012) alongside the chart (2010). Similarly the RichViewer Smart Transcript (2016) appears as the user moves through the table (2014) and displays a possible anomaly via a rule where PP&E being fixed assets on a balance sheet should reasonably be assumed to continue to grow into the forecast years. The rules for this Smart Transcript are stored with the Keywords, vary with each Keyword, and are constructed in a way that RichViewer interprets a hierarchy of supplied rules and inserts Labels, Headers such as dates, slope of chart lines, and other information that can be extracted into the supplied text rules. This invention does not try to define these rules as they will vary from Style of User to Keyword to Document based rules to Second Order data. This invention defines the uniqueness of the structure of using rules to extract and present the Smart Transcript for the appropriate Info-graphical representation so that the advantages of the system will become apparent to those skilled in the art.

Figure 21A:
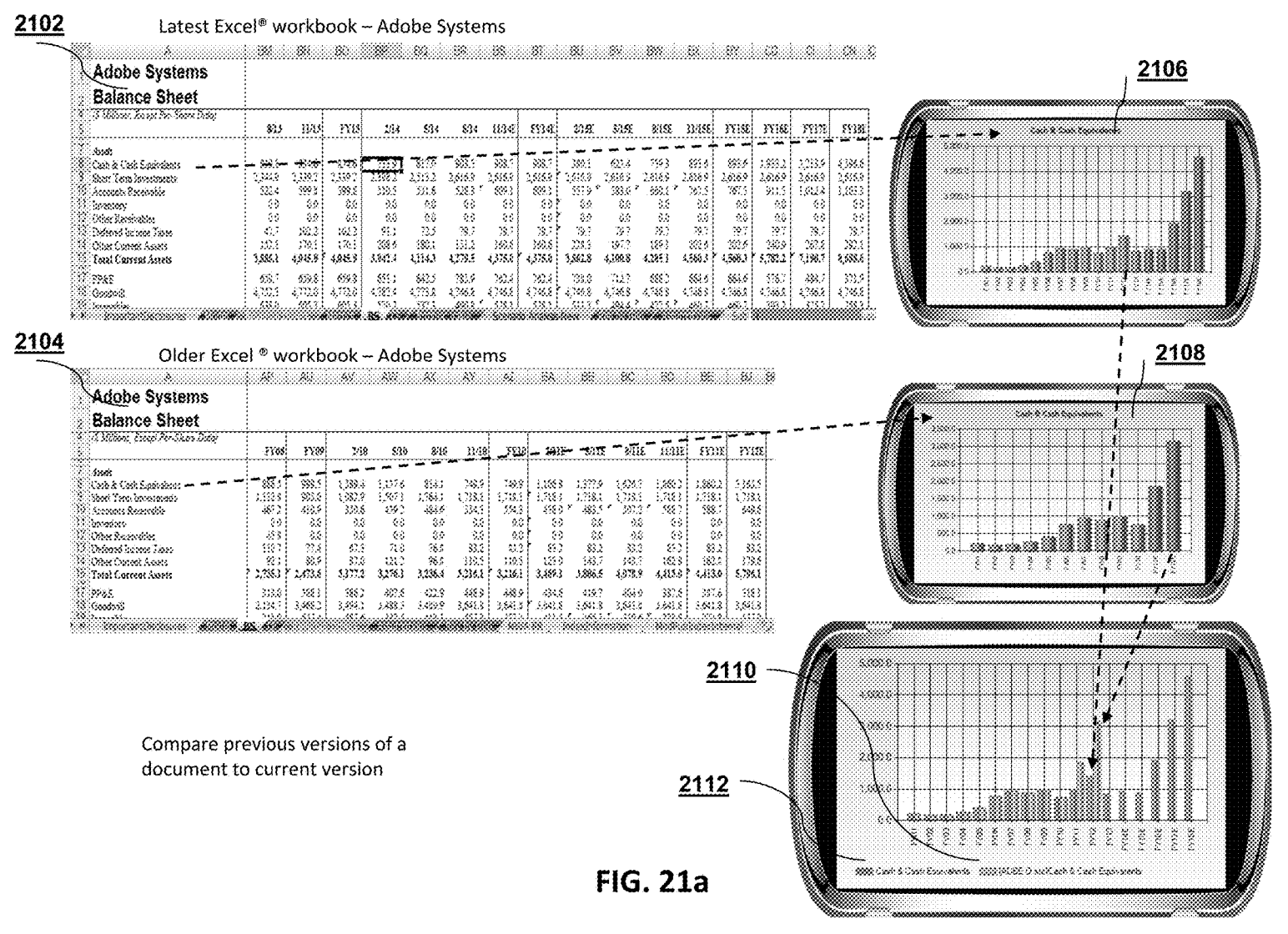
Figure 21B:
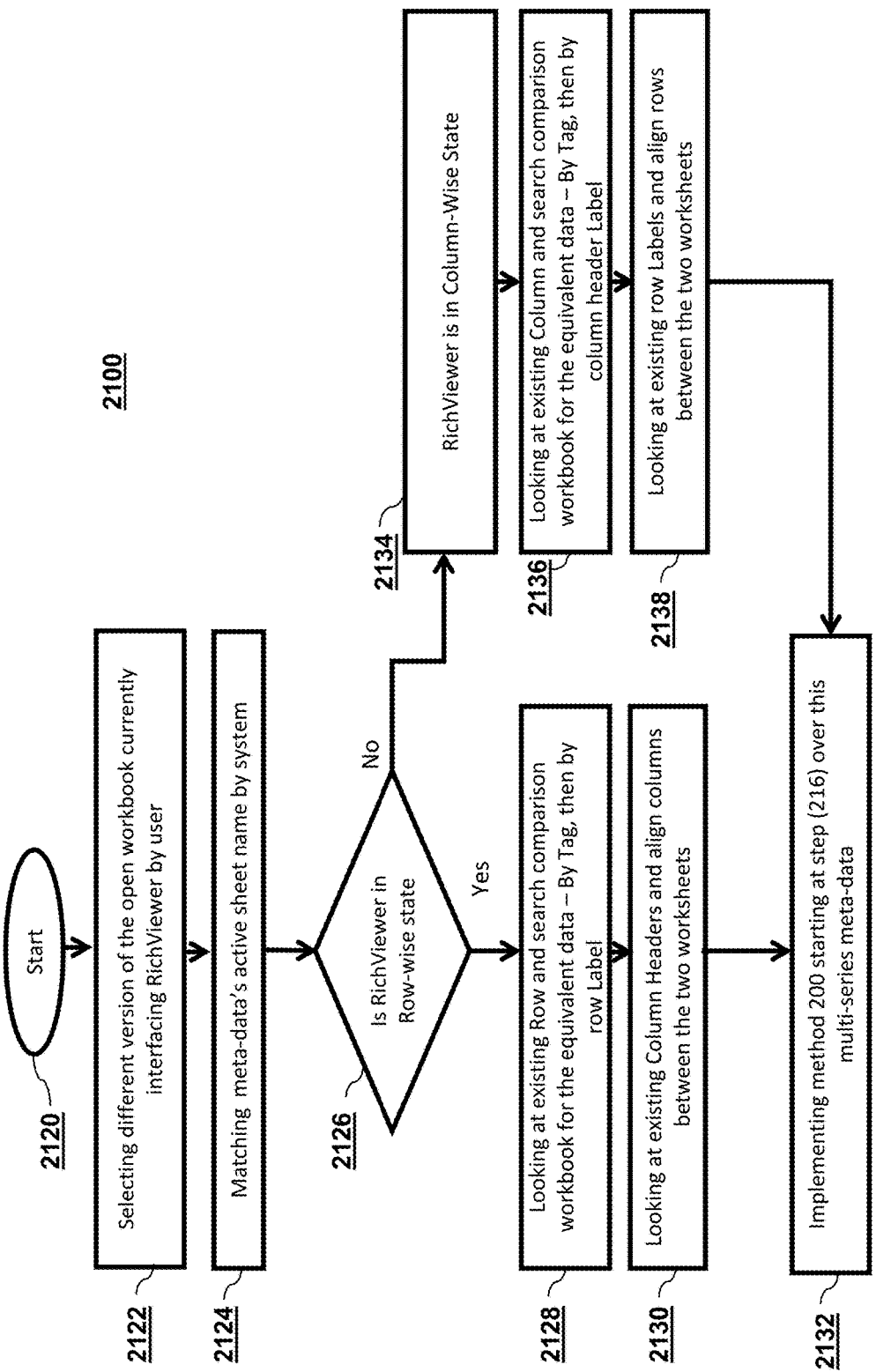
FIG. 21b is a flow chart representing the RichViewer method for comparing source document versions in accordance with an embodiment of the present invention.

In an exemplary embodiment of the present invention, as depicted in FIG. 21a, RichViewer allows for the instantaneous graphical comparison of two versions of the same source document for the meta-data. These versions can be across any time periods and for purpose of explanation the latest workbook (2102) has Header data out to FY18E whereas the older workbook (2104) has Header data to FY12E. The chart (2106) represents visible and hidden meta-data for the newer workbook with dates ranging from historical FY01 to FY13 and forecast FY14E to FY18E. The chart (2108) represents visible and hidden meta-data for the older workbook with dates ranging from historical FY01 to FY09 and forecast FY10E to FY12E. In this embodiment of the present invention, another chart shows two series combined where one column data series is from the older workbook (2110) and the other from the newer workbook (2112). Arrows between charts on FIG. 21 show that on the older workbook FY12 "Cash & Cash Equivalents" was predicted to be $3,165.5 m, yet in the newer workbook, FY12 "Cash & Cash Equivalents" was actually to be $1,425.1 m. This instantaneous visual comparison allows the user to understand the relationship between the two versions of the document.

As depicted in FIG. 20b, an embodiment of the present invention provides a method (2100) for the instantaneous graphical comparison of two versions of the same source document for the meta-data on graphics on a computing device. The method (2100) initiates at the step (2120). In step (2122) the user selects a different version of the open document currently interfacing RichViewer. Afterwards, in step (2124) the systems matches the meta-data's active sheet name between the two source documents if they have separate sheets making up the document as per Excel® as an example. In step (2126) if RichViewer is looking at the meta-data by row, being called row-wise, then step (2128) looks at the existing row and searches the different version of the open document for the same row looking first for a Tag and if not found then a Row Label. Afterwards in step (2130) the systems looks at existing column Headers identified by RichViewer as being part of the meta-data and aligns the data series between the two data sets. In step (2126) if RichViewer is looking at the meta-data by column, being called column-wise (2134), then step (2136) looks at the existing column and searches the different version of the open workbook for the same column looking first for a Tag and if not found then a column Header Label. Afterwards in step (2318) the system looks at existing row Labels identified by RichViewer as being part of the meta-data and aligns the data series between the two data sets. Finally in step (2132) the system implements method (200) starting at step (216) over this multi-series meta-data from the two workbooks.

Figure 22:
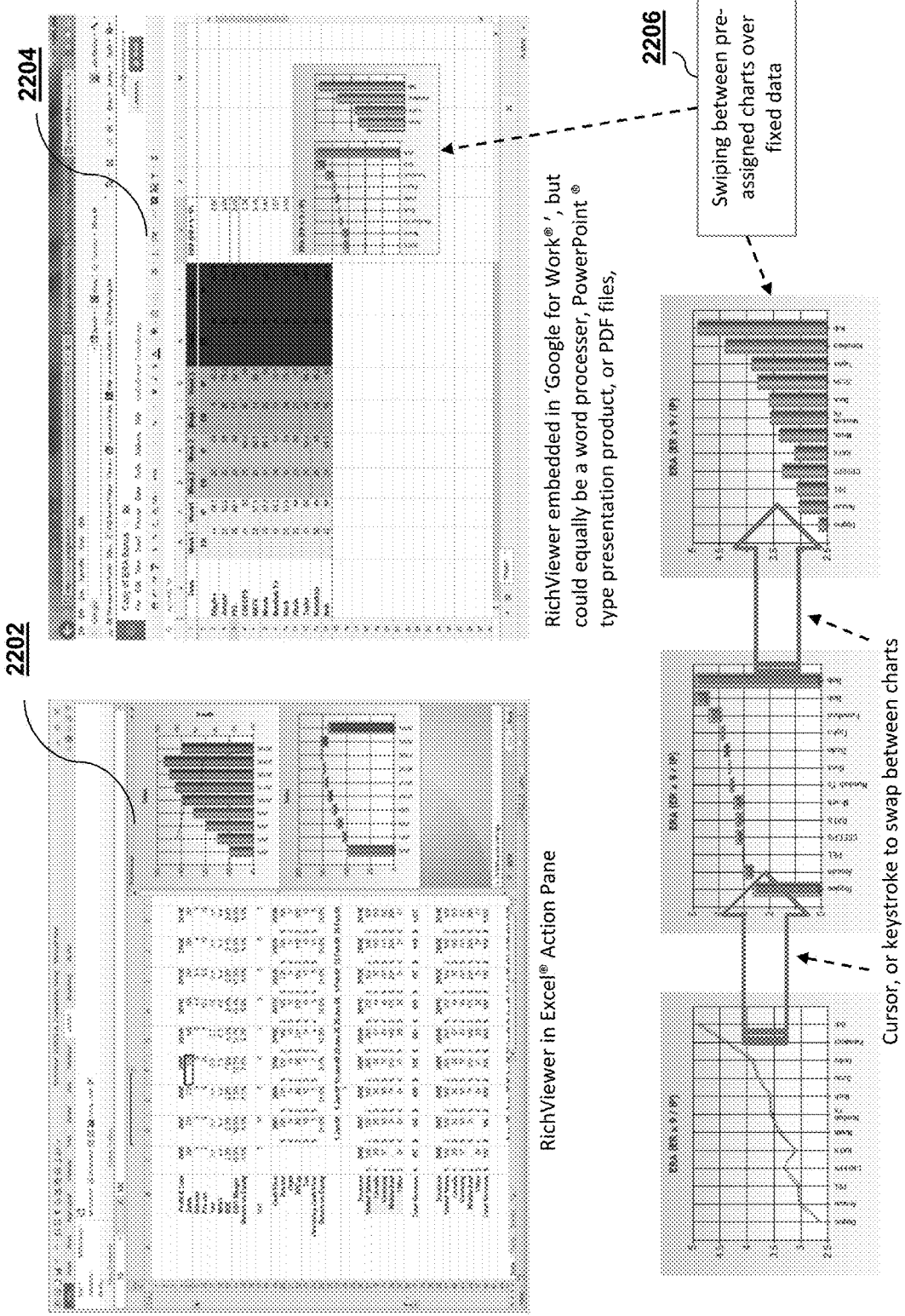
FIG. 22 is an illustrative view of components of RichViewer embedded in third-party applications in accordance with another embodiment of the present invention.

As illustrated in FIG. 22, the method (200) implementable on the system (302) enable some components of RichViewer to be displayed in embedded form in third-party applications. The Excel® Action Pane (2202) or other component of Excel® may enable the graphical visualization of data inside the Excel® application. Similarly (2204) has RichViewer directly embedded in a single chart pointing to static or dynamic meta-dataset where multiple charts, tables, Info-graphics are delivered in the one chart instance where the user can seamlessly swap (2206) between charts over the dataset as defined in user or system defined Keywords. This embodiment could also be any other desktop applications such as, but not limited to, web browser embedded with Google Docs®, Excel® 365, apple numbers, a spreadsheet, email program, PDF file, third-party business intelligence tool or other product that is displayed on the system (302), and the system (302) instantaneously visualizes the graph (308) corresponding to the selected cell and the meta-data related to that selected cell.

Some of the aforementioned advantages are considered by providing the system that includes a display menu that further includes the revolving transparent three dimension grid view of various templates of different types of graphical representations of data corresponding to any particular selected cell.

Though exemplary embodiments have been presented in the foregoing detailed description of the invention, it should be appreciated that a vast number of variations exist. It should also be note that the disclosed embodiments and methods are not intended to limit the scope and applicability of the invention in any way. Rather, the foregoing detailed descriptions will provide those skilled in the art with a convenient road map for implementing an exemplary embodiment of the invention. It should be understood that various changes may be made in the methods and order of steps described in an exemplary embodiment without departing from the scope of the invention as set forth in the appended claims and their legal equivalents.

The invention claimed is:

1. A computer implemented method for generating graphics on a computing device, the method comprising:
    identifying, using a processor, an electronic data source comprising a plurality of data points, the plurality of data points stored in a memory associated with the processor;
    selecting, using the processor, a first one or more data points from the plurality of data points, the first one or more data points being the data against which a graphic is needed;
    identifying, using the processor, one or more of: one or more meta-data associated with the selected first one or more data points; one or more numerical elements associated with the selected first one or more data points; and one or more rules associated with the selected first one or more data points;
    analyzing, using the processor, the identified one or more meta-data, the identified one or more numerical elements, and the identified one or more rules, in combination or individually;
    automatically selecting, using the processor, a second one or more data points surrounding the first one or more data points;
    instantaneously generating in real-time, using the processor, one or more graphical object, such that visual properties of the graphical objects represent the corresponding numerical value of the numerical elements of the first one or more data points and the automatically selected second one or more data points surrounding the first one or more data points according to a scale; and repositioning, using the processor, the one or more graphical objects with respect to a reference surface on an interface screen shown on a display associated with the processor to generate the graphics and refreshing the one or more graphical objects in response to a user selecting a third one or more data points, wherein the processor is configured to generate the graphics dynamically in response to the selection of the third one or more of electronic data source data points;

associating at least one Label of the first or second data points to predefined Keywords based on a Style of user and identifying the Group of the at least one Label the meta-data is associated with; and working through the Keywords firstly at whole word matches, then at part word matches, then at wildcard match to identify the one or more Info-graphic representations;

extracting one or more Info-graphics associated with the meta-data; and when the associated Info-graphical representation requires multi-series of metadata, extracting additional meta-data based on the extracted Info-graphic's requirements from a source-document.

2. The method according to claim 1, wherein the second one or more data points are visibly distinguishable on the interface screen.

3. The method according to claim 1, wherein the second one or more data points are hidden from the interface screen.

4. The method according to claim 1, wherein the plurality of first or second data points are one or more of a single data point, a block of data points, a highlighted area in an electronic document, a screen grab, data in tabular form, graphical data, and textual formatted data.

5. The method according to claim 1 further comprising: allowing users to drill-down into a formula associated with a data point; and providing details corresponding to each component in the formula according to contextual relationships with surrounding data points and other components of the formula.

6. The method as claimed in claim 1, further comprising: determining that an electronic document has embedded Document Charts that override use of the Keywords mechanism; extracting the one or more Info-graphics associated with the embedded Document Charts; and when the associated Info-graphical representation requires multi-series of metadata, extracting additional meta-data based on the extracted Info-graphic's requirements from a source-document.

7. The method as claimed in claim 1, further comprising: determining whether a meta-data row or column has an associated Tagging Label; for the meta-data associated with Tagging: looking at a Tagging mapping tree for Info-graphics associated with this Tag and acquiring a list of needed Tags for the Info-graphic; looking for other parts of a source document for other needed Tags; and acquiring additional meta-data to support the Info-graphics associated with the needed Tags; determining that Tag requirements are met; and inserting the Tagging Info-graphic(s) at a front of an Info-graphic list.

8. The method as claimed in claim 1, further comprising: identifying a visual data source comprising a graphical format of data points in numerical, text, or graphical output as highlighted by the user; extracting a highlighted area into an image format; using Optical Recognition (OpR) to extract at least one of text from the image, numbers from highlighted paragraph(s) of text, or data points and labels from a chart including Info-graphics; for images determined to have one or more of paragraph(s) containing text or a chart: presenting extracted tabular data points and label in a Data Grid Viewer, and merging grid cells by the user as needed in the Data Grid viewer; and for other images: overlaying a grid around each tabular data point and label and maintaining a memory reference of the extract text via OpR that matches each grid reference; and merging the grid cells by the user as needed.

9. The method as claimed in claim 1, further comprising: determining that the meta-data row or column has associated Second Order Info-graphical representation(s) or if a predefined Pivot Row exists giving rise to a Second Order chart; looking at mathematical rules associated with this Second Order Info-graphical representation that restructures the meta-data into Second Order meta-data and when a predefined Pivot Row exists using at least one of the mathematical rules of dividing the meta-data by the Pivot Row meta-data; calculating the Second Order data set; and creating a second order Info-graphical representation comprising the calculated Second Order data set.

10. The method as claimed in claim 1, further comprising: identifying patterns in the Info-graphical representations of the meta-data and creating textual descriptions of what the Info-graphic and meta-data depicts; applying a set of rules from the known Tagging, column Headers and row Labels, Second Order meta-data, shape of the chart, and any other relationship that may be extracted from the systems environment; creating a real-time description using the rules; presenting the description with the Info-graphical representation or publishing the Info-graphical representation and description in another document.

11. The method as claimed in claim 1, further comprising: identifying data errors or anomalies in the meta-data underlying the Info-graphical representations; analyzing the identified meta-data, numerical elements, and rules, in combination or individually associated with a Label; retrieving a rule based algorithm associated with the Label; applying the rule based algorithm or if none found using a Style of User based rule; processing the rule on the meta-data, numerical elements, in combination or individually associated with the Label or Style of User; and highlighting in real-time the possible data points identified as possible errors or anomalies on the Info-graphical representation and presenting a description created as claimed in claim 10.

12. A computer system for generating graphics on a computing device, the computer system comprising at least one processor associated with at least one memory storing executable instructions thereon that causes the system at least to:

identify an electronic data source comprising a plurality of data points, the plurality of data points stored in the memory associated with the processor; select a first one or more data points from the plurality of data points, the first one or more data points being the data against which a graphic is needed;

identify one or more of: one or more meta-data associated with the selected first one or more data points; one or more numerical elements associated with the selected first one or more data points; and one or more rules associated with the selected first one or more data points;

analyze the identified one or more meta-data, the identified one or more numerical elements, and the identified one or more rules, in combination or individually;

automatically select, a second one or more data points surrounding the first one or more data points;

instantaneously generate in real-time one or more graphical object, such that visual properties of the graphical objects represent the corresponding numerical value of the numerical elements of the first one or more data points and the automatically selected second one or more data points surrounding the first one or more data points according to a scale; and reposition the one or more graphical objects with respect to a reference surface on an interface screen shown on a display associated with the processor to generate the graphics and refreshing the one or more graphical objects in response to a user selecting a third one or more data points, wherein the processor is configured to generate the graphics dynamically in response to the selection of the third one or more of electronic data source data points;

associate at least one Label of the first or second data points to predefined Keywords based on a Style of user and identify the Group of the at least one Label the metadata is associated with; and work through the Keywords firstly at whole word matches, then at part word matches, then at wildcard match to identify the one or more Info-graphic representations;

extract one or more Info-graphics associated with the meta-data; and when the associated Info-graphical representation requires multi-series of metadata, extract additional meta-data based on the extracted Info-graphic's requirements from a source-document.

13. The system according to claim 12, wherein the second one or more data points are visibly distinguishable on the interface screen.

14. The system according to claim 12, wherein the second one or more data points are hidden from the interface screen.

15. The system according to claim 12, wherein the plurality of first or second data points are one or more of a single data point, a block of data points, a highlighted area in an electronic document, a screen grab, data in tabular form, graphical data, and textual formatted data.

16. The system according to claim 12, the system further operable to: allow users to drill-down into a formula associated with a data point; and provide details corresponding to each component in the formula according to contextual relationships with surrounding data points and other components of the formula.

17. The system according to claim 12, the system further operable to: determine that an electronic document has embedded Document Charts that override use of the Keywords mechanism; extract the one or more Info-graphics associated with the embedded Document Charts; and when the associated Info-graphical representation requires multi-series of metadata, extract additional meta-data based on the extracted Info-graphic's requirements from a source-document.

18. The system according to claim 12, the system further operable to: determine whether a meta-data row or column has an associated Tagging Label; for the meta-data associated with Tagging: look at a Tagging mapping tree for Info-graphics associated with this Tag and acquiring a list of needed Tags for the Info-graphic; look for other parts of a source document for other needed Tags; and acquire additional meta-data to support the Info-graphics associated with the needed Tags; determine that Tag requirements are met; and insert the Tagging Info-graphic(s) at a front of an Info-graphic list.

19. The system according to claim 12, the system further operable to: identify a visual data source comprising a graphical format of data points in numerical, text, or graphical output as highlighted by the user; extract a highlighted area into an image format; use Optical Recognition (OpR) to extract at least one of text from the image, numbers from highlighted paragraph(s) of text, or data points and labels from a chart including Info-graphics; for images determined to have one or more of paragraph(s) containing text or a chart: present extracted tabular data points and label in a Data Grid Viewer, and merge grid cells by the user as needed in the Data Grid viewer; and for other images: overlay a grid around each tabular data point and label and maintain a memory reference of the extract text via OpR that matches each grid reference; and merge the grid cells by the user as needed.

20. The system according to claim 12, the system further operable to: determine that the meta-data row or column has associated Second Order Info-graphical representation(s) or if a predefined Pivot Row exists giving rise to a Second Order chart; look at mathematical rules associated with this Second Order Info-graphical representation that restructures the meta-data into Second Order meta-data and when a predefined Pivot Row exists using at least one of the mathematical rules of dividing the meta-data by the Pivot Row meta-data; calculate a Second Order data set; and create a second order Info-graphical representation comprising the calculated Second Order data set.

21. The system according to claim 12, the system further operable to: identify patterns in the Info-graphical representations of the meta-data and creating textual descriptions of what the Info-graphic and meta-data depicts; apply a set of rules from the known Tagging, column Headers and row Labels, Second Order meta-data, shape of the chart, and any other relationship that may be extracted from the systems environment; create a real-time description using the rules; present the description with the Info-graphical representation or publishing the Info-graphical representation and description in another document.

22. The system according to claim 12, the system further operable to: identify data errors or anomalies in the meta-data underlying the Info-graphical representations; analyze the identified meta-data, numerical elements, and rules, in combination or individually associated with a Label; retrieve a rule based algorithm associated with the Label; apply the rule based algorithm or if none found using a Style of User based rule; process the rule on the meta-data, numerical elements, in combination or individually associated with the Label or Style of User; and highlight in real-time the possible data points identified as possible errors or anomalies on the Info-graphical representation and presenting a description created as claimed in claim 10.

* * * * *